US010890749B2

(12) United States Patent
Futami et al.

(10) Patent No.: US 10,890,749 B2
(45) Date of Patent: Jan. 12, 2021

(54) MAGNIFYING OBSERVATION APPARATUS

(71) Applicant: Keyence Corporation, Osaka (JP)

(72) Inventors: Takashi Futami, Osaka (JP); Suguru Sekiya, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 16/525,639

(22) Filed: Jul. 30, 2019

(65) Prior Publication Data

US 2020/0073109 A1   Mar. 5, 2020

(30) Foreign Application Priority Data

Aug. 30, 2018 (JP) .................. 2018-161343

(51) Int. Cl.
*G02B 21/36* (2006.01)
*G02B 21/26* (2006.01)
*H04N 5/225* (2006.01)
*G02B 21/24* (2006.01)

(52) U.S. Cl.
CPC .......... *G02B 21/362* (2013.01); *G02B 21/26* (2013.01); *G02B 21/365* (2013.01); *G02B 21/368* (2013.01); *H04N 5/2253* (2013.01); *H04N 5/2258* (2013.01); *G02B 21/244* (2013.01)

(58) Field of Classification Search
CPC .... G02B 21/362; G02B 21/26; G02B 21/365; G02B 21/368; G02B 21/2258; G02B 21/244; G02B 21/2253; G02B 21/24; G01Q 20/02; G01Q 60/24; H04N 5/23209
See application file for complete search history.

(56) References Cited

U.S. PATENT DOCUMENTS

| 8,618,479 | B2 | 12/2013 | Kashihara |
| 8,674,301 | B2 | 3/2014 | Takagi |
| 8,994,810 | B2 | 3/2015 | Sekiya et al. |
| 10,302,931 | B2 | 5/2019 | Inomata et al. |
| 10,634,896 | B2 * | 4/2020 | Kamata ................ G02B 21/248 |
| 2002/0041438 | A1 * | 4/2002 | Takahama .......... G02B 21/0088 359/363 |

(Continued)

FOREIGN PATENT DOCUMENTS

| JP | 2102-18811 A | 1/2012 |
| JP | 2014-211626 A | 11/2014 |
| JP | 2014211626 A * | 11/2014 ............. G02B 21/24 |

OTHER PUBLICATIONS

U.S. Appl. No. 16/525,637, filed Jul. 30, 2019 (172 pages).

*Primary Examiner* — Dramos Kalapodas
(74) *Attorney, Agent, or Firm* — Kilyk & Bowersox, P.L.L.C.

(57) ABSTRACT

To make it possible to observe an observation target from a plurality of different angles and to make, when acquiring and displaying an image including a placement unit separately from an observation image, the image an image with less discomfort. A side-view image capturing unit having an optical axis different from an optical axis of a magnified observation image capturing unit is provided facing a placement table. The side-view image capturing unit is provided so as to eliminate a connection or to lower a connection with a swinging motion of a supporting member to acquire a side-view image. A magnified observation image and the side-view image are displayed.

20 Claims, 42 Drawing Sheets

(56) References Cited

U.S. PATENT DOCUMENTS

| | | | | |
|---|---|---|---|---|
| 2008/0006615 A1* | 1/2008 | Rosario | C04B 41/0045 | |
| | | | 219/121.68 | |
| 2009/0212213 A1* | 8/2009 | Nakasuji | H01J 37/28 | |
| | | | 250/310 | |
| 2010/0085635 A1* | 4/2010 | Verboven | G01N 21/87 | |
| | | | 359/382 | |
| 2013/0088586 A1* | 4/2013 | Sekiya | G02B 21/365 | |
| | | | 348/79 | |
| 2014/0103208 A1* | 4/2014 | Noda | H01J 37/26 | |
| | | | 250/311 | |
| 2014/0139608 A1* | 5/2014 | Rosario | B23K 26/359 | |
| | | | 347/225 | |
| 2014/0313312 A1* | 10/2014 | Gaiduk | G02B 21/24 | |
| | | | 348/79 | |
| 2015/0018622 A1* | 1/2015 | Tesar | A61B 50/13 | |
| | | | 600/202 | |
| 2017/0307502 A1* | 10/2017 | Mason | B01L 3/0241 | |
| 2019/0014985 A1* | 1/2019 | Kobayashi | A61B 5/0071 | |

* cited by examiner

FRONT ←　　　　　　　　　　　　　　　　→ REAR

LEFT ← → RIGHT

LEFT ← → RIGHT

FRONT ←          → REAR

FRONT ← → REAR

FIG. 39   MAGNIFYING OBSERVATION APPARATUS

MAGNIFYING OBSERVATION APPARATUS

CROSS-REFERENCE TO RELATED APPLICATIONS

The present application claims foreign priority based on Japanese Patent Application No. 2018-161343, filed Aug. 30, 2018, the contents of which is incorporated herein by reference.

BACKGROUND OF THE INVENTION

1. Field of the Invention

The present invention relates to a magnifying observation apparatus that images an observation target to magnify and display on a display unit.

2. Description of Related Art

For example, as a magnifying observation apparatus which magnifies and displays a sample of a micro object and the like, an electronic component, or work such as workpiece, there has been known a magnifying observation apparatus that includes an optical system on which reflected light or transmitted light from an observation target is incident, and a plurality of light receiving elements two-dimensionally arranged. This magnifying observation apparatus is configured to receive light incident through the optical system by the light receiving elements, detects a light receiving amount of each light receiving element to generate an image of the observation target and magnifies and displays the image on a display. Such a magnifying observation apparatus is disclosed, for example, in JP-A-2014-211626, and is sometimes called a digital microscope, etc. in distinction from an optical microscope.

The digital microscope of JP-A-2014-211626 includes a height adjustable optical system unit, a microscope main body to which the optical system unit is attached, and a sample table, and the microscope main body is capable of swinging around an axis extending horizontally. Moreover, the digital microscope of JP-A-2014-211626 includes, separately from a microscope image sensor which captures a magnified observation image of a sample, a monitoring sensor for capturing a two-dimensional overview image of the sample. The microscope image sensor and the monitoring sensor are both attached to the microscope main body and swing with the microscope main body. Based on the overview image acquired by the monitoring sensor, it is possible to automatically check whether the sample is correctly positioned on the sample table, to move the sample in X and Y directions till the sample reaches a desired observation position, and to designate an area within the overview image and select a desired observation magnification of that area.

In addition, a digital microscope of JP-A-2012-18811 includes a body portion having a closed type sample chamber which can be depressurized and in which a sample is stored, an electron beam imaging section configured to be swingable, and a sample chamber imaging section which images the sample chamber.

During observation with the electron beam imaging section, when the electron beam imaging section swings, a virtual image of a tip end portion of the electron beam imaging section can be displayed superimposed on a sample chamber image captured in advance by the sample chamber imaging section.

As in JP-A-2014-211626, there is an advantage that, by attaching the microscope image sensor to the microscope main body capable of swinging around an axis extending horizontally, the observation target can be observed from different angles when the observation target on the sample table is observed. In addition, in JP-A-2014-211626, there is also an advantage that, for example, the position of the sample can be automatically checked based on the overview image acquired by the monitoring sensor.

However, since the monitoring sensor of JP-A-2014-211626 is attached to the swingable microscope main body, when the microscope main body is swung to observe the observation target from different angles by the microscope image sensor, the monitoring sensor also swings. When a swinging angle of the microscope main body becomes large, the observation target is out of the visual field of the monitoring sensor and an overview image including the observation target cannot be obtained. Therefore, the sample table which should have been originally included in the overview image does not appear in the overview image and discomfort during use is increased.

Moreover, when the monitoring sensor of JP-A-2014-211626 swings, the acquired overview image also tilts corresponding to the swinging angle of the monitoring sensor and this tilted overview image is displayed on a display unit and the like. In this case, when the sample table is included in the overview image, the sample table which should have been originally horizontal appears in a tilted state in the overview image, which may cause much discomfort.

In addition, in JP-A-2012-18811, a sample chamber imaging section for observing the sample chamber is provided. However, the sample chamber is a closed type in JP-A-2012-18811, which premises that observation from the outside is not possible, and there is no idea of applying the sample chamber imaging section to imaging of the observation target in an open system.

SUMMARY OF THE INVENTION

The invention has been devised in view of such points, and an object of the invention is to make it possible to observe an observation target from a plurality of different angles and to make, when acquiring and displaying a second image including a placement unit separately from a first image for observation, the second image an image with less discomfort.

In order to achieve the object, a first invention is a magnifying observation apparatus which irradiates an observation target with illumination light and detects a light receiving amount of reflected light or transmitted light of the illumination light from the observation target to generate an image of the observation target and to display the image to enable a magnified observation, wherein the magnifying observation apparatus includes: a base unit; a placement unit, which is supported by the base unit, for placing the observation target; an objective lens on which the reflected light or the transmitted light of the illumination light from the observation target is incident; a first imaging section which receives the reflected light or the transmitted light through the objective lens to acquire a first image; a supporting member including a first stand unit supported by the base unit and positioned at a side close to the base unit, a second stand unit positioned at a side far from the base unit and supporting the objective lens and the first imaging section, and a shaft unit which swings the second stand unit around a swinging axis with respect to the first stand unit; a second imaging section which is provided at a position at the same height as or higher than the shaft unit when viewed from the base unit, and is provided to face the placement unit or the observation target such that an optical axis of the first imaging section is included in a visual field and to have an optical axis different from the optical axis of the first imaging section, and to eliminate a connection or to lower a connection with a swinging motion of the supporting member to acquire a second image including the placement unit; and a display unit capable of displaying the first image acquired by the first imaging section and the second image acquired by the second imaging section.

According to this configuration, the illumination light irradiated to the observation target placed on the placement unit is reflected from the observation target and is incident on the objective lens. When the observation target has light transmissivity and is illuminated by transmitted illumination, the transmitted light from the observation target is incident on the objective lens. The light incident on the objective lens is received by the first imaging section to obtain a first image. In this case, the observation target can be observed from a plurality of different angles by swinging the second stand unit which supports the objective lens and the first imaging section.

Since the second imaging section provided separately from the first imaging section faces the placement unit or the observation target, it becomes possible to acquire them as a second image. The placement unit is included in the acquired second image.

The swinging axis may be an axis integrated with the base unit.

The second imaging section is provided such that, when the second imaging section acquires the second image, the second imaging section can eliminate the connection or lower the connection with the swinging motion of the supporting member to acquire the second image. Therefore, even if the supporting member is greatly swung, the placement unit can hardly be out from the visual field of the second imaging section. As a result, when the observation target is observed from a plurality of different angles, it is possible to continuously display the second image including the placement unit on the display unit.

In a second invention, the second imaging section is provided on the first stand unit or the shaft unit which does not swing with respect to the base unit.

According to this configuration, the second imaging section does not swing, and thus it becomes possible to acquire a second image which does not have a connection with the swinging motion of the supporting member.

In a third invention, the second imaging section is provided in the vicinity of the swinging axis.

That is, the swinging axis does not swing when the supporting member is swung. Therefore, by providing the second imaging section in the vicinity of the swinging axis, it is possible to acquire a second image having a lower connection with the swinging motion of the supporting member.

In a fourth invention, the swinging axis and the optical axis of the second imaging section substantially coincide with or intersect with each other.

According to this configuration, the second imaging section can be provided without swinging. Therefore, it is possible to acquire a second image which does not have a connection with the swinging motion of the second stand unit. In addition, the second imaging section can be arranged to look down at the placement unit from slightly above the swinging axis.

In a fifth invention, the shaft unit includes a hollow axis, and the second imaging section is provided in the vicinity of a radial center of the shaft unit.

That is, in many cases, a bearing member, etc., is arranged around the shaft unit, and it may be difficult to ensure a space for arranging the second imaging section. However, by making the shaft unit a hollow axis, it is possible to effectively utilize the space inside the shaft unit to arrange the second imaging section.

In a sixth invention, the magnifying observation apparatus includes a control unit which can be disposed apart from the base unit, and a cable extending from the second imaging section and transmitting imaged data from the second imaging section is connected to the control unit through the inside of the shaft unit.

According to this configuration, the space inside the shaft unit can also be utilized as a space for arranging the cable.

In a seventh invention, the second imaging section acquires a second image including the objective lens, and the magnifying observation apparatus includes a display control unit which causes the first image acquired by the first imaging section while the supporting member is in a swinging motion to be displayed simultaneously with the second image acquired by the second imaging section on the display unit.

According to this configuration, the first image obtained by observing the observation target by swinging the first imaging section can be displayed simultaneously with the second image including the objective lens. Therefore, the user can grasp the direction of the objective lens with respect to the observation target.

In an eighth invention, the display control unit causes the first image to be displayed larger than the second image.

According to this configuration, it becomes easy to observe the observation target.

A ninth invention is a magnifying observation apparatus which irradiates an observation target with illumination light and detects a light receiving amount of reflected light or transmitted light of the illumination light from the observation target to generate an image of the observation target and to display the image to enable a magnified observation, wherein the magnifying observation apparatus includes: a base unit; a placement unit, which is supported by the base unit, for placing the observation target; an objective lens on which the reflected light or the transmitted light of the illumination light from the observation target is incident; a first imaging section which receives the reflected light or the transmitted light through the objective lens to acquire a first image; a second imaging section which faces the placement unit or the observation target such that an optical axis of the first imaging section is included in a visual field, has an optical axis different from the optical axis of the first imaging section, and acquires a second image including the placement unit; a supporting member which supports the objective lens, the first imaging section, and the second imaging section, and swings the objective lens around a swinging axis orthogonal to the optical axis of the first imaging section; a leveling unit which causes the placement unit of the second image captured by the second imaging section to be substantially horizontal in a state in which the supporting member swings; and a display unit capable of displaying the second image in which the placement unit is made substantially horizontal by the leveling unit when the second imaging section acquires the second image in a state in which the supporting member swings.

That is, in acquiring a second image by the second imaging section, when the supporting member is swinging, the placement unit tilts corresponding to the swinging angle of the supporting member in the second image acquired by the second imaging section. The second image is displayed on the display unit after the placement unit becomes substantially horizontal by the leveling unit. Therefore, it is possible to make the second image an image with less discomfort when the observation target is observed from a plurality of different angles.

In a tenth invention, the leveling unit performs image processing of rotating the second image so that the placement unit of the second image becomes substantially horizontal.

According to this configuration, it is possible to obtain a second image in which the placement unit is substantially horizontal by performing image processing without providing a special mechanism.

In an eleventh invention, the leveling unit is configured such that a horizontal direction of the second imaging section before swinging is maintained in a horizontal state when the supporting member swings.

According to this configuration, the horizontal direction of the second imaging section before swinging can be maintained in a horizontal state. Therefore, it is possible to obtain a second image in which the placement unit is substantially horizontal without a need for image processing.

In a twelfth invention, the magnifying observation apparatus includes an objective lens driving unit which moves the objective lens in a direction towards and away from the placement unit, and the objective lens driving unit moves the second imaging section in the same direction as the objective lens.

According to this configuration, the objective lens and the second imaging section can be moved in the same direction. Therefore, it is possible to acquire a second image in which a positional relation between the objective lens and the observation target and a positional relation between the objective lens and the placement unit can be grasped.

In a thirteenth invention, the magnifying observation apparatus includes an objective lens driving unit which moves the objective lens in a direction towards and away from the placement unit, and the second imaging section is attached to a member which does not move when the objective lens is driven by the objective lens driving unit.

According to this configuration, it is possible not to move the second imaging section when the objective lens is moved. As a result, for example, a second image including the placement unit can be acquired by the second imaging section even if the objective lens is away from the placement unit.

In a fourteenth invention, the placement unit includes an electric placement table which moves the observation target in a direction towards and away from the objective lens.

In a fifteenth invention, the leveling unit is configured to perform, besides image processing of rotating the second image, trimming processing so as to form a substantially rectangular image which is long in the horizontal direction and which includes the placement unit.

That is, when the second image acquired by the second imaging section is kept rotated, it becomes an image different from a horizontally long rectangular shape which is the shape of a general display unit and there is discomfort. However, by performing the trimming processing, it is possible to have an image shape corresponding to the shape of the display unit.

In a sixteenth invention, the second imaging section is provided to image the placement unit from a side opposite to a user side, and the magnifying observation apparatus includes an image processing unit which causes an image acquired by the second imaging section to be displayed on the display unit with the left and right inverted.

According to this configuration, the second imaging section is provided on a side opposite to the user side, and thus a layout can be made so as not to disturb the user. In this case, since the second imaging section captures an image from the side opposite to the user side, the relation between the left and right becomes opposite to that viewed from the user side. However, by displaying the image acquired by the second imaging section on the display unit with the left and right inverted, the left and right direction of the second image can be made to coincide with that viewed from the user side.

A seventeenth invention is a magnifying observation apparatus which irradiates an observation target with illumination light and detects a light receiving amount of reflected light or transmitted light of the illumination light from the observation target to generate an image of the observation target and to display the image to enable a magnified observation, wherein the magnifying observation apparatus includes: a base unit; a placement unit, which is supported by the base unit, for placing the observation target; an objective lens on which the reflected light or the transmitted light of the illumination light from the observation target is incident; a first imaging section which receives the reflected light or the transmitted light through the objective lens to acquire a first image; a supporting member including a first stand unit supported by the base unit and positioned at a side close to the base unit, a second stand unit positioned at a side far from the base unit and supporting the objective lens and the first imaging section, and a shaft unit which swings the second stand unit around a swinging axis with respect to the first stand unit; a second imaging section which is provided at a position at the same height as or higher than the shaft unit when viewed from the base unit, and is provided to face the placement unit or the observation target such that an optical axis of the first imaging section is included in a visual field and to have an optical axis different from the optical axis of the first imaging section, and to acquire a second image including the placement unit; and a display unit capable of displaying the first image acquired by the first imaging section and the second image acquired by the second imaging section.

According to the invention, it is possible to observe an observation target from a plurality of different angles. Moreover, it is possible to acquire and display a second image including a placement unit separately from a first image for observation, and to make the second image an image with less discomfort.

DESCRIPTION OF EMBODIMENTS

Embodiments of the invention are explained in detail below with reference to the drawings. However, the following description of the preferred embodiments is merely illustrative in nature, and is not intended to limit the invention, its applications, or its use.

Embodiment 1

Figure 1:
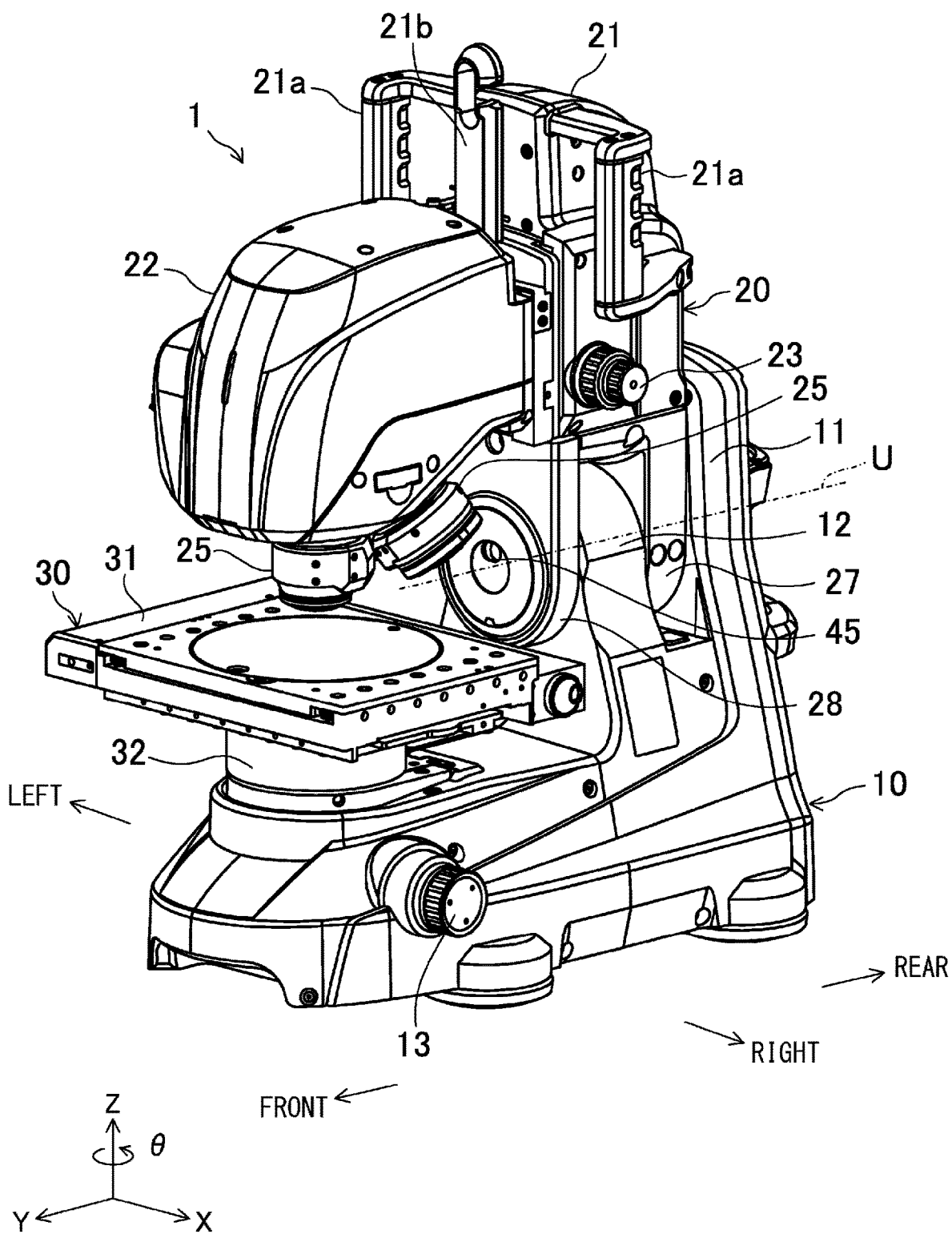
FIG. 1 is a perspective view of an observation unit of a magnifying observation apparatus according to Embodiment 1 of the invention as viewed from the front.
Figure 2:
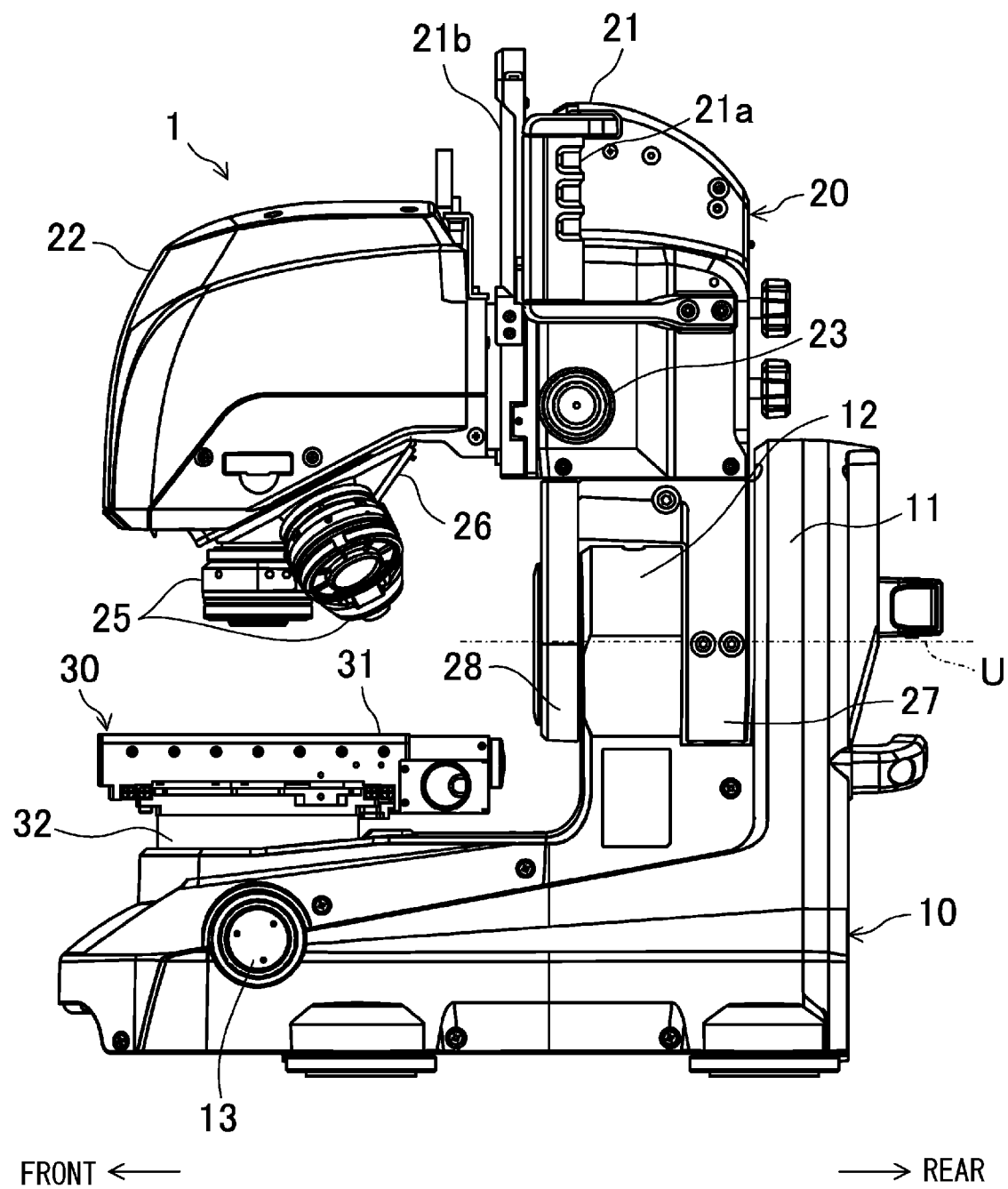
FIG. 2 is a right side view of the observation unit of the magnifying observation apparatus according to Embodiment 1 of the invention.
Figure 3:
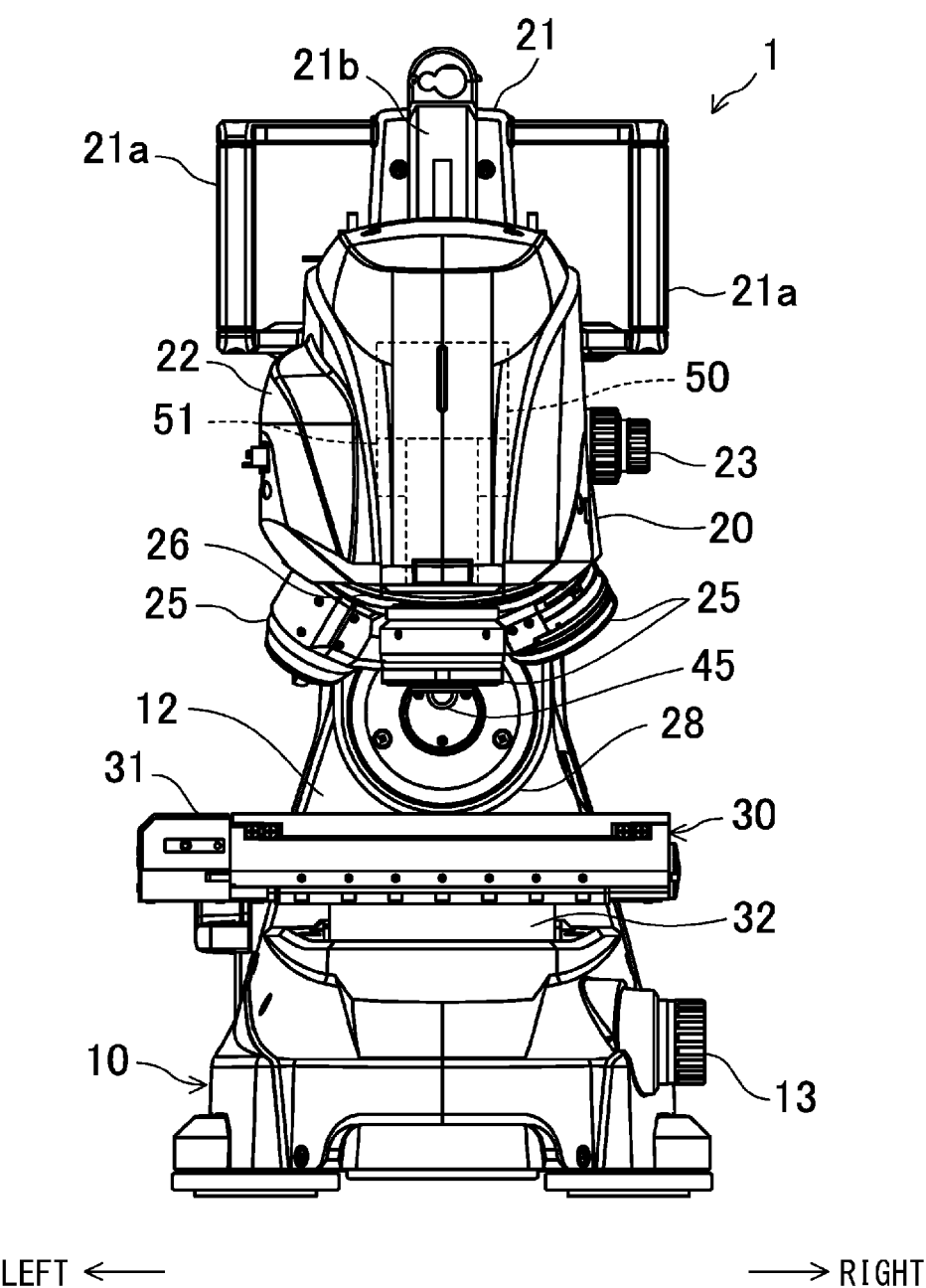
FIG. 3 is a front view of the observation unit of the magnifying observation apparatus according to Embodiment 1 of the invention.
Figure 4:
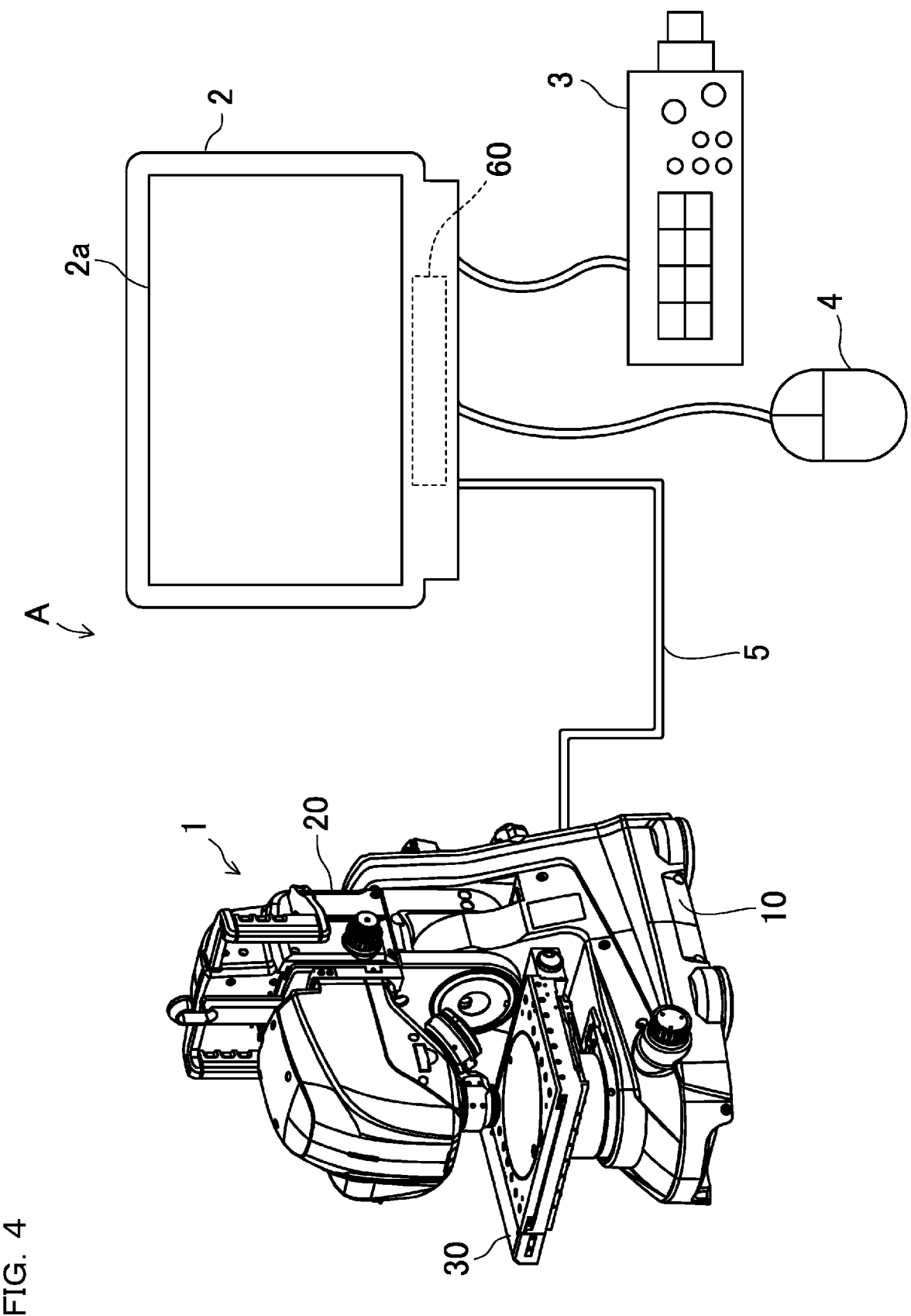
FIG. 4 is a diagram showing an entire configuration of the magnifying observation apparatus according to Embodiment 1 of the invention.

FIGS. 1 to 3 show an observation unit 1 of a magnifying observation apparatus according to Embodiment 1 of the invention, and FIG. 4 is a diagram showing an entire configuration of a magnifying observation apparatus A according to Embodiment 1 of the invention. The magnifying observation apparatus A magnifies and displays, for example, a sample of a micro object and the like, an electronic component, or work such as workpiece (hereinafter referred to as an observation target), and thus is used for a user to inspect the appearance of the observation target and to conduct a dimension measurement. The magnifying observation apparatus A can also be called, for example, simply a microscope, or a digital microscope. The observation target is not limited to the aforementioned examples, and various objects can be used as the observation target. Specifically, the magnifying observation apparatus A is configured to irradiate the observation target placed on a placement unit 30 with illumination light and detect a light receiving amount of reflected light or transmitted light of the illumination light from the observation target to generate an image of the observation target and to display the image to enable a magnified observation.

Figure 17:
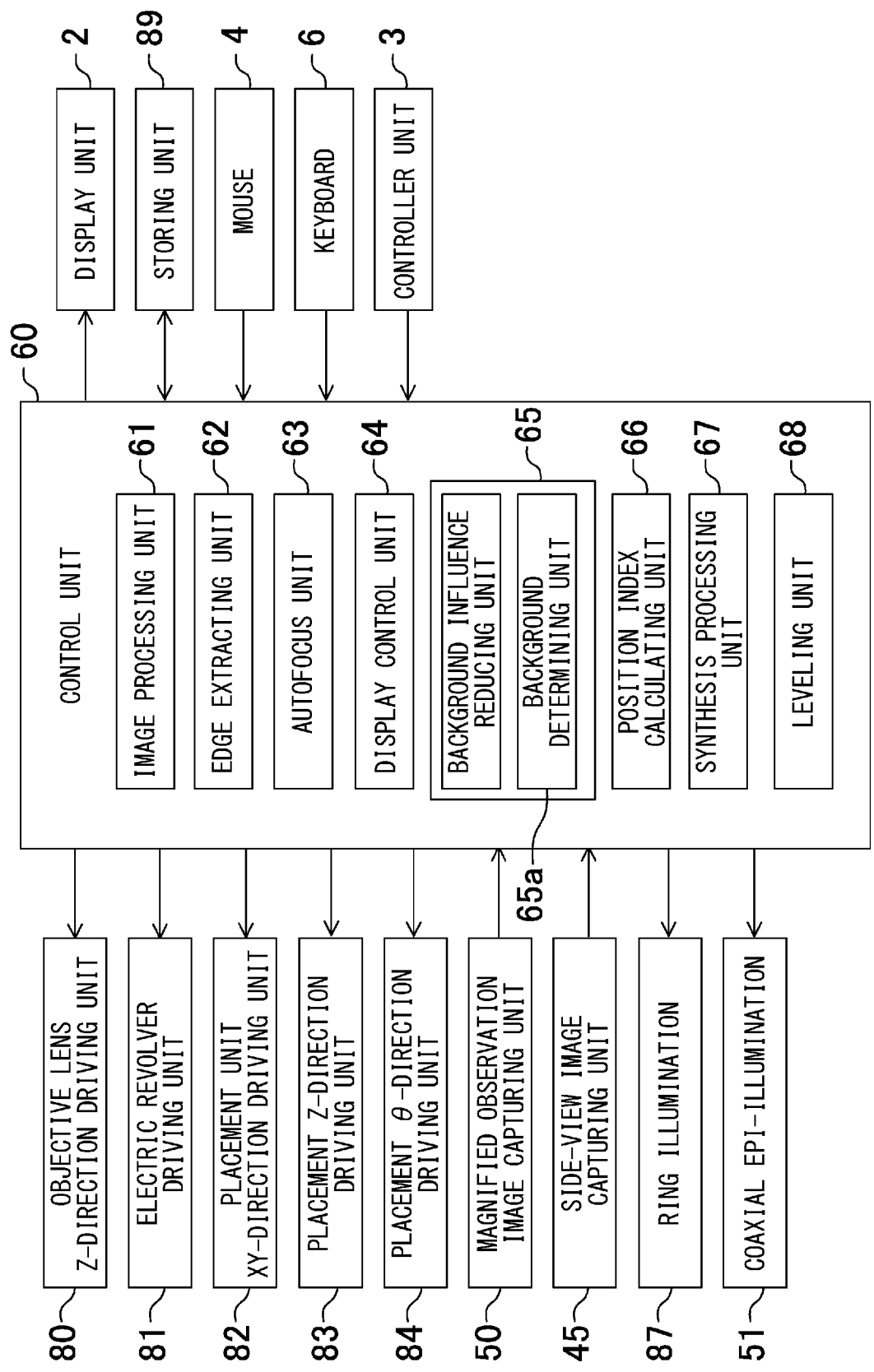
FIG. 17 is a block diagram of a magnifying observation apparatus.

As shown in FIG. 4, the magnifying observation apparatus A includes an observation unit 1, a display unit 2, a controller unit 3, a mouse 4, a keyboard 6 only shown in FIG. 17, and a control unit 60. The observation unit 1 is a part that images the observation target, and it is possible to image the observation target by a magnified observation image capturing unit 50 shown by a broken line in FIG. 3.

The display unit 2 is a part that displays the image captured by the observation unit 1. The controller unit 3, the mouse 4, and the keyboard 6 are members for operating the magnifying observation apparatus; it is not necessary to include them all, and it is possible to include any one or two of them. The controller 3, the mouse 4, and the keyboard 6 may be, for example, a touch panel type input device, a voice input device, etc., as long as they can operate the magnifying observation apparatus A. In the case of the touch panel type input device, it can be integrated with the display unit 2, and can be configured to make it possible to detect an arbitrary position on a display screen displayed on the display unit 2. The controller 3, the mouse 4, and the keyboard 6 are receiving units which receive an input of an arbitrary position designated by the user on the image displayed on the display unit 2.

Configuration of Observation Unit 1

As shown in FIGS. 1 to 3, the observation unit 1 includes a base unit 10, a stand unit 20 to which an objective lens 25 is attached, and a placement unit 30. In the description of the present embodiment, as shown in FIGS. 1 to 3, the front-rear direction and the left-right direction of the observation unit 1 are defined. That is, the side facing the user is the front side of the observation unit 1, the opposite side is the rear side of the observation unit 1, the right side seen from the user is the right side of the observation unit 1, and the left side seen from the user is the left side of the observation unit 1. The definitions of the front-rear direction and the left-right direction are for helping the understanding of the description; they are not intended to limit the actual use condition, and may be used such that any direction may be the front.

As shown in FIG. 1, the X direction is defined as the left-right direction of the observation unit 1, the Y direction is defined as the front-rear direction of the observation unit 1, the Z direction is defined as the vertical direction of the observation unit 1, and the direction of rotating about an axis parallel to the Z axis is defined as a θ direction. The X direction and the Y direction are orthogonal to each other on the same horizontal plane. The Z axis is a direction of a normal line orthogonal to this plane. The optical axis of the magnified observation image capturing unit 50 is in the Z-axis direction.

Figure 6:
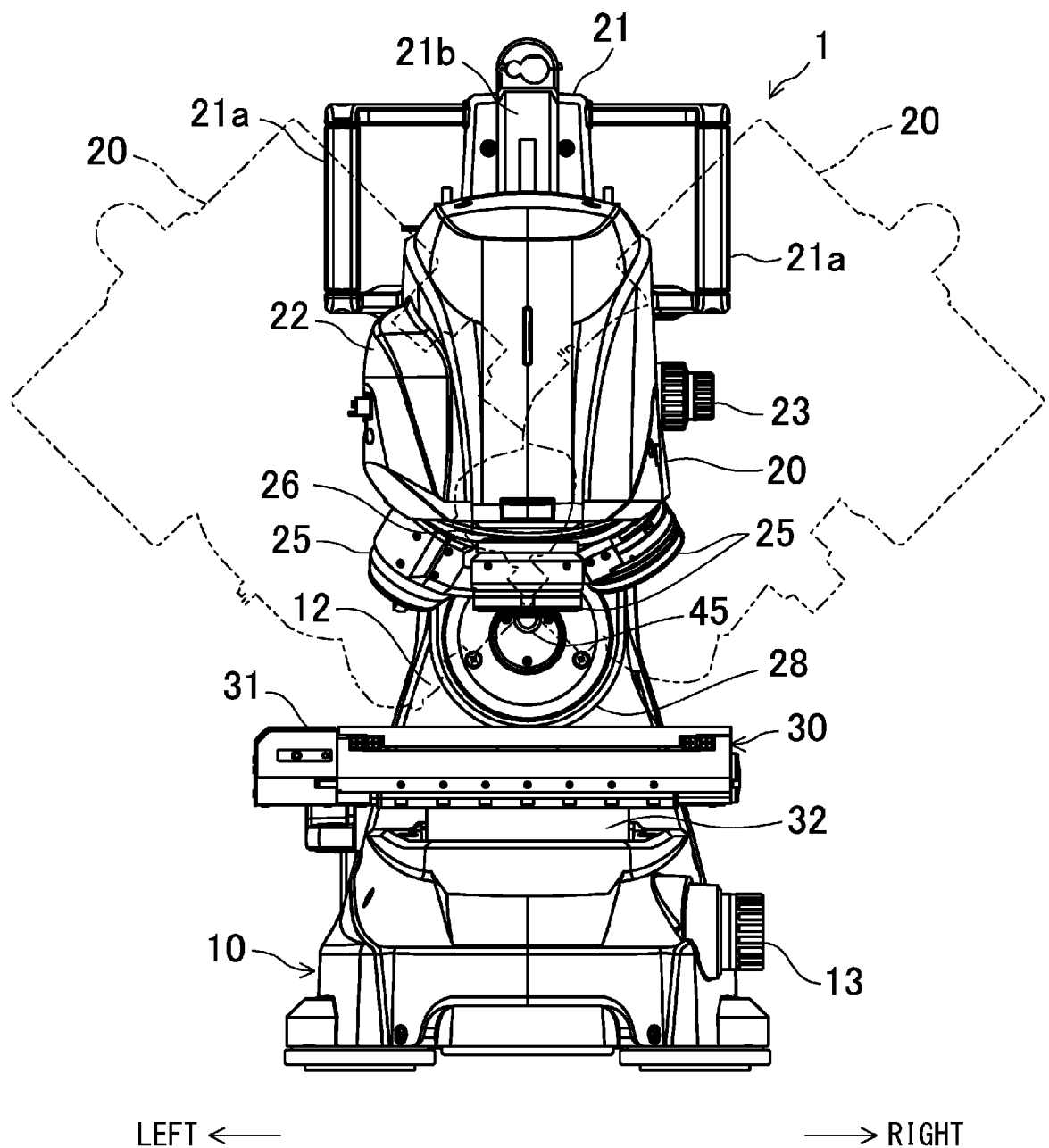
FIG. 6 is a diagram corresponding to FIG. 3 showing a state in which a stand is swung left and right.

Further, although the detail will be described later, the stand unit 20 can swing around an axis U shown in FIG. 1 and FIG. 2 with respect to the base unit 10 (see FIG. 6). The axis U is orthogonal to the optical axis of the magnified observation image capturing unit 50 and extends in the front-rear direction of the observation unit 1, and is an axis parallel to the Y axis.

The base unit 10 is a part for keeping the observation unit 1 on a desk and the like without shaking the observation unit 1, and is included in a substantially lower half portion of the observation unit 1. As shown in FIG. 1 and FIG. 2, the base unit 10 is provided with the placement unit 30. The placement unit 30 is supported by a portion at the front side from the vicinity of the central portion in the front-rear direction of the base unit 10, and protrudes upward from the base unit 10. The placement unit 30 is a part for placing an observation target, and in this embodiment, it includes an electric placement table. That is, it is possible to support an observation target with the observation target movable in both the width direction (X direction) and the depth direction (Y direction) of the electric placement table and rotatable in the vertical direction (Z direction) and about the Z axis, and the placement unit 30 includes a placement table 31, a placement table supporting unit 32, a placement unit XY-direction driving unit 82 shown in FIG. 17, a placement unit Z-direction driving unit 83, and a placement unit θ-direction driving unit 84. The placement table 31 is formed such that the upper surface (also referred to as a placement surface) of the placement table 31 extends substantially horizontally, and the observation target is placed on the upper surface. The placement table 31 can also be called a stage. The observation target is placed on the placement table 31 in an atmospheric open state, that is, in a state in which it is not accommodated in a vacuum chamber or the like.

The placement table supporting unit 32 is a part coupling the placement table 31 and the base unit 10, and is configured to be capable of accommodating the placement unit XY-direction driving unit 82, the placement unit Z-direction driving unit 83, and the placement unit θ-direction driving unit 84, etc. The placement unit XY-direction driving unit 82 and the placement unit Z-direction driving unit 83 respectively include an actuator not shown in the drawings such as a stepping motor controlled by the control unit 60, and a motion conversion mechanism which converts the rotation of an output axis of the stepping motor into a linear motion, and the placement unit XY-direction driving unit 82 and the placement unit Z-direction driving unit 83 respectively move the placement table 31 based on a drive pulse output from the control unit 60. The placement table 31 can be moved by the placement unit Z-direction driving unit 83 and an objective lens Z-axis direction driving unit 80 in a direction towards an objective lens 25 (upward direction) and a direction away from the objective lens 25 (downward direction). By moving the placement table 31 in the vertical direction by the placement unit Z-direction driving unit 83, the observation target placed on the placement table 31 is also moved in the same manner.

The placement unit θ-direction driving unit 84 includes an actuator not shown in the drawings such as a stepping motor controlled by the control unit 60. The placement unit XY-direction driving unit 82 moves the placement table 31 in the X direction and the Y direction, the placement unit Z-direction driving unit 83 moves the placement table 31 in the Z direction, and the placement unit θ-direction driving unit 84 moves the placement table 31 in the θ direction. The placement unit θ-direction driving unit 84 may also be omitted. Moreover, the placement table 31 can be moved manually in the Z direction by a Z-axis direction operation dial 13 shown in FIG. 1, for example. Although not shown, the placement table 31 can also be moved manually in the X direction and the Y direction, as well as the θ direction.

Figure 5:
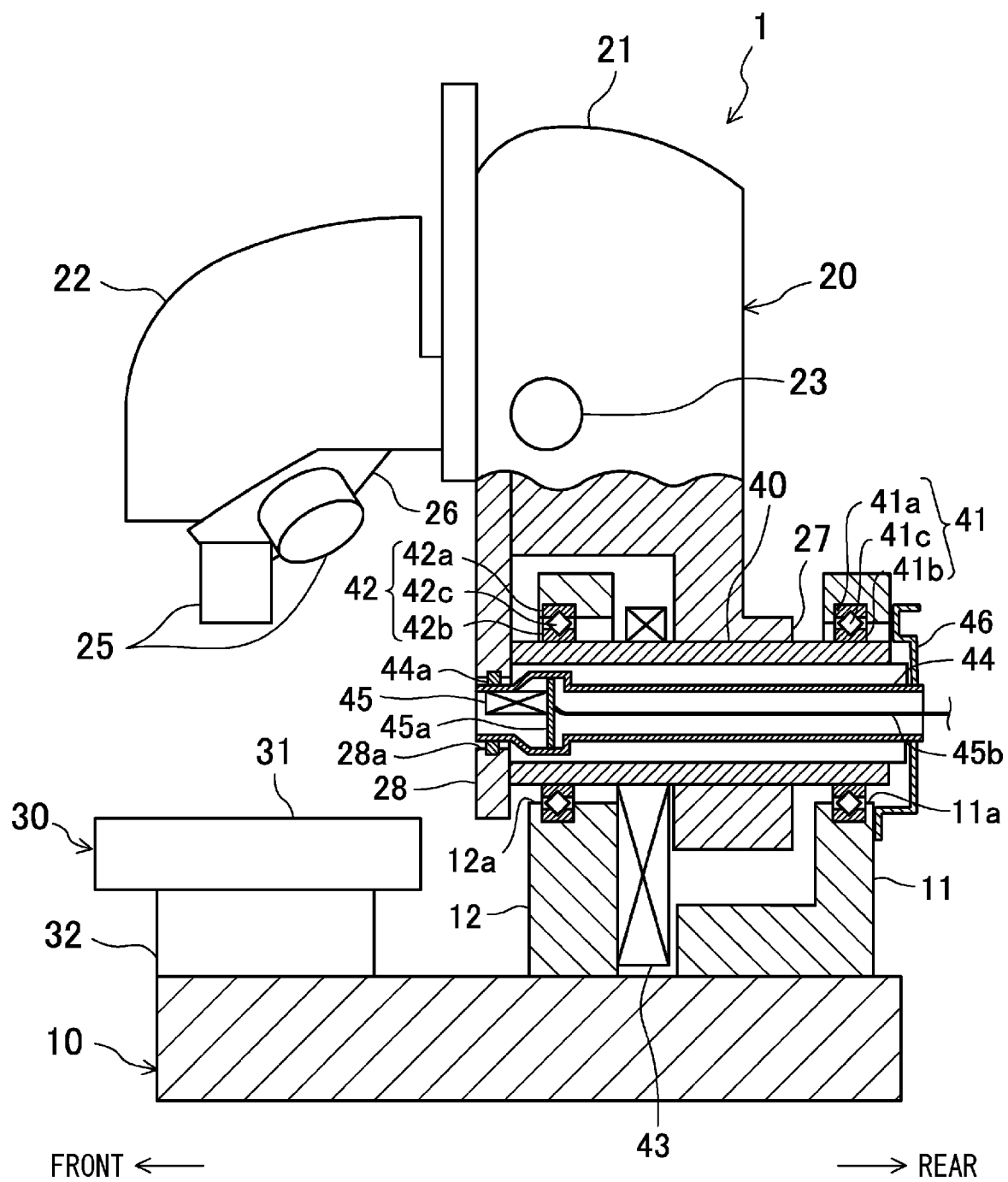
FIG. 5 is a partial cross-sectional view showing a schematic configuration of the observation unit of the magnifying observation apparatus as viewed from the right side.

As shown in FIG. 5, a rear side supporting unit 11 and a front side supporting unit 12 are provided protruding upward on the rear side of the base portion 10 behind the placement table 31. The rear side supporting unit 11 and the front side supporting unit 12 are a first stand unit positioned at a side close to the base unit 10. The rear side supporting unit 11 and the front side supporting unit 12 are disposed at an interval in the front-rear direction. A circular rear side bearing hole 11a is formed in the rear side supporting unit 11 to penetrate the rear side supporting unit 11 in the front-rear direction. A front side bearing hole 12a is formed on the front side supporting unit 12 in the same manner, and the rear side bearing hole 11a and the front side bearing hole 12a have centers on the same axis U (shown in FIG. 2, etc.) and are positioned concentrically.

As shown in FIG. 2, etc., the stand unit 20 includes a stand main body 21 and a head unit 22, and is included in a substantially upper half portion of the observation unit 1. The stand unit 20 is a second stand unit positioned at a side far from the base unit 10 and supporting the objective lens and the first imaging section. The head unit 22 is attached so as to be vertically movable, that is, movable in the Z-axis direction, by a guiding member 21b extending in the vertical direction with respect to the stand main body 21. The head unit 22 is disposed to face an upper surface of the placement table 31, and a revolver 26 to which a plurality of objective lenses 25 can be attached is provided on the lower side portion in the head unit 22, that is, the portion facing the upper surface of the placement table 31. The revolver 26 may be a conventionally known electric revolver, and may also be a manual revolver.

A plurality of lens attachment holes (not shown) are formed on the lower surface of the revolver 26 around the rotation axis of the revolver 26. The objective lenses 25 having different magnifications can be detachably attached to these lens attachment holes. In general, the objective lenses 25 having different magnifications have different lengths and outer diameters. Reflected light reflected by the surface of the observation target or transmitted light transmitted through the observation target placed on the placement table 31 is incident on an objective lens 25 at a usable position. The optical axis of the objective lens 25 at the usable position is parallel to the Z axis.

The objective lenses 25 to which various attachments are attached can also be detachably attached to the lens attachment holes of the revolver 26. The attachments include, for example, a deflection attachment, a diffusion attachment, a ring illumination attachment, etc.; however, they are not limited thereto, and various attachments can be attached to the tip end portions of the objective lenses 25. A ring illumination 87 may be provided in the head unit 22, and it is controlled to be ON and OFF by the control unit 60 while its brightness is also controlled. The ring illumination 87 is non-coaxial epi-illumination disposed to surround the objective lens 25 and illuminates an observation target 100 from around the optical axis of the objective lens 25.

The head unit 22 is provided with an electric revolver driving unit 81 shown in FIG. 17. The electric revolver driving unit 81 is a part that rotationally drives the revolver 26 to rotate around the rotation axis. The electric revolver driving unit 81 includes an actuator not shown in the drawings such as a stepping motor controlled by the control unit 60, and rotates the revolver 26 based on a drive pulse output from the control unit 60. As a result, switching to the objective lens 25 selected by the user through the operation of the receiving unit is automatically performed.

The stand main body 21 or the head unit 22 is provided with the objective lens Z-direction driving unit 80 (shown in FIG. 17) for moving the head unit 22 in the Z direction. Since the objective lens 25 is attached to the head unit 22, the objective lens Z-direction driving unit 80 moves the objective lens 25 in a direction towards the placement table 31 and in a direction away from the placement table 31. The objective lens Z-direction driving unit 80 includes an actuator not shown in the drawings such as a stepping motor controlled by the control unit 60, and a motion conversion mechanism which converts the rotation of an output axis of the stepping motor into a linear motion in the vertical direction, and the objective lens Z-direction driving unit 80 moves the head unit 22 based on a drive pulse output from the control unit 60. The objective lens 25 is moved in the vertical direction by rotating the stepping motor of the objective lens Z-direction driving unit 80, and in this way a relative distance between the objective lens 25 and the placement table 31 can be changed. The objective lens Z-direction driving unit 80 has such a precision that a changing pitch of the relative distance between the objective lens 25 and the placement table 31 can be set to about 1 nm at a minimum. In addition, the objective lens 25 can be moved manually in the Z direction by a Z-axis direction operation dial 23 shown in FIG. 1, for example.

Although not shown, the head unit 22 includes a linear scale (linear encoder) and the like that can detect the relative distance between the objective lens 25 and the placement table 31. The linear scale is configured to be capable detecting the relative distance even if the change in the relative distance between the objective lens 25 and the placement table 31 is 1 nm. The detection result of the linear scale is output to the control unit 60.

The head unit 22 is provided with the magnified observation image capturing unit 50. The magnified observation image capturing unit 50 is a first imaging section that receives reflected light reflected by the surface of the observation target or transmitted light transmitted through the observation target placed on the placement table 31 via the objective lens 25 to acquire a first image. The first image is also referred to as a magnified observation image for observing the observation target.

The magnified observation image capturing unit 50 is provided in the head unit 22 such that the optical axis of the magnified observation image capturing unit 50 coincides with the optical axis of the objective lens 25, that is, parallel to the Z axis. The magnified observation image capturing unit 50 includes, for example, an image sensor such as a CMOS (complementary metal oxide semiconductor) and a CCD (charge coupled device), and has a plurality of light receiving elements two-dimensionally arranged.

The head unit 22 is provided with a co-axial epi-illumination 51 (shown in FIG. 17). The co-axial epi-illumination 51 is an illumination unit functioning as a light resource for illuminating the observation target via the objective lens 25, and the co-axial epi-illumination 51 illuminates an observation surface of the observation target such that an illumination light path is positioned on the optical axis of the objective lens 25. Although not shown, the co-axial epi-illumination 51 includes, for example, a light emitting body such as an LED, and also includes a collector, a relay lens, a mirror, and a lens on which light of the light emitting body is incident. After the light of the light emitting body passes through the collector and the relay lens, the direction of the light of the light emitting body is changed by the mirror, and then the light is incident on the lens. The direction of the light emitted from the lens is changed to the direction of the observation target by a half mirror. Then, the light is irradiated on an observation optical axis of the objective lens 25 to illuminate the observation target. ON, OFF, and a light amount during ON of the co-axial epi-illumination 51 are controlled by the control unit 60 which will be described later. The co-axial epi-illumination 51 is suitable for observing a mirror surface or an observation surface similar to the mirror surface, and the co-axial epi-illumination 51 has an advantage that a difference in reflectance of the observation surface can be observed at high contrast.

Moreover, although not shown, the observation unit 1 is equipped with a conventionally known transmitted illumination. The transmitted illumination is illumination used when the observation target has light transmissivity, and the transmitted illumination is configured to emit light toward the observation target from under the placement table 31.

As shown in FIG. 5, a rear side attaching unit 27 and a front side attaching unit 28 are provided at the lower portion of the stand main body 21 so as to protrude downward. The rear side attaching unit 27 and the front side attaching unit 28 are disposed at an interval in the front-rear direction. The rear side attaching unit 27 of the stand main body 21 is disposed between the rear side supporting unit 11 and the front side supporting unit 12 of the base unit 10. The front side attaching unit 28 of the stand main body 21 is disposed in front of the front side supporting unit 12 of the base unit 10. A swinging axis (shaft unit) 40 is fixed to the rear side attaching unit 27 so as not to be relatively rotatable. In this example, a supporting member includes the first stand unit, the second stand unit, and the swinging axis 40.

The swinging axis 40 is a hollow axis which is hollow inside, and protrudes to the front and the rear from the rear side attaching unit 27. An axial center of the swinging axis 40 is located on the axis U (shown in FIG. 2, etc.). A front end portion of the swinging axis 40 is fixed to the front side attaching unit 28 of the stand main body 21. By fixing the front side attaching unit 28 of the stand main body 21 to the front end portion of the swinging axis 40, a front side of the heavy stand unit 20 can be supported to stabilize the stand unit 20, and eventually, shaking of the head unit 22 can be suppressed.

The swinging axis 40 is supported rotatably around the axis U with respect to the base unit 10 by a rear side bearing 41 and a front side bearing 42. The rear side bearing 41 and the front side bearing 42 may include, for example, a cross roller bearing, etc. An outer ring member 41a of the rear side bearing 41 is fitted in a rear side bearing hole 11a of the rear side supporting unit 11 of the base unit 10. The vicinity of the rear end portion of the swinging axis 40 is inserted into an inner ring member 41b of the rear side bearing 41, and the inner ring member 41b is fixed to the swinging axis 40. A plurality of rollers 41c are provided rollably between the outer ring member 41a and the inner ring member 41b. In addition, an outer ring member 42a of the front side bearing 42 is fitted in a front side bearing hole 12a of the front side supporting unit 12 of the base unit 10. The vicinity of the front end portion of the swinging axis 40 is inserted into an inner ring member 42b of the front side bearing 42, and the inner ring member 42b is fixed to the swinging axis 40. A plurality of rollers 42c are provided rollably between the outer ring member 42a and the inner ring member 42b.

In a word, since the stand unit 20 includes the head unit 22 supporting the objective lens 25 and the magnified observation image capturing unit 50, the objective lens 25 and the magnified observation image capturing unit 50 are attached to the stand unit 20. Then, since the stand unit 20 including the head unit 22 is supported by the base unit 10 so as to be swingable around the swinging axis 40 orthogonal to the optical axis of the magnified observation image capturing unit 50, as shown by virtual lines in FIG. 6, the stand unit 20 swings in a left-right direction of the observation unit 1.

As shown in FIG. 5, a brake mechanism 43 is fixed to the base unit 10. The brake mechanism 43 is a mechanism for applying a braking force to the swinging axis 40 to make the swinging axis 40 not rotatable around the axis U, and may be, for example, a conventionally known brake mechanism configured to be switchable between a state in which a tightening force is applied to the swinging axis 40 and a state in which the tightening force is not applied. Although an operation of the brake mechanism 43 is not shown in the drawings, it can be performed by a user via a lever operation from the outside. By operating the brake mechanism 43 such that the braking force does not act, the swinging axis 40 can rotate about the axis U. By operating the brake mechanism 43 such that the braking force acts, the swinging axis 40 can be stopped at any rotation position and this stopped state can be maintained. The lever for operating the brake mechanism 43 is provided with a lock mechanism for preventing the brake from being released unexpectedly.

Figure 7:
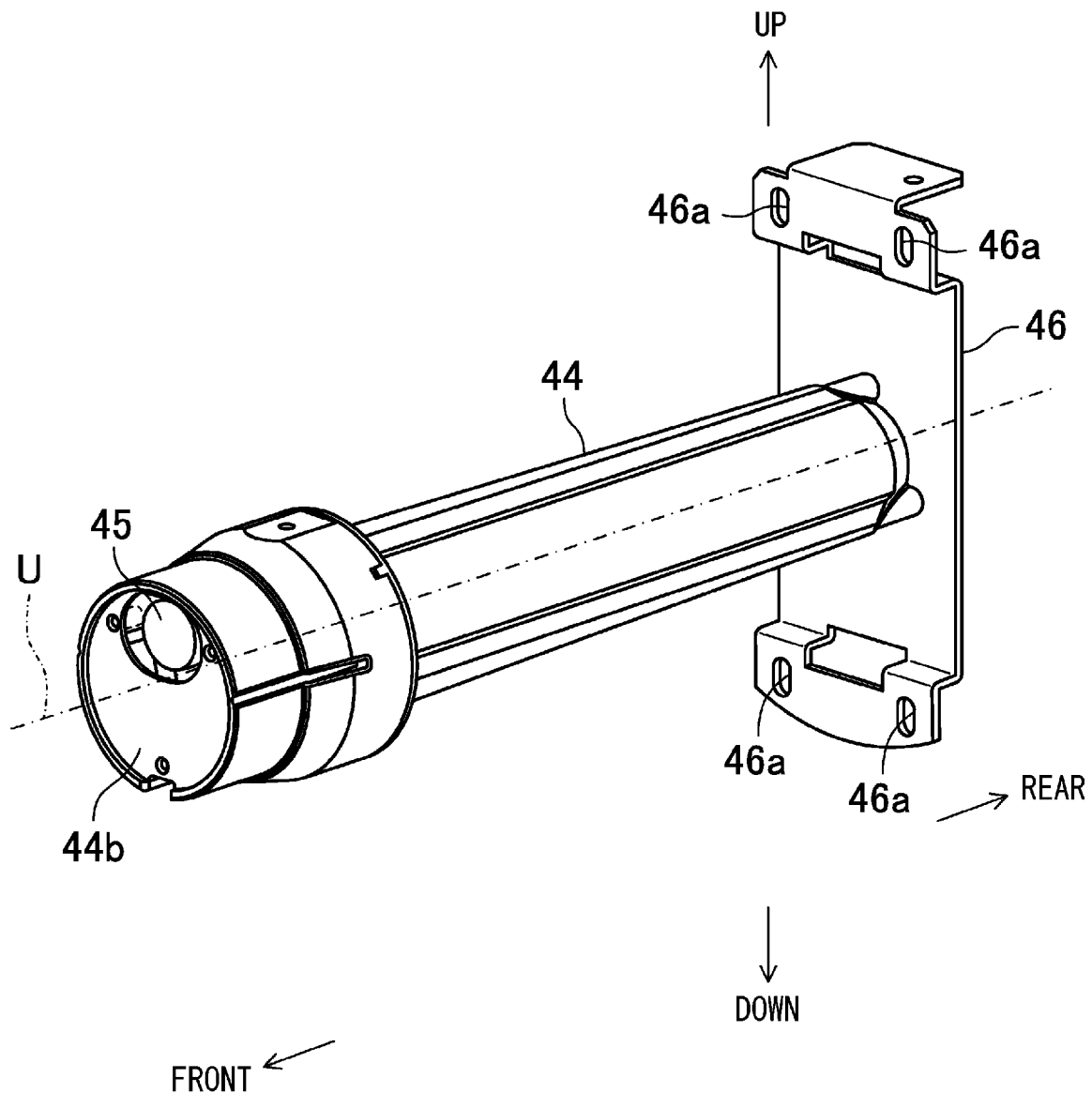
FIG. 7 is a perspective view showing the configuration of a side-view image capturing unit, a cylindrical member, and a fixing bracket.

A cylindrical member 44 is provided inside the swinging axis 40. The cylindrical member 44 is formed in a cylindrical shape, is disposed concentrically with the axial center of the swinging axis 40, that is, the axis U, and extends in the same direction as the swinging axis 40. A fixing bracket 46 is fixed to a rear end portion of the cylindrical member 44. As shown in FIG. 7, the fixing bracket 46 is formed to be long in the vertical direction, and its upper portion and lower portion are respectively provided with holes 46a for fastening and fixing. A fastening member such as a screw and a bolt is inserted through each hole 46a, and the fixing bracket 46 is fixed to the rear side supporting unit 11 of the base unit 10 by the fastening members.

As shown in FIG. 5, a front end portion of the cylindrical member 44 is inserted into a through hole 28a formed in the front side attaching unit 28 of the stand main body 21. A seal member 44a is disposed between an outer peripheral surface of the front end portion of the cylindrical member 44 and an inner peripheral surface of the through hole 28a of the front side attaching unit 28, and via this seal member 44a, the front end portion of the cylindrical member 44 is supported to be rotatable with respect to the inner peripheral surface of the through hole 28a of the front side attaching unit 28.

Inside the cylindrical member 44, a side-view image capturing unit (a second imaging section) 45 is provided to face the placement unit 30 or the observation target and to have an optical axis (parallel to the Y axis) different from the optical axis of the magnified observation image capturing unit 50 (parallel to the Z axis). The side-view image capturing unit 45 is provided at a position at the same height as or higher than the swinging axis 40 when viewed from the base unit 10, and is provided such that an optical axis of the first imaging section is included in a visual field.

The swinging axis 40 can suppress the shaking of the head unit 22 (improve vibration resistance) because it is easy to ensure rigidity by increasing the diameter of the swinging axis 40. However, on the other hand, ensuring a space for arranging such a swinging axis 40 having a large diameter becomes a problem, and there is a concern that other problems may occur, for example, it becomes difficult to arrange the side-view image capturing unit 45 around the swinging axis 40. In the present example, the swinging axis 40 is a hollow axis and the inside can be used as a space for arranging the side-view image capturing unit 45 and a cable 45b. Therefore, it is possible to reduce dead space when the swinging axis 40 having a large diameter is used.

Similar to the magnified observation image capturing unit 50, the side-view image capturing unit 45 includes an image sensor such as a CMOS and a CCD and has a substrate 45a. The substrate 45a is fixed to the inside of the cylindrical member 44 in a posture extending in the vertical direction. The side-view image capturing unit 45 is fixed to the front surface of the substrate 45a.

The cable 45b, which transmits imaged data from the side-view image capturing unit 45 to the control unit 60, is provided. The cable 45b extends from the side-view image capturing unit 45, passes through the inside of the cylindrical member 44, that is, the inside of the swinging axis 40, and goes from the rear side of the cylindrical member 44 to the outside to be connected to the control unit 60. As in this embodiment, in many cases a bearing member, etc., is provided around the swinging axis 40, and it is difficult to ensure a space for arranging the side-view image capturing unit 45 around the swinging axis 40. However, by making the swinging axis 40 a hollow axis, it is not only possible to effectively utilize the space inside the swinging axis 40 to arrange the side-view image capturing unit 45 but also to utilize the space inside the swinging axis 40 as a space for arranging the cable 45b. As shown in FIG. 7, a blocking plate 44b for blocking a portion other than the portion where the side-view image capturing unit 45 faces is provided at the front end portion of the cylindrical member 44.

The side-view image capturing unit 45 is provided in the vicinity of the swinging axis 40, and an optical axis of the side-view image capturing unit 45 is positioned above the upper surface of the placement table 31 and above the axis U. As a result, the observation target can be imaged in a depth direction of the placement table 31 by the side-view image capturing unit 45, and it is possible to acquire a second image including at least the observation target placed on the placement table 31. Further, a second image including at least a lower end portion of the objective lens 25 can be acquired by the side-view image capturing unit 45, and a second image including the upper surface of the placement table 31, the observation target, and the lower end portion of the objective lens 25 which is observing the observation target can be acquired. When a plurality of objective lenses 25 are attached to the revolver 26, it is also possible to acquire a second image including the plurality of objective lenses 25 by the side-view image capturing unit 45. The second image is also referred to as a side-view image because it is an image of the observation target or the placement table 31 viewed from the side.

Since the optical axis of the side-view image capturing unit 45 is positioned above the center of the swinging axis 40, a range in which the placement table 31 is reflected in the side-view image can be reduced during eucentric observation. Details of the eucentric observation will be described later.

The optical axis of the side-view image capturing unit 45 and the swinging axis 40 may be provided such that their centers substantially coincide with each other. In addition, the side-view image capturing unit 45 can be provided in the vicinity of a radial center of the swinging axis 40.

Since the side-view image capturing unit 45 is provided to face the placement table 31 in the rear as compared with the placement table 31, the side-view image capturing unit 45 is provided to image the placement table 31 from a side opposite to the user side. The swinging axis 40 is provided on the base unit 10, and thus the side-view image capturing unit 45 is provided on a member which does not move when the objective lens 25 is driven by the objective lens Z-axis direction driving unit 80. When the objective lens 25 is driven by the objective lens Z-axis direction driving unit 80, the side-view image capturing unit 45 does not move. Further, since the cylindrical member 44 is fixed to the base unit 10 by the fixing bracket 46, the cylindrical member 44 is a member that does not swing when the stand unit 20 is swung; the cylindrical member 44 becomes a non-swinging portion. As a result, the side-view image capturing unit 45 is provided on a non-swinging portion. Therefore, the side-view image capturing unit 45 can acquire a side-view image including the placement table 31 in a state in which a connection with a swinging motion of the stand unit 20 is eliminated.

Further, a position adjustment mechanism which adjusts an attachment position of the side-view image capturing unit 45 may be provided. The position adjustment mechanism can adjust the side-view image capturing unit 45 in the X direction, the Z direction, and a rotational direction around the axis U. The attachment position of the side-view image capturing unit 45 is preferably done before out-of-factory shipping.

Moreover, a focal distance of the side-view image capturing unit 45 is set to be longer than a focal distance of the magnified observation image capturing unit 50. The reason thereof will be described later.

Embodiment 2

Figure 8:
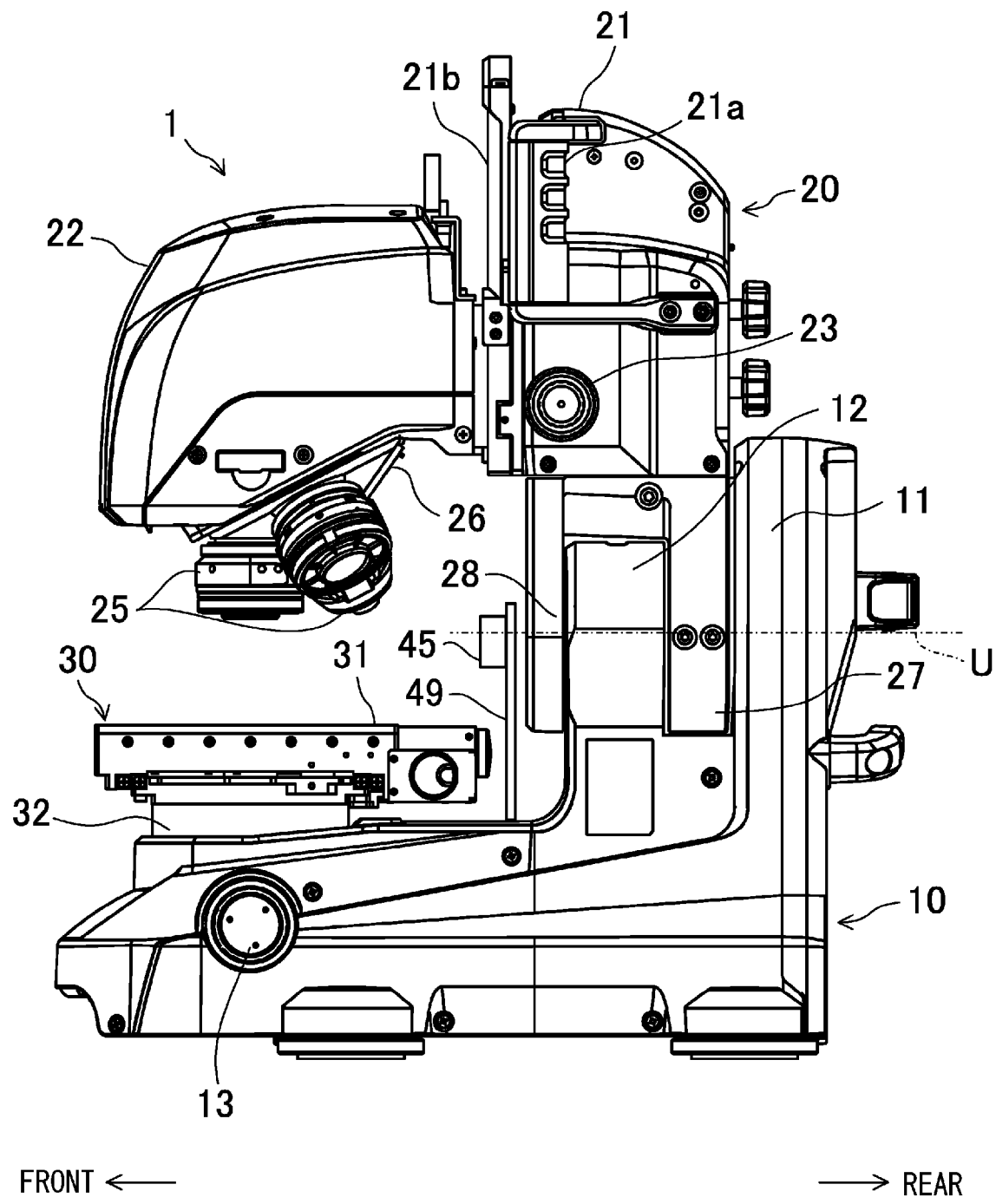
FIG. 8 is a diagram corresponding to FIG. 2 according to Embodiment 2.

FIG. 8 shows the observation unit 1 according to Embodiment 2 of the invention. Embodiment 2 differs from Embodiment 1 in that the side-view image capturing unit 45 is provided on the base unit 10, and other parts of Embodiment 2 are the same as those of Embodiment 1. Therefore, the parts the same as those of Embodiment 1 are given with the same reference numerals as in Embodiment 1, and the description thereof is omitted. The parts different from Embodiment 1 will be described.

On the base unit 10 of Embodiment 2, an image capturing unit supporting unit 49 is provided as a non-swinging portion at the rear of the placement table 31 to protrude upward. The side-view image capturing unit 45 is attached to an upper portion of the image capturing unit supporting unit 49. As a result, the side-view image capturing unit 45 can acquire a side-view image including the placement table 31 in a state in which a connection with a swinging motion of the stand unit 20 (the head unit 22) is eliminated. In Embodiments 1 and 2, the height of the side-view image capturing unit 45 can be set constant at all times.

Embodiment 3

Figure 9:
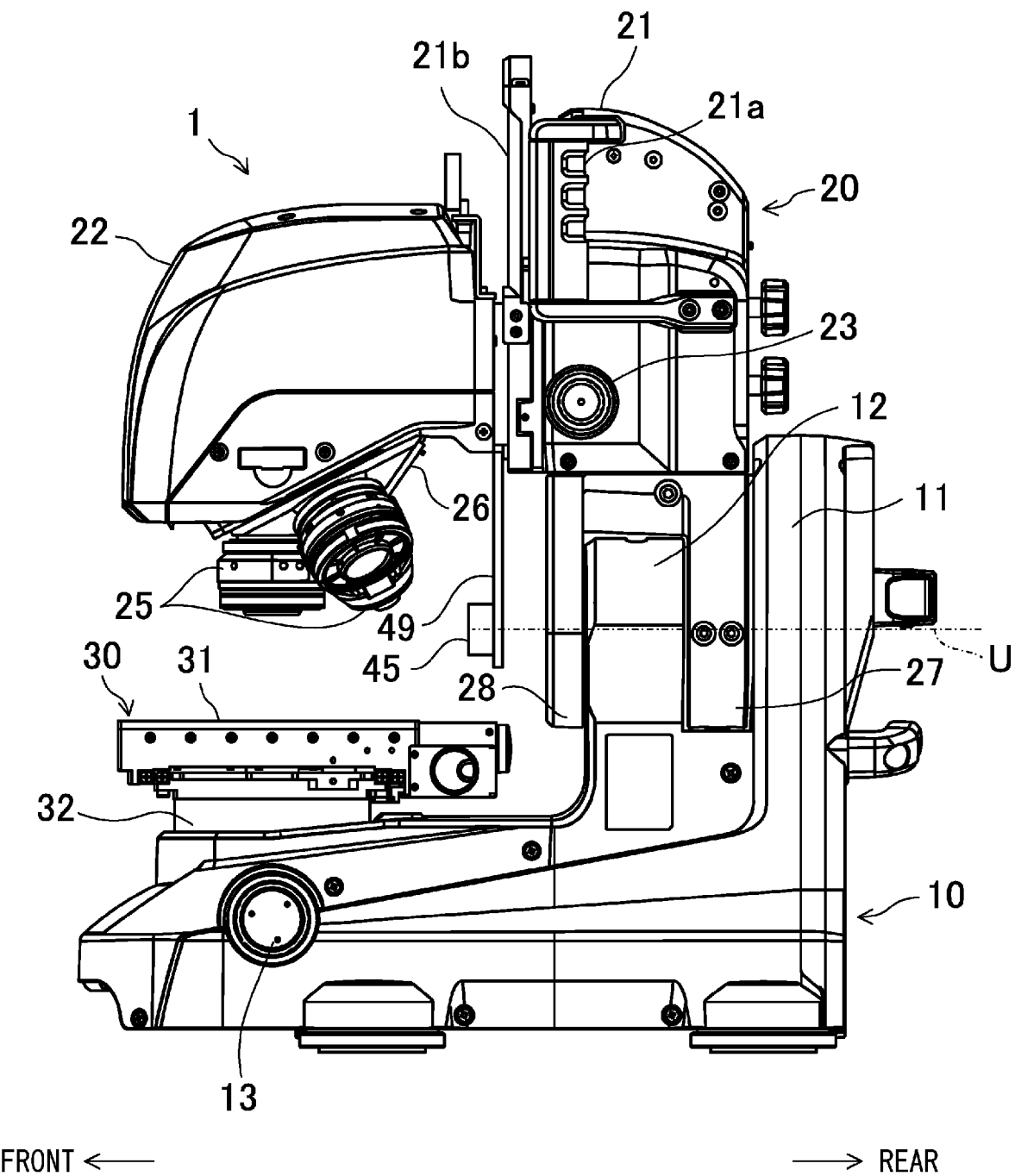
FIG. 9 is a diagram corresponding to FIG. 2 according to Embodiment 3.

FIG. 9 shows the observation unit 1 according to Embodiment 3 of the invention. Embodiment 3 differs from Embodiment 1 in that the side-view image capturing unit 45 is provided on the head unit 22, and the side-view image capturing unit 45 is configured to be capable of moving in the same direction as the objective lens 25. Other parts of Embodiment 3 are the same as those of Embodiment 1. Therefore, the parts the same as those of Embodiment 1 are given with the same reference numerals as in Embodiment 1, and the description thereof is omitted. The parts different from Embodiment 1 will be described.

On the head unit 22 of Embodiment 3, the image capturing unit supporting unit 49 is provided at the rear of the revolver 26 to protrude downward. The side-view image capturing unit 45 is attached to a lower portion of the image capturing unit supporting unit 49. Since the side-view image capturing unit 45 is attached to the head unit 22, the side-view image capturing unit 45 can be moved in connection with a movement of the head unit 22 in the vertical direction and the height of the side-view image capturing unit 45 can be changed. In Embodiment 3, since the side-view image capturing unit 45, the objective lens 25, and the magnified observation image capturing unit 50 are attached to the head unit 22, their relative positional relation does not change.

In Embodiment 3, the position of the side-view image capturing unit 45 can be set such that a focal position of the objective lens 25 enters a visual field of the side-view image capturing unit 45. It is preferable that the focal position of the objective lens 25 comes at the center of the visual field of the side-view image capturing unit 45. In addition, the image capturing unit supporting unit 49 may be provided on the stand main body 21.

Embodiment 4

Figure 10:
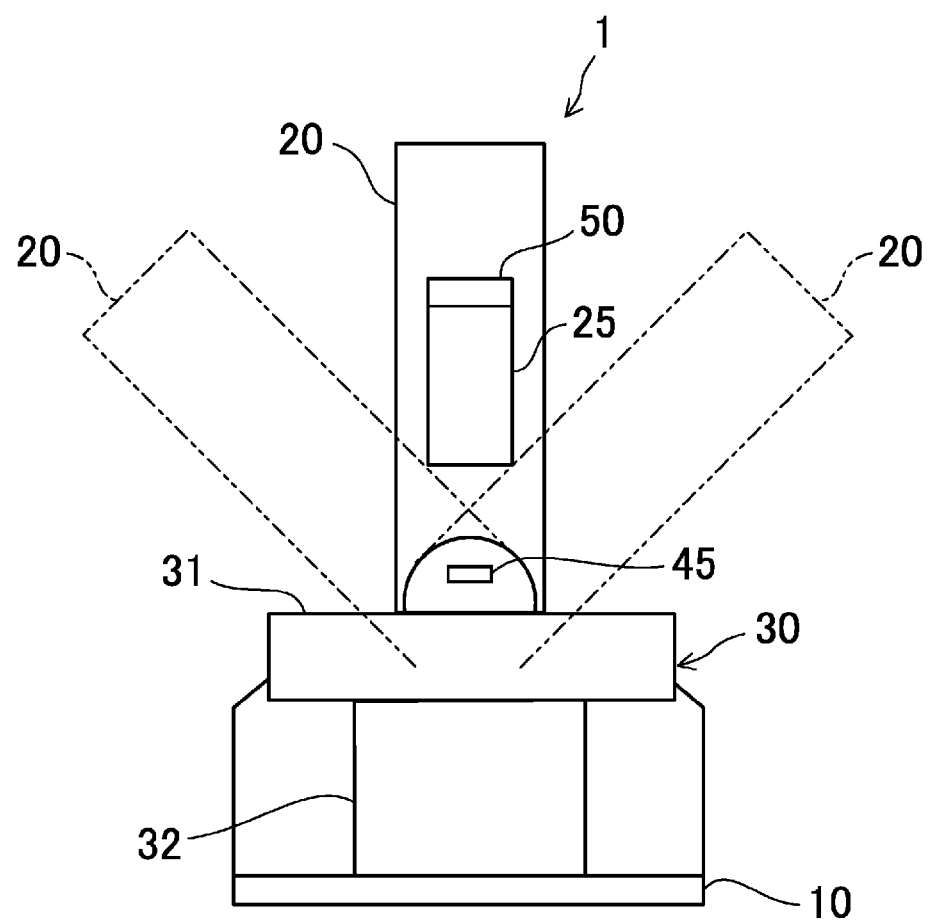
FIG. 10 is a diagram corresponding to FIG. 3 according to Embodiment 4.
Figure 11:
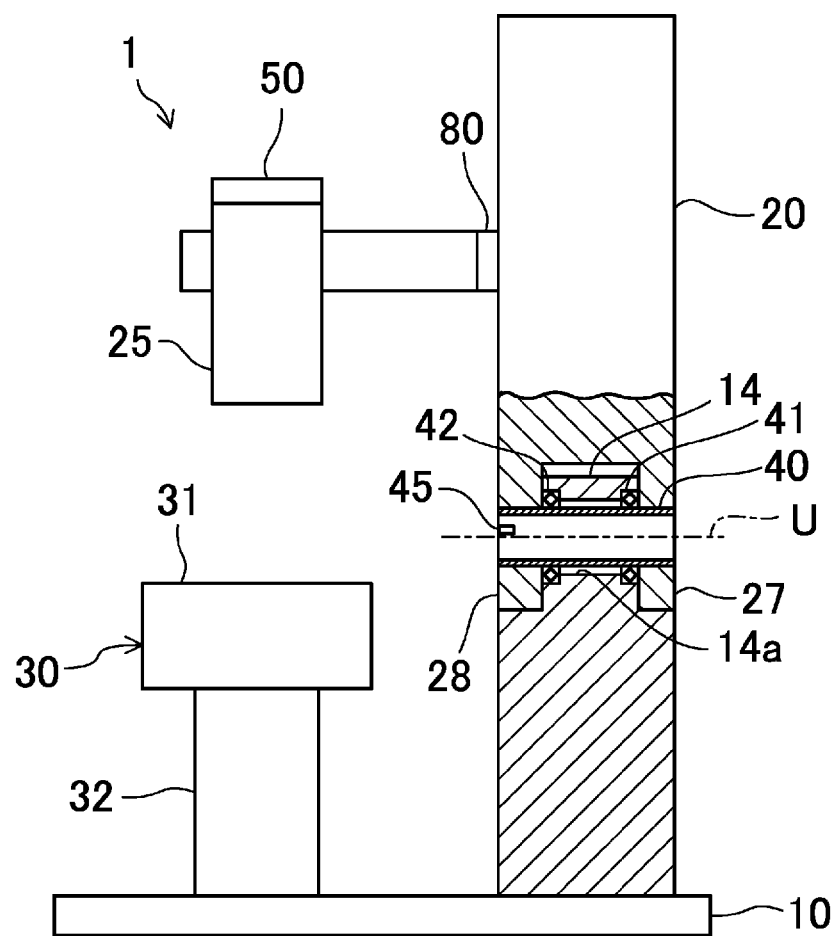
FIG. 11 is a diagram corresponding to FIG. 5 according to Embodiment 4.

FIG. 10 and FIG. 11 show the observation unit 1 according to Embodiment 4 of the invention. In Embodiment 4, a supporting unit 14 (shown in FIG. 11) is provided on the base unit 10 to protrude upward. Other parts are the same as those of Embodiment 1. Therefore, the parts the same as those of Embodiment 1 are given with the same reference numerals as in Embodiment 1, and the description thereof is omitted. The parts different from Embodiment 1 will be described.

A bearing hole 14a is formed in the supporting unit 14 so as to penetrate the supporting unit 14 in the front-rear direction, and outer ring members of the rear side bearing 41 and the front side bearing 42 are fitted in the bearing hole 14a. The rear side and the front side of the swinging axis 40 are respectively formed to pass through the rear side attaching unit 27 and the front side attaching unit 28 of the stand main body 21 in the front-rear direction and are fixed to the rear side attaching unit 27 and the front side attaching unit 28. The side-view image capturing unit 45 is provided inside the swinging axis 40.

In Embodiment 4, when the stand unit 20 is swung, the side-view image capturing unit 45 is rotated together with the swinging axis 40. However, since the side-view image capturing unit 45 is positioned near the axis U, a displacement amount associated with the swinging of the stand unit 20 is smaller than a case where the side-view image capturing unit 45 is positioned far from the axis U. Therefore, the side-view image capturing unit 45 is provided to acquire a side-view image including the placement table 31 in a state in which the connection with a swinging motion of the stand unit 20 is lowered.

Embodiment 5

Figure 12:
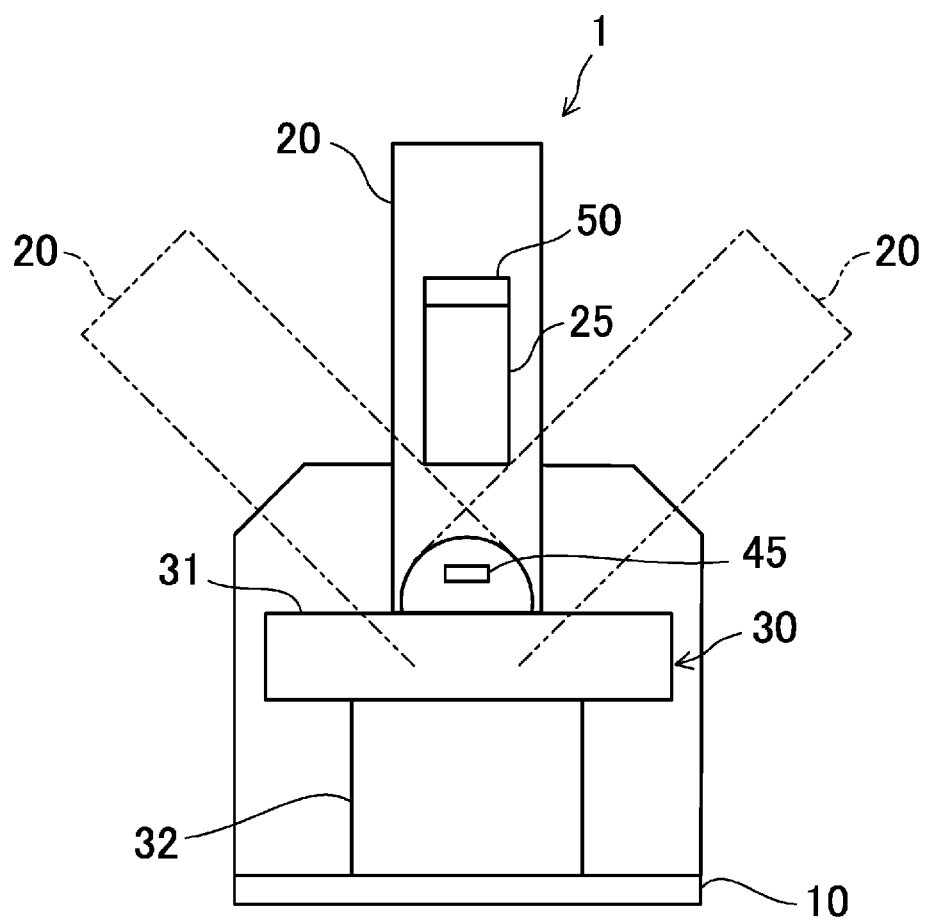
FIG. 12 is a diagram corresponding to FIG. 3 according to Embodiment 5.
Figure 13:
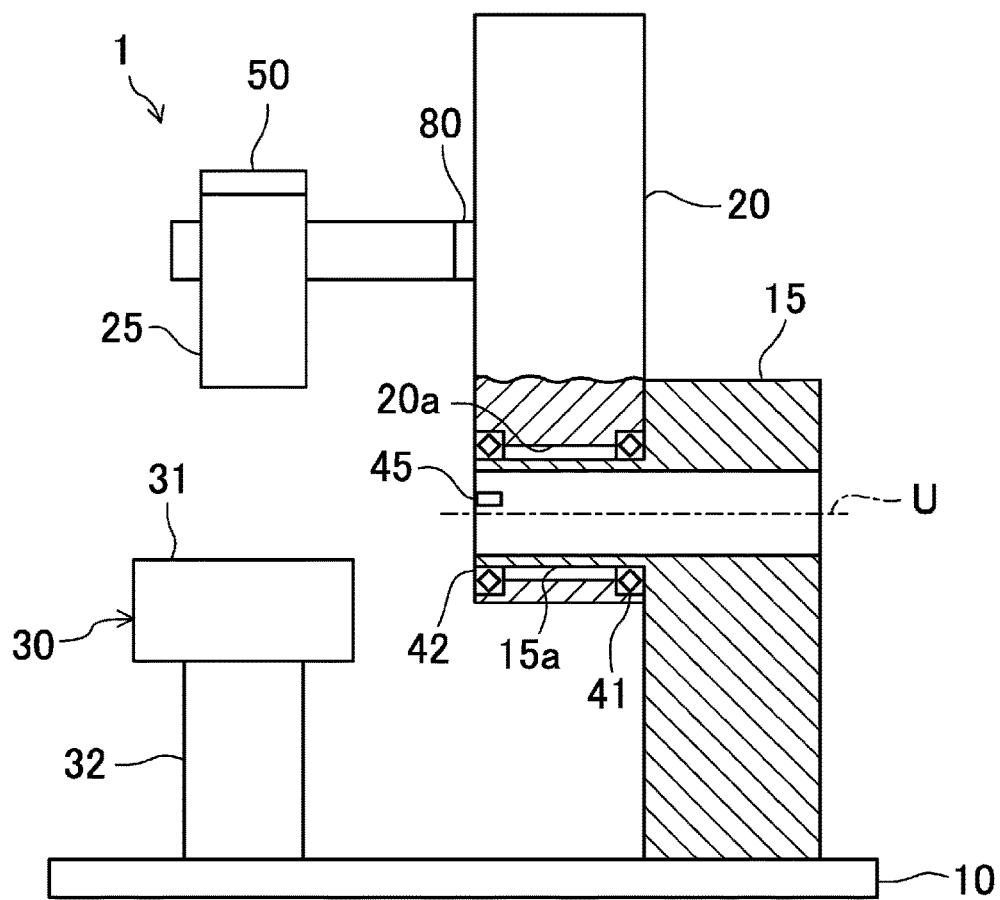
FIG. 13 is a diagram corresponding to FIG. 5 according to Embodiment 5.

FIG. 12 and FIG. 13 show the observation unit 1 according to Embodiment 5 of the invention. In Embodiment 5, a supporting unit 15 (shown in FIG. 13) is provided on the base unit 10 to protrude upward. Parts other than the ones to be described below are the same as those of Embodiment 1. Therefore, the parts the same as those of Embodiment 1 are given with the same reference numerals as in Embodiment 1, and the description thereof is omitted. The parts different from Embodiment 1 will be described.

A cylindrical member 15a is fixed to the supporting unit 15 to protrude forward. An axial center of the cylindrical member 15a is located on the axis U. A bearing hole 20a is formed in the stand unit 20 so as to penetrate the stand unit 20 in the front-rear direction, and outer ring members of the rear side bearing 41 and the front side bearing 42 are fitted in the bearing hole 20a. The cylindrical member 15a is inserted into inner ring members of the rear side bearing 41 and the front side bearing 42. As a result, in Embodiment 5, the stand unit 20 swings around the cylindrical member 15a. The swinging axis of Embodiment 5 is a virtual axis and is the axis U. The side-view image capturing unit 45 is provided inside the cylindrical member 15a. In the case of Embodiment 5, the side-view image capturing unit 45 can acquire a side-view image including the placement table 31 in a state in which a connection with a swinging motion of the stand unit 20 is eliminated.

Embodiment 6

Figure 14:
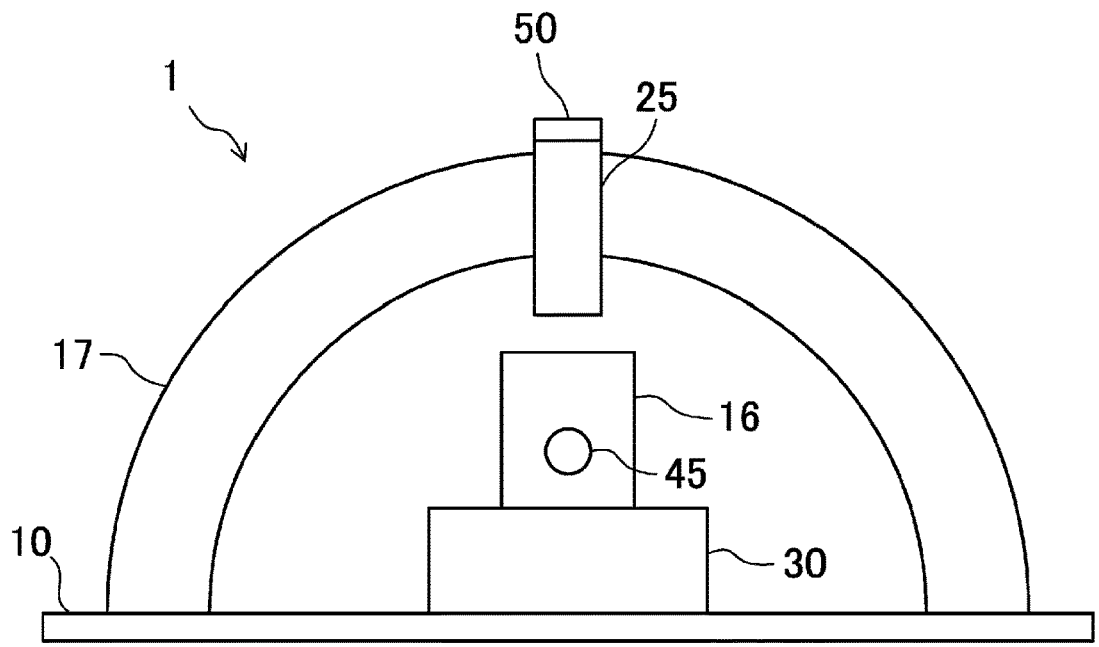
FIG. 14 is a diagram corresponding to FIG. 3 according to Embodiment 6.
Figure 15:
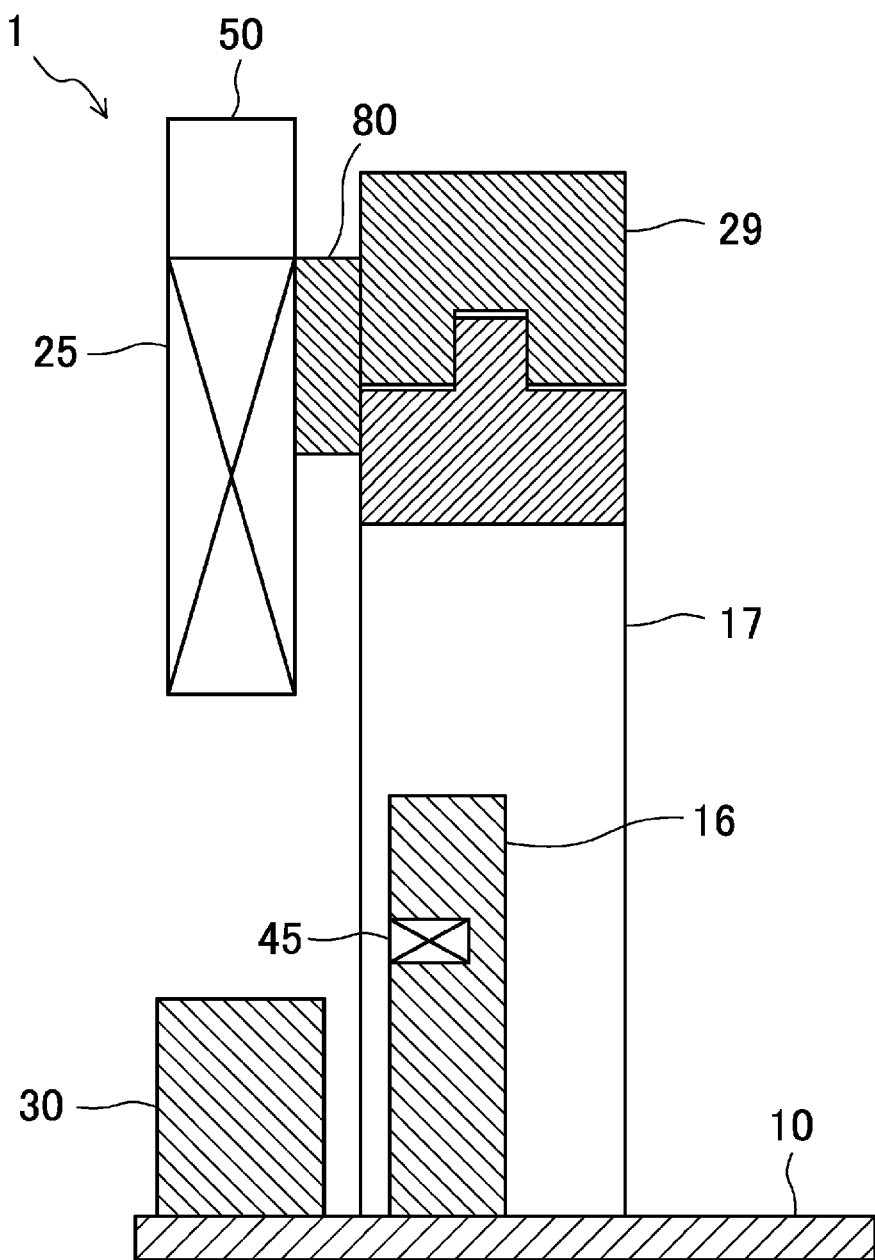
FIG. 15 is a diagram corresponding to FIG. 5 according to Embodiment 6.

FIG. 14 and FIG. 15 show the observation unit 1 according to Embodiment 6 of the invention. In Embodiment 6, an arc shaped rail member 17 is provided on the base unit 10. Parts other than the ones to be described below are the same as those of Embodiment 1. Therefore, the parts the same as those of Embodiment 1 are given with the same reference numerals as in Embodiment 1, and the description thereof is omitted. The parts different from Embodiment 1 will be described.

The arc shaped rail member 17, which has a predetermined radius and is centered on a virtual axis extending in a direction (Y direction) orthogonal to the optical axis of the magnified observation image capturing unit 50, is provided on the base unit 10 to protrude upward. The virtual axis is a swinging axis. In addition, an image capturing unit supporting unit 16 to which the side-view image capturing unit 45 is attached is provided on the base unit 10.

As shown in FIG. 15, a movable member 29 is attached to the rail member 17. The movable member 29 moves in a direction in which the rail member 17 extends. However, the movable member 29 engages with the rail member 17 so as not to move in a direction away from the rail member 17. The objective lens 25 and the magnified observation image capturing unit 50 are attached to the movable member 29. As the movable member 29 moves along the rail member 17, the movable member 29 swings around the virtual axis orthogonal to the optical axis of the magnified observation image capturing unit 50, and the objective lens 25 swings accordingly. In the case of Embodiment 6, the side-view image capturing unit 45 can also acquire a side-view image including the placement table 31 in a state in which the side-view image capturing unit 45 does not have a connection with a swinging movement of the stand unit 20.

Configurations to be described below are common to Embodiments 1 to 6.

Eucentric Mechanism

The observation unit 1 is configured to be capable of performing a eucentric observation. That is, in the magnifying observation apparatus A, an apparatus-specific three-dimensional coordinate system formed by three axes respectively parallel to the X direction, the Y direction, and the Z direction is defined. A coordinate of an intersection position, which will be described later, in the three-dimensional coordinate system of the magnifying observation apparatus A is further stored in a storing unit 89. Coordinate information of the intersection position may be stored in advance in the storing unit 89 at the time of out-of-factory shipping. In addition, the coordinate information of the intersection position stored in the storing unit 89 may be updatable by the user of the magnifying observation apparatus A.

The optical axis of the objective lens 25 intersects with the axis U. When the objective lens 25 swings centering the axis U, an angle of the optical axis with respect to the upper surface of the placement table 31 changes with the intersection position of the optical axis of the objective lens 25 and the axis U being maintained constant. Accordingly, when the user swings the objective lens 25 centering the axis U by the head unit 22, for example, in a case where an observation target portion of the observation target is at the intersection position, a eucentric relation in which visual field center of the magnifying observation image capturing unit 50 does not move from the same observation target portion is maintained even if the objective lens 25 is in a tilted state. Therefore, it is possible to prevent the observation target portion of the observation target from being out of the visual field of the magnified observation image capturing unit 50 (the visual field of the objective lens 25).

Configuration of Display Unit 2

The display unit 2a includes, for example, a display screen 2a capable of color display such as a liquid crystal display panel and an organic EL panel, and power is supplied from the outside. A touch operation panel (an example of a receiving unit) may be incorporated in the display screen 2a. Further, in the present embodiment, as shown in FIG. 4, an example in which the control unit 60 is incorporated in the display unit 2 is described. However, the invention is not limited thereto; the control unit 60 may be incorporated in the observation unit 1 or may be incorporated in the controller unit 3, or may be an external unit separate from the display unit 2, the observation unit 1, and the controller unit 3. The display unit 2 and the observation unit 1 are connected by a cable 5 so that the display unit 2 and the observation unit 1 can transmit and receive signals. The cable 5 also includes the cable 45b (shown in FIG. 5) that transmits imaged data from the side-view image capturing unit 45. Power supply to the observation unit 1 may be performed by the cable 5, and may also be performed by a power cable which is not shown in the drawings.

Configuration of Controller Unit 3

The controller unit 3 is connected to the control unit 60. The controller unit 3 is different from a general keyboard or mouse, and is a dedicated operation device capable of operating the observation unit 1 and performing input and selection operation of various information, image selection operation, area designation, position designation, etc. As shown in FIG. 17, the mouse 4 and the keyboard 6 are also connected to the control unit 60. The mouse 4 and the keyboard 6 are conventionally known devices for computer operation.

In addition to the aforementioned devices, the magnifying observation apparatus A may also be connected with a device for performing operations and controls, a printer, a computer for performing various other processing, a storing device, a peripheral device, and the like. Connection in this case may be, for example, serial connection such as IEEE 1394, RS-232x, RS-422, and USB, parallel connection, or a method of electrically, or magnetically, or optically connecting via a network such as 10BASE-T, 100BASE-TX, and 1000BASE-T may be used. In addition to wired connection, wireless connection using a wireless LAN such as IEEE802.x, a radio wave such as Bluetooth (registered trademark), an infrared ray, optical communication, etc. may also be used. Further, as a storing medium used for a storing device for exchanging data and storing various settings, for example, various memory cards, magnetic disks, magneto-optical disks, semiconductor memories, hard disks and the like can be used. The magnifying observation apparatus A can also be referred to as a magnifying observation system in which the aforementioned various units and devices are combined.

Configuration of Control Unit 60

The control unit 60 is a unit for controlling each unit of the magnifying observation apparatus A and performing various calculations and processing, etc., and can include a CPU, an MPU, a system LSI, a DSP, or a dedicated hardware, etc. As shown in FIG. 17, the control unit 60 is provided with an image processing unit 61, an edge extracting unit 62, an autofocus unit 63, a display control unit 64, a background influence reducing unit 65, a position index calculating unit 66, a synthesis processing unit 67, and a leveling unit 68. Each of the units included in the control unit 60 is a part capable of realizing various functions as described later. However, the functions may be realized by a logic circuit, or may be realized by executing software, or may be realized by a combination of a logic circuit and software. A part of the units included in the control unit 60 may be incorporated in the observation unit 1 while the other part may be incorporated in the display unit 2, or a part of the units may be incorporated in the controller unit 3.

Figure 16:
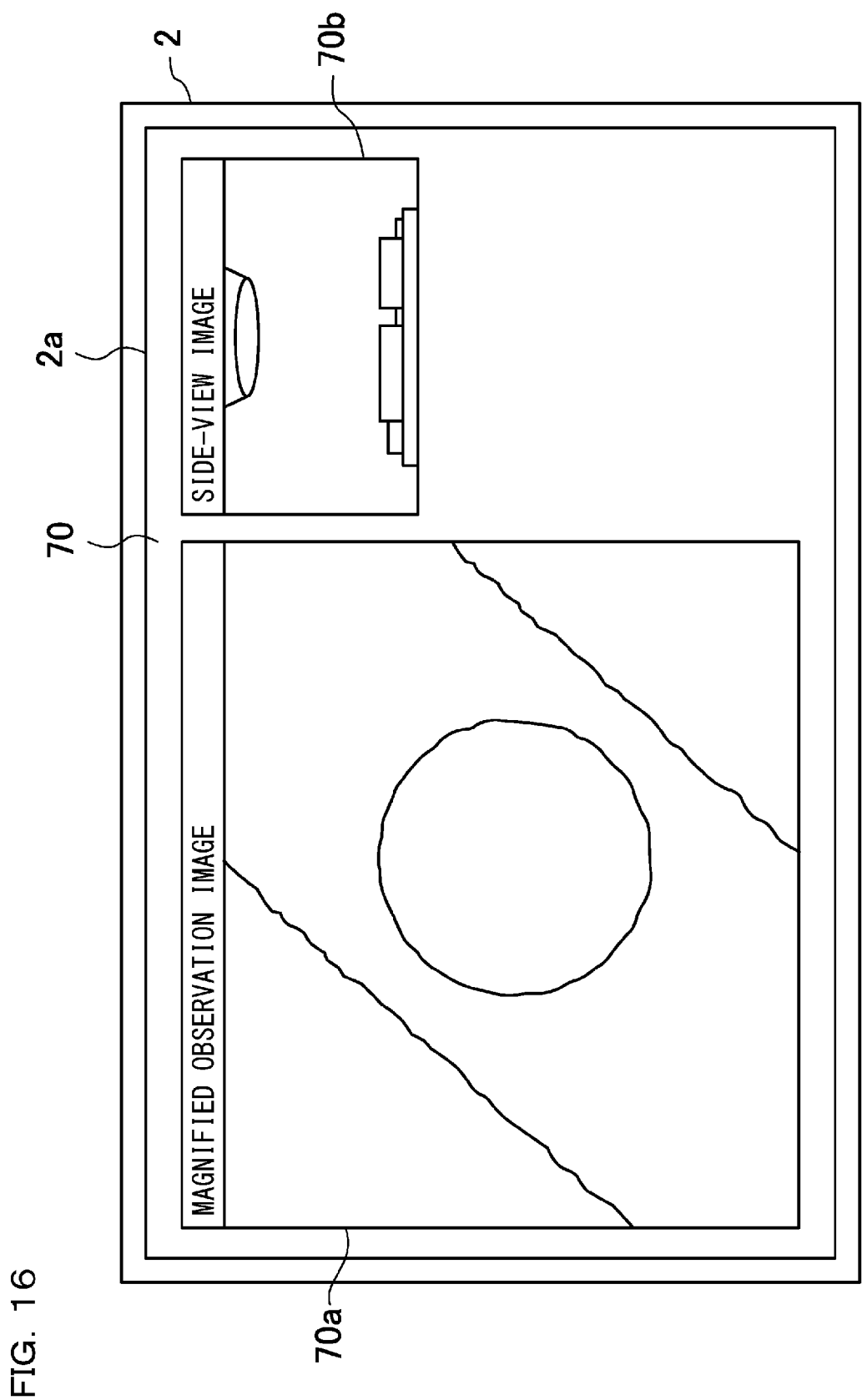
FIG. 16 is a diagram showing an example of an interface displayed on a display unit.

The display control unit 64 generates, as shown in FIG. 16, a user interface 70 and controls the display unit 2 such that the user interface is displayed on the display screen 2a of the display unit 2. The user interface 70 includes a magnified observation image display region 70a which displays an image acquired by the magnified observation image capturing unit 50, and a side-view image display region 70b which displays an image acquired by the side-view image capturing unit 45. The size of one of the magnified observation image display region 70a and the side-view image display region 70b may be smaller than the size of the other, or the size of the magnified observation image display region 70a and the size of the side-view image display region 70b may be may be the same. In this example, the display control unit 64 makes a magnified observation image displayed larger than a side-view image.

Figure 20:
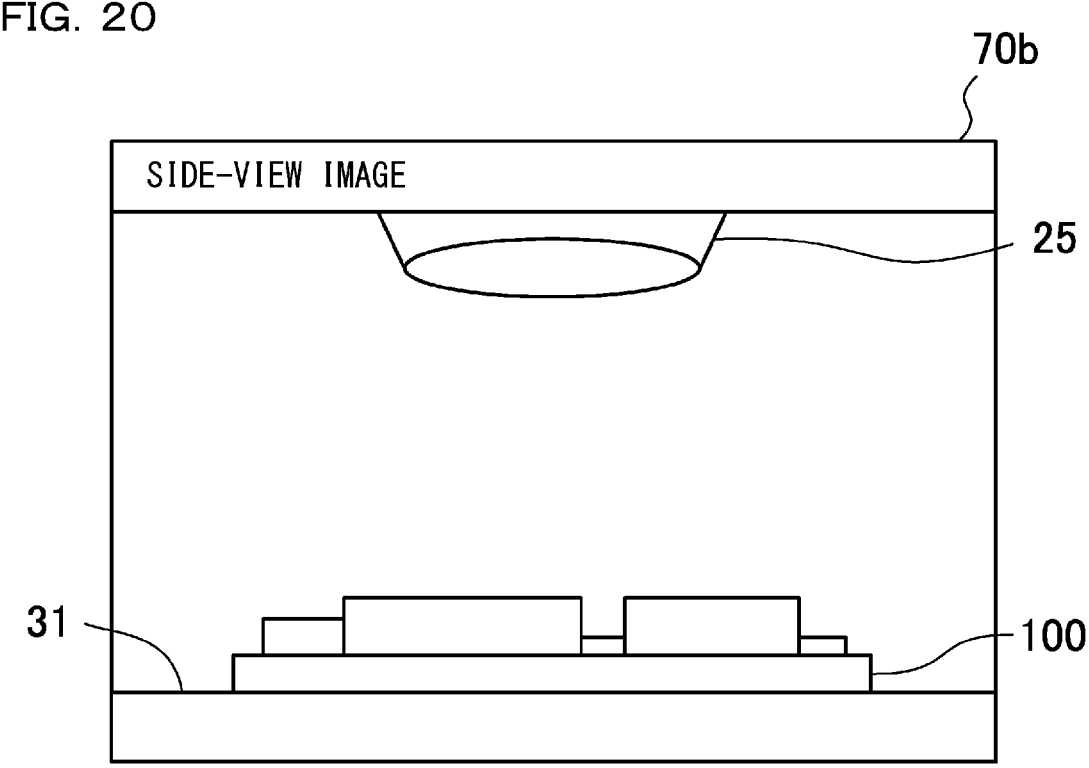
FIG. 20 is a diagram showing a side-view image displayed in a side-view image display region.

As shown in a magnified manner in FIG. 20, the side-view image displayed in the side-view image display region 70b includes at least the upper surface of the placement table 31, the observation target 100, and the objective lens 25. In other words, an angle of view of the optical system (lens) of the side-view image capturing unit 45, and a distance between the side-view image capturing unit 45 and the observation target 100 are set such that at least the upper surface of the placement table 31, the observation target 100, and the objective lens 25 are included. It is also fine that, for the objective lens 25, only the lower end portion enters the visual field of the side-view image capturing unit 45.

Figure 26:
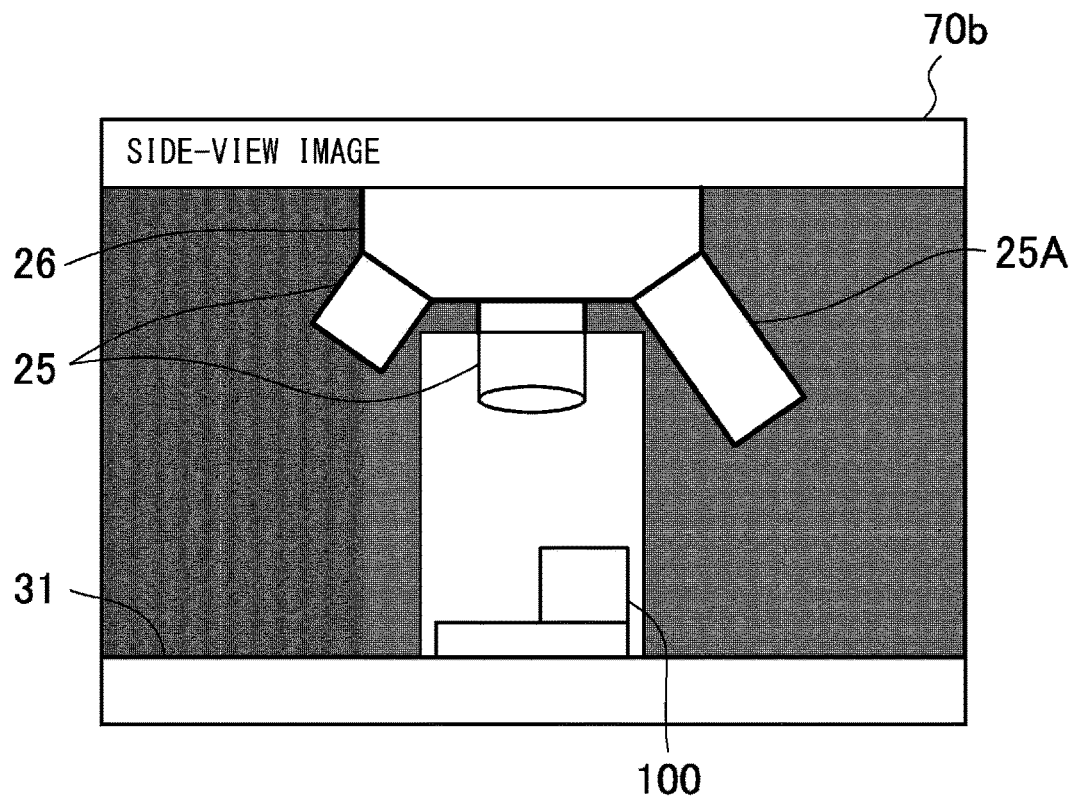
FIG. 26 is a diagram corresponding to FIG. 20 showing an example schematically showing a case positioned outside visual field of a side-view image capturing unit.

The control unit 60 is configured to be capable of displaying, among the objective lens 25 and the observation target 100, the one that is positioned outside the visual field of the side-view image capturing unit 45 on the display unit 2 in a schematic view. This example is shown in FIG. 26. A portion to which thin ink is not attached in FIG. 26 is the visual field of the side-view image capturing unit 45 and is a side-view image captured by the side-view image capturing unit 45. A portion to which thin ink is attached in FIG. 26 is a schematic view. An objective lens 25A exists outside the visual field of the side-view image capturing unit 45, and this portion is a portion drawn using information on shape or size of the objective lens 25A stored in the storing unit 89. For the revolver 26, it is also only necessary to store information on shape or size of the revolver 26 in the storing unit 89, and as a result, the revolver 26 can be displayed as a schematic view.

Figure 45:
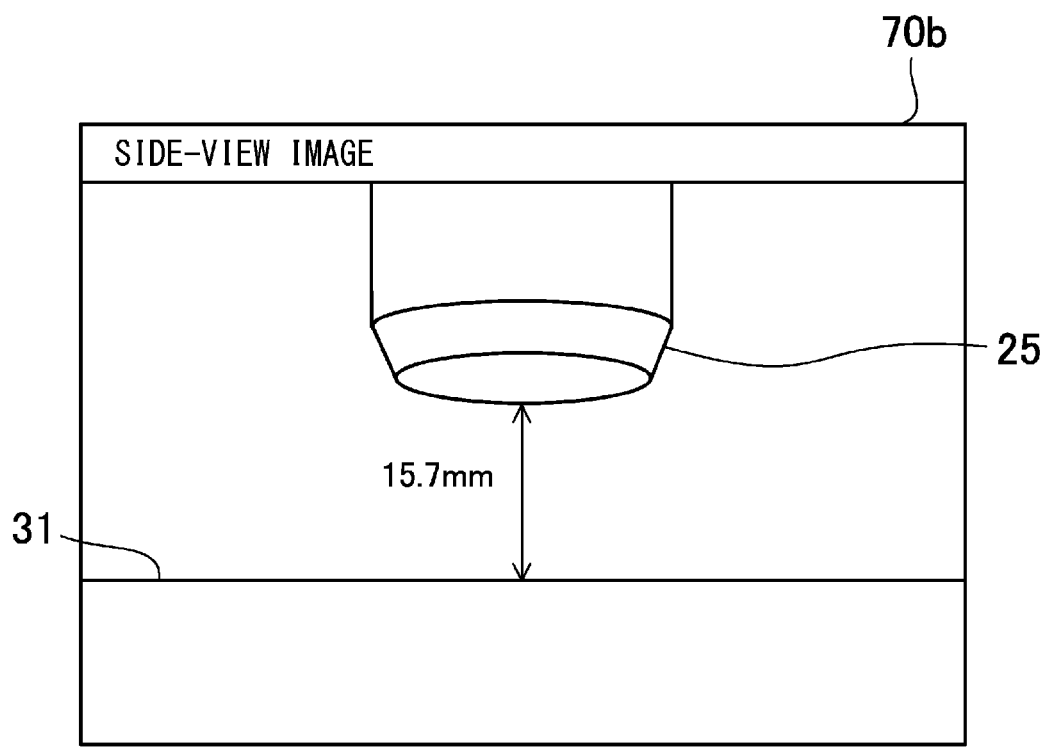
FIG. 45 is a diagram corresponding to FIG. 20 showing a case where the observation target is positioned outside the visual field of the side-view image capturing unit.

FIG. 45 shows a case where the observation target 100 is positioned outside the visual field of the side-view image capturing unit 45. In this case, a distance between the objective lens 25 and the placement table 31 can be displayed.

Figure 27:
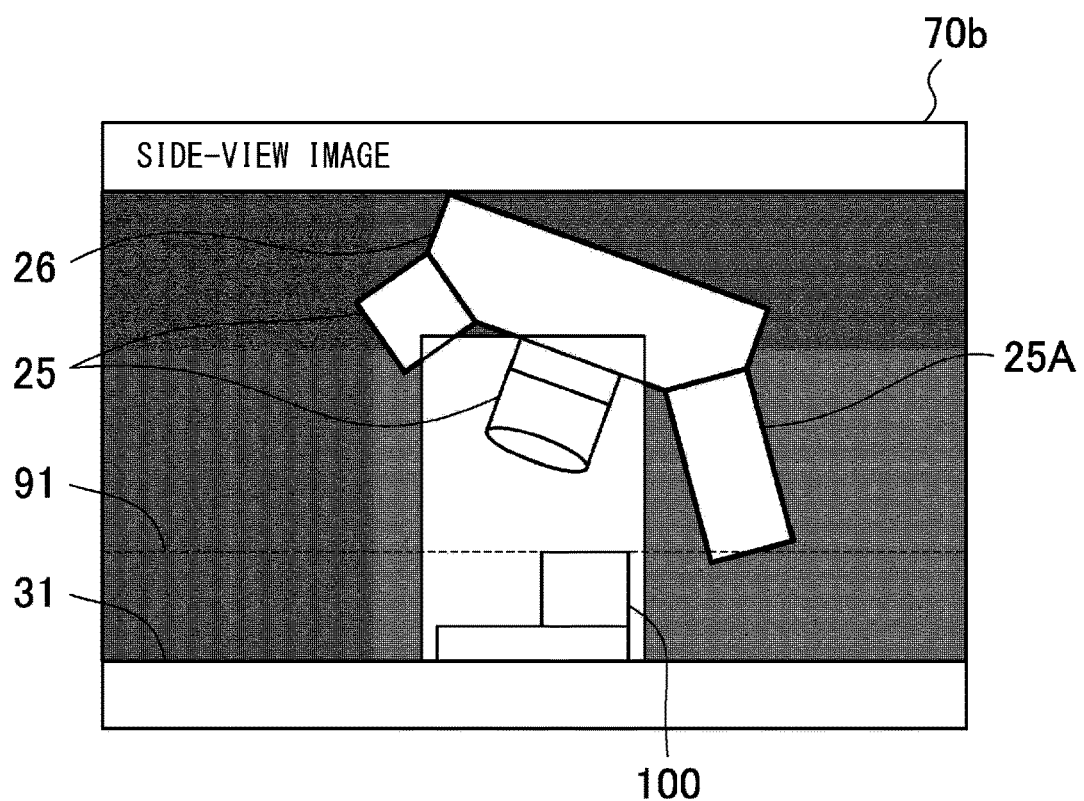
FIG. 27 is a diagram corresponding to FIG. 26 showing a state in which a revolver is rotated.

As shown in FIG. 27, an index 91 indicating the upper surface of the observation target 100 can be displayed on the display unit 2. The upper surface of the observation target 100 can be acquired by the edge extracting unit 62 to be described later. When the revolver 26 is rotated to switch the objective lens 25, it can be seen that the objective lens 25A after switching touches the index 91 indicating the upper surface of the observation target 100 during the switching operation. As a result, it can be seen that the objective lens 25 and the observation target 100 collide before switching to the objective lens 25A. By displaying the index 91 on the display unit 2, a collision between the objective lens 25 and the observation target 100 can be avoided when the revolver 26 is rotated.

Figure 33:
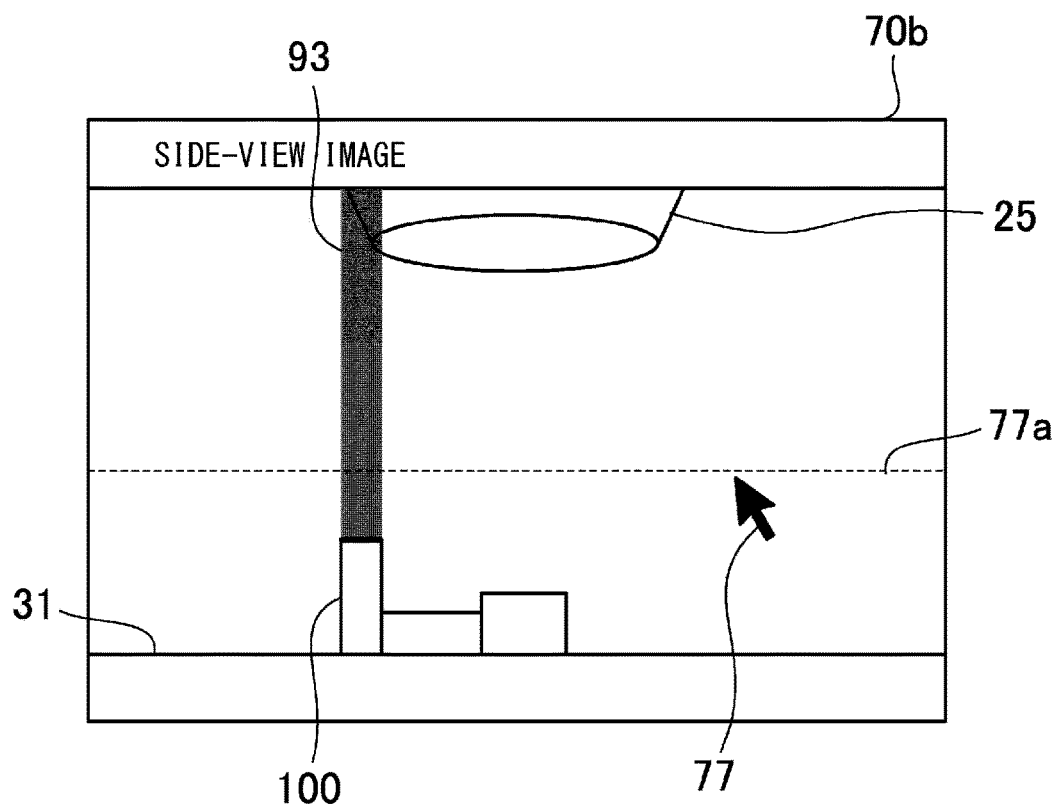
FIG. 33 is a diagram corresponding to FIG. 20 showing an example in which an auxiliary display for supporting collision avoidance is superimposed and displayed.

As a method for avoiding the collision between the objective lens 25 and the observation target 100, for example, as shown in FIG. 33, the highest part of the observation target 100 may be obtained by edge extraction and the like, a caution region 93 may be set upward from that part, and the caution region 93 may be displayed superimposed on the side-view image. As a result, for example, when the user designates a position, it is possible to recognize in advance a portion where the objective lens 25 tends to collide. Therefore, it is possible to avoid the collision between the objective lens 25 and the observation target 100. The caution region 93 is a portion shown by thin ink in FIG. 33. Examples of display forms of the caution region 93 include coloring, diagonal line indication, etc., and the display forms are not limited thereto.

Figure 34:
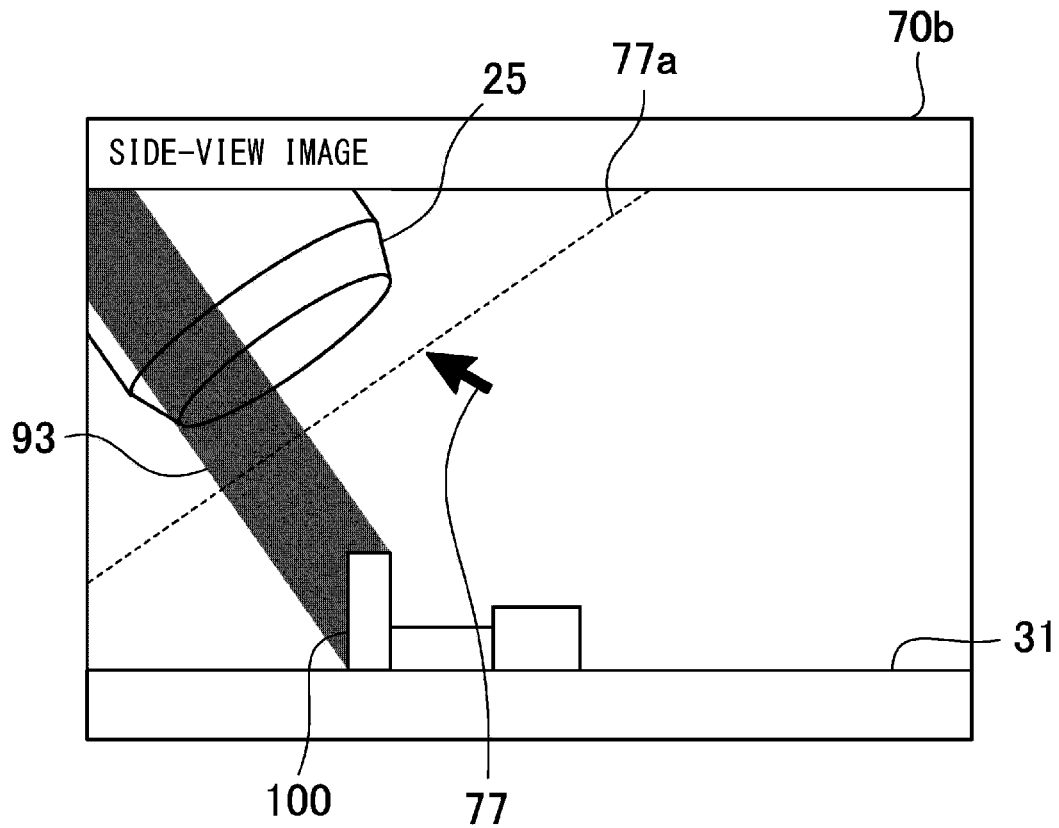
FIG. 34 is a diagram corresponding to FIG. 33 in a state in which a head unit is swung.

As shown in FIG. 34, when the head unit 22 is swung, the caution region 93 is also in a tilted state corresponding to a swing angle of the head unit 22.

Configuration of Edge Extracting Unit 62

Figure 21:
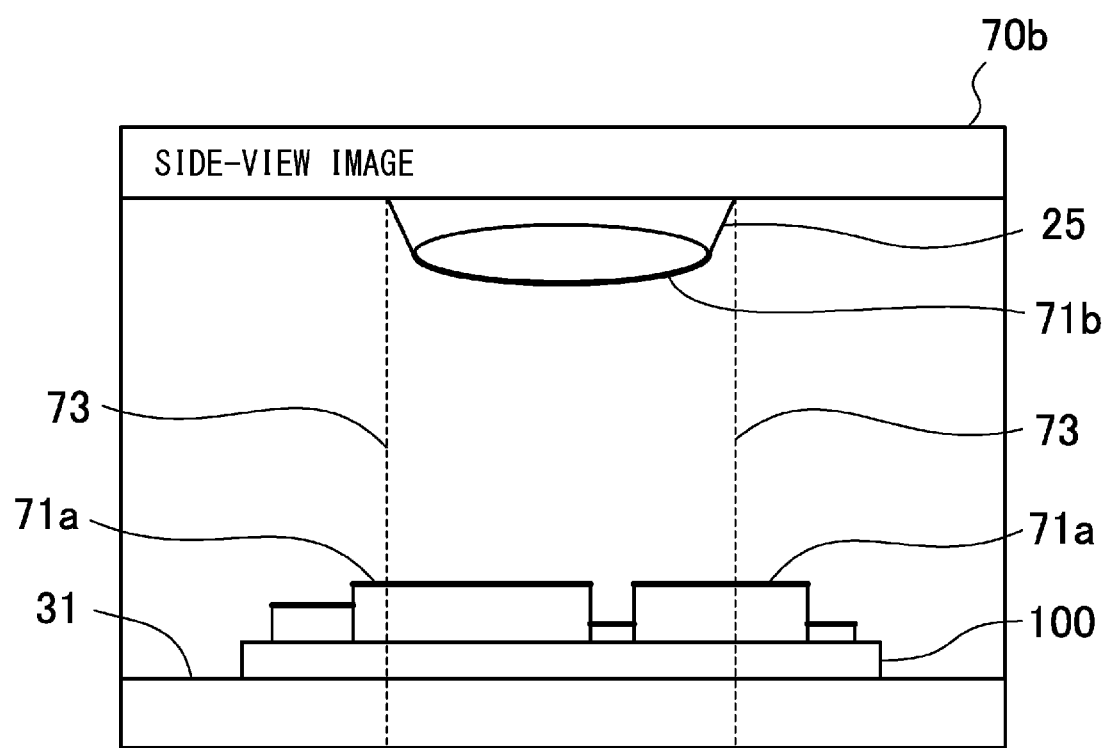
FIG. 21 is a diagram corresponding to FIG. 20 showing an example in which an upper surface of an observation target and a lower end portion of an objective lens are edge-extracted and displayed.

The edge extracting unit 62 is configured to perform an edge extraction processing of extracting the upper surface of the observation target 100 included in the side-view image as an edge. The edge can be defined in a broad sense as a contour or outline of the observation target 100. However, in this example, description will be made to a case where the upper surface when the observation target 100 is viewed from the side is extracted as an edge. A conventionally known method may be used for the edge extraction processing. For example, a pixel value of each pixel on the image is acquired, and when there is a region where a change in the pixel value on the image is equal to or more than a threshold for edge detection, that boundary portion is extracted as an edge. When the upper surface of the observation target 100 is extracted as an edge, as shown in FIG. 21, the display control unit 64 controls the display unit 2 such that the edge is indicated by an observation target edge indication line 71a. The observation target edge indication line 71a may include, for example, a thick line, a broken line, or a line of a striking color such as red and yellow. However, the observation target edge indication line 71a is not limited thereto, and may be in a form of flashing indication, etc. When there are a plurality of observation target edge indication lines 71a, it is fine that only the uppermost observation target edge indication line 71a is displayed.

The edge extracting unit 62 also extracts the lower end portion of the objective lens 25 included in the side-view image as an edge using the method as described above. When the lower end portion of the objective lens 25 is extracted as an edge, as shown in FIG. 21, the display control unit 64 controls the display unit 2 such that the edge is displayed by an objective lens edge indication line 71b. The objective lens edge indication line 71b can be configured in the same manner as the observation target edge indication line 71a. The display forms of the objective lens edge indication line 71b and the observation target edge indication line 71a may be different or may be the same.

The control unit 60 is configured to perform illumination control of illuminating the observation target 100 with a coaxial epi-illumination 51 when the side-view image capturing unit 45 acquires a side-view image on which the edge extracting unit 62 performs edge extraction processing. For example, before the side-view image capturing unit 45 acquires a side-view image on which the edge extraction processing is performed, when the observation target 100 is illuminated with a ring illumination 87, a side-view image for edge extraction processing is acquired by the side-view image capturing unit 45 after turning off the ring illumination 87 and turning on the coaxial epi-illumination 51. The ring illumination 87 irradiates light from around the observation target 100, and thus reflection components of the light become strong and halation occurs in many parts in the side-view image, which may make the edge extraction processing difficult. The illumination may be turned off to extract an edge with ambient light and the illumination may be turned on when autofocus is performed. When the coaxial epi-illumination 51 is used, halation hardly occurs in the side-view image and the edge extraction processing becomes easy.

Background Influence Reducing Section

Figure 22A:
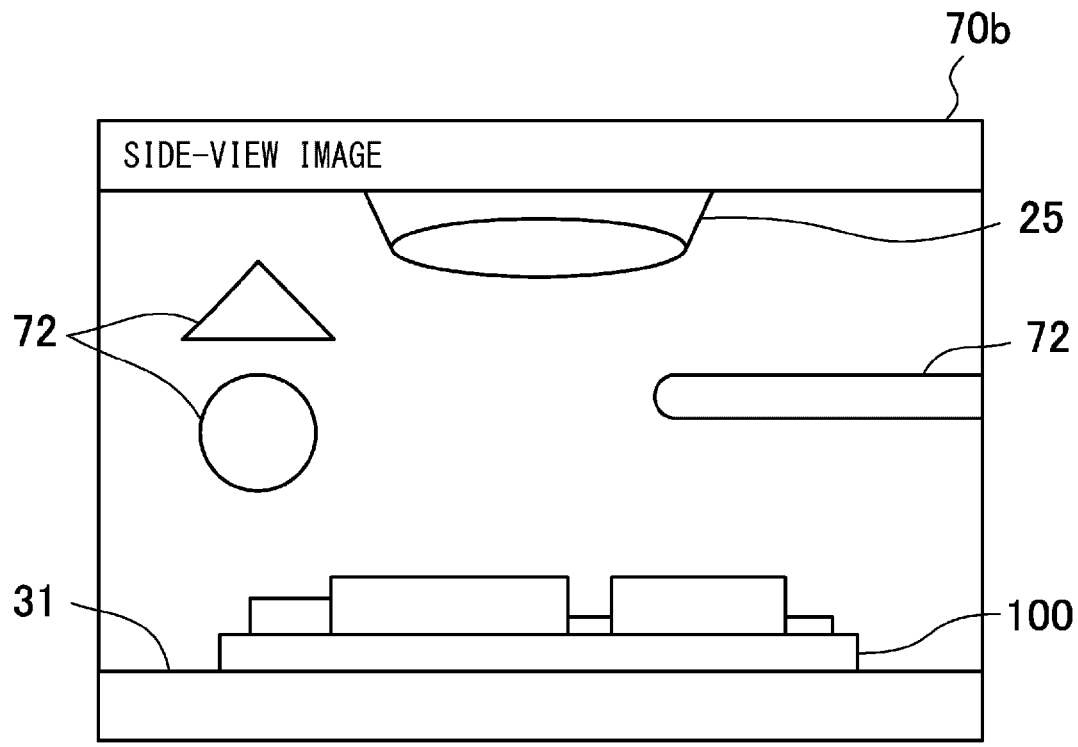
FIG. 22A is a diagram corresponding to FIG. 20 showing an example of a side-view image in which a background portion is clearly seen.

As shown in FIG. 22A, the side-view image on which the edge extraction processing is performed may include a background portion (indicated by reference numeral 72). That is, the side-view image capturing unit 45 faces the placement table 31 and the observation target 100, and among the side-view image acquired by the side-view image capturing unit 45, a region occupied by the placement table 31 and the observation target 100 is a part of the side-view image. In the rest part of the side-view image, as shown by the reference numeral 72 in FIG. 22A, an object farther than the observation target 100 (a background object farther than the front end of the placement table 31) may be reflected, which becomes a background portion of the side-view image. The background portion may include objects, people, etc. When the background portion is clearly reflected in the side-view image, it becomes difficult to distinguish between the placement table 31 and the background, between the observation target 100 and the background, and between the objective lens 25 and the background. Therefore, it may be difficult to grasp the placement table 31, the observation target 100, and the objective lens 100 in the side-view image. In particular, when the edge extraction processing is to be performed using the side-view image in which the background portion is clearly reflected, the outline of the background object 72 may be extracted and it becomes difficult to extract the edge of the observation target 100 or the edge of the objective lens 25.

This example is provided with a background influence reducing section that reduces the influence of the background portion, which is a portion where, among the side-view image acquired by the side-view image capturing unit 45, the distance from the side-view image capturing unit 45 is larger than the distance to the observation target 100. "Reducing the influence of the background portion" includes methods of blurring the background portion or masking the background portion such that it becomes easy to distinguish between the placement table 31 and the background, between the observation target 100 and the background, and between the objective lens 25 and the background, and also includes methods of blurring the background portion such that the edge extraction in the background portion cannot be performed. "Blurring the background portion such that edge extraction cannot be performed" means that it can be set based on the threshold for edge detection and the change in the pixel value in the background portion is made less than the threshold for edge detection.

As an example of the background influence reducing section, a depth of field setting section that sets a depth of field of the side-view image capturing unit 45 can be mentioned. By setting the depth of field of the side-view image capturing unit 45, it is possible to acquire a side-view image in which the background portion is blurred as compared with the placement table 31 or the objective lens 100. By blurring the background portion, the influence of the background portion can be reduced. The depth of field setting section can be, for example, an aperture, an angle of view (focal distance) of a lens of the side-view image capturing unit 45, etc. It is possible to calculate the depth of field by desktop calculation by a known math formula, and it is also possible to set a suitable aperture or an angle of view by experiment. By setting the focal distance of the side-view image capturing unit 45 to be longer than the focal distance of the magnified observation image capturing unit 50, it is possible to acquire a side-view image in which the background portion is blurred as compared with the placement table 31 and the observation target 100.

Figure 22B:
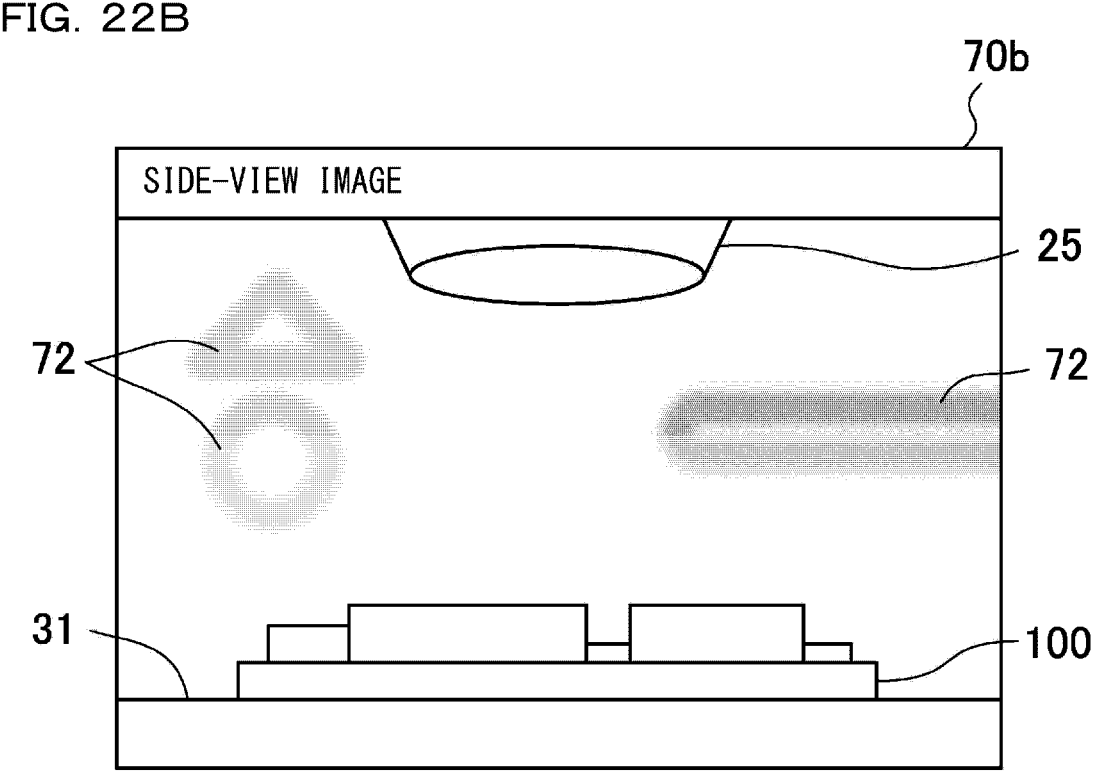
FIG. 22B is a diagram corresponding to FIG. 20 showing an example of a side-view image in which the background portion is blurred.

The depth of field of the side-view image capturing unit 45 can be set arbitrarily according to the aperture, the angle of view of the lens, etc. In this example, the depth of field of the side-view image capturing unit 45 is set between an end portion of the placement table 31 at a side closer to the side-view image capturing unit 45 and an end portion of the placement table 31 at a side farthest from the side-view image capturing unit 45. The end portion of the placement table 31 at the side closer to the side-view image capturing unit 45 is the front end portion of the placement table 31, and the end portion of the placement table 31 at the side farthest from the side-view image capturing unit 45 is the rear end portion of the placement table 31. By setting the depth of field in this manner, as shown in FIG. 22B, the observation target 100 placed on the placement table 31 and the objective lens 25 are in focus and a side-view image in which the background object 72 is blurred can be acquired. As a result, a side-view in which the observation target 100 and the objective lens 25 are conspicuous is obtained.

Further, the depth of field of the side-view image capturing unit 45 can be set such that a side-view image which focuses on the optical axis of the objective lens 25 and is blurred at an end portion of the placement table 31 which is farther from the stand unit 20 (the front end portion of the placement table 31) is obtained.

As another example of the background influence reducing section, an example including a background influence reducing unit 65 shown in FIG. 17 can be mentioned. The background influence reducing unit 65 includes a background determining unit 65a which determines the background portion of the side-view image acquired by the side-view image capturing unit 45. The background determining unit 65a is configured to drive the placement table 31 in the vertical direction by the placement unit Z-direction driving unit 83 during imaging by the side-view image capturing unit 45, and determine a portion not moving in the side-view image as the background portion. Further, the background determining unit 65a can also be configured to perform image processing on an image before moving captured by the side-view image capturing unit 45 before the placement table 31 is driven by the placement unit Z-direction driving unit 83 and an image after moving captured by the side-view image capturing unit 45 after the placement table 31 is driven by the placement unit Z-direction driving unit 83, and determine a portion not moving in both images as the background portion.

Figure 23A:
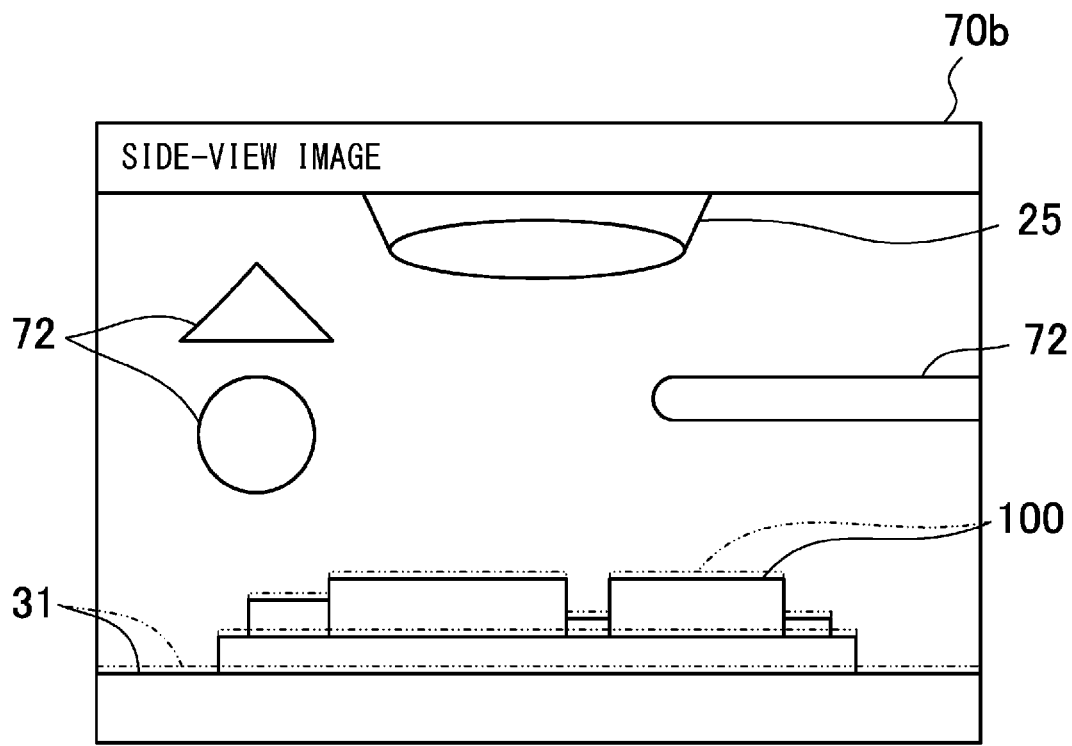
FIG. 23A is a diagram corresponding to FIG. 20 explaining determination gist of the background portion.

In FIG. 23A, solid lines indicate a state before the placement table 31 is driven by the placement unit z-direction driving unit 83 in the vertical direction, and virtual lines indicate a state after the placement table 31 is driven by the placement unit z-direction driving unit 83 in the vertical direction. As shown in FIG. 23A, it is the placement table 31 and the observation target 100 that move when the placement table 31 is driven, and the background object 72 does not move. On this basis, the image before driving and the image after driving are subjected to image processing to extract a portion that is not moving, and this portion is determined as the background portion. In other words, the side-view image capturing unit 45 can be configured such that a side-view image is acquired when the placement table 31 is at a first position and a side-view image is acquired after the placement table 31 is moved from the first position to a second position by the placement unit Z-direction driving unit 83. In this way, the determination of the background portion becomes easy.

As a method of determining the background portion, in addition to driving the placement table 31 in the Z direction, it is also possible to drive the placement table 31 in the Y direction by the placement unit XY-direction driving unit 82. In addition, by driving the objective lens 25 in the vertical direction by the objective lens Z-direction driving unit 80, it is possible to avoid determining the objective lens 25 as a background portion.

The background determining unit 65a may also be configured to change the illumination to the observation target 100 during imaging by the side-view image capturing unit 45 and to determine the background portion based on brightness of each portion of the side-view image. The ring illumination 87 and the co-axial epi-illumination 51 are illuminations illuminating the observation target 100, and lights of the ring illumination 87 and the co-axial epi-illumination 51 hardly reach the background object 72. When lighting states of the ring illumination 87 and the co-axial epi-illumination 51 are switched during imaging by the side-view image capturing unit 45, the brightness of the observation target 100 in the side-view image changes significantly. On the contrary, the brightness of the background object 72 hardly changes. Therefore, this can be detected by image processing, and a portion where the change in brightness in the side-view image is less than a predetermined amount can be determined as a background portion. The switching of the lighting states of the ring illumination 87 and the co-axial epi-illumination 51 may be switching between ON and OFF, and may also be a change in brightness.

Figure 23B:
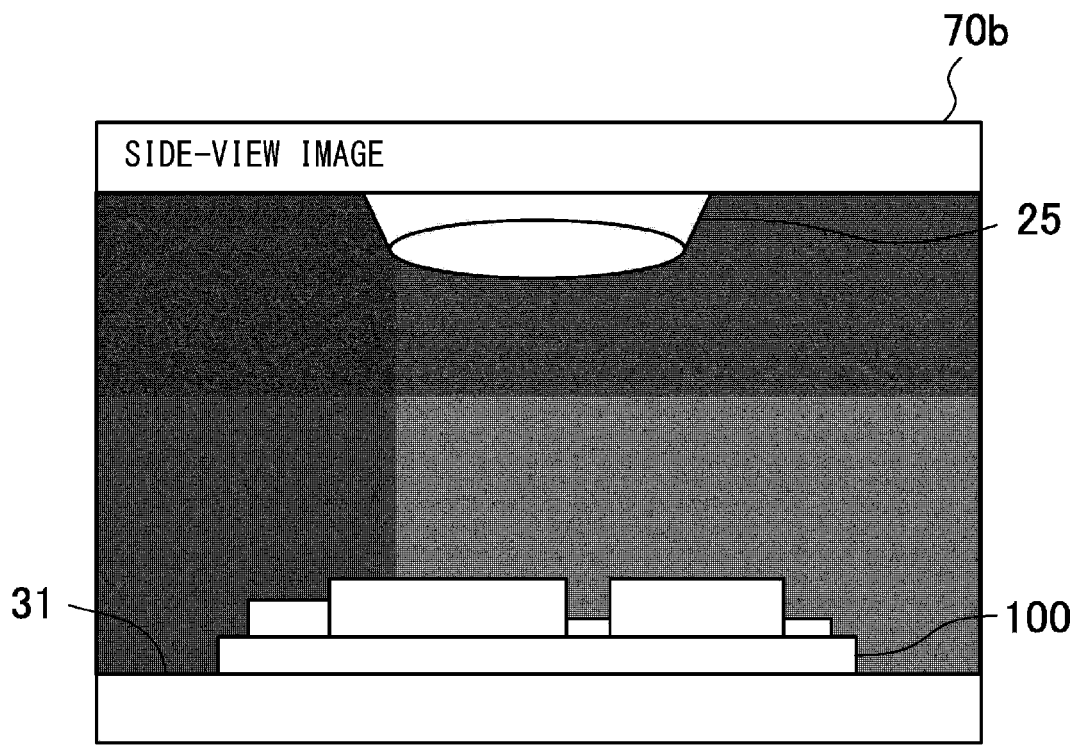
FIG. 23B is a diagram corresponding to FIG. 20 showing an example of a side-view image in which the background portion is masked.

The background influence reducing unit 65 is configured to reduce the influence of the background portion by performing image processing on the background portion determined by the background determining unit 65a. For example, as shown in FIG. 23B, mask processing can be performed to mask the background portion in the side-view image. The mask processing is processing of hiding the background portion. The background portion may be completely hidden, or may be hidden to an extent that the background object 72 is displayed in a lighter color. The mask processing may be, for example, processing of lightly coloring the background portion, or processing of reducing a contrast of the background portion. In addition, the background influence reducing unit 65 may perform processing of blurring the background portion.

An image in which the influence of the background portion has been reduced as described above is displayed on the display unit 2 together with a magnified observation image as shown in FIG. 16.

Configuration of Objective Lens 25

Figure 24:
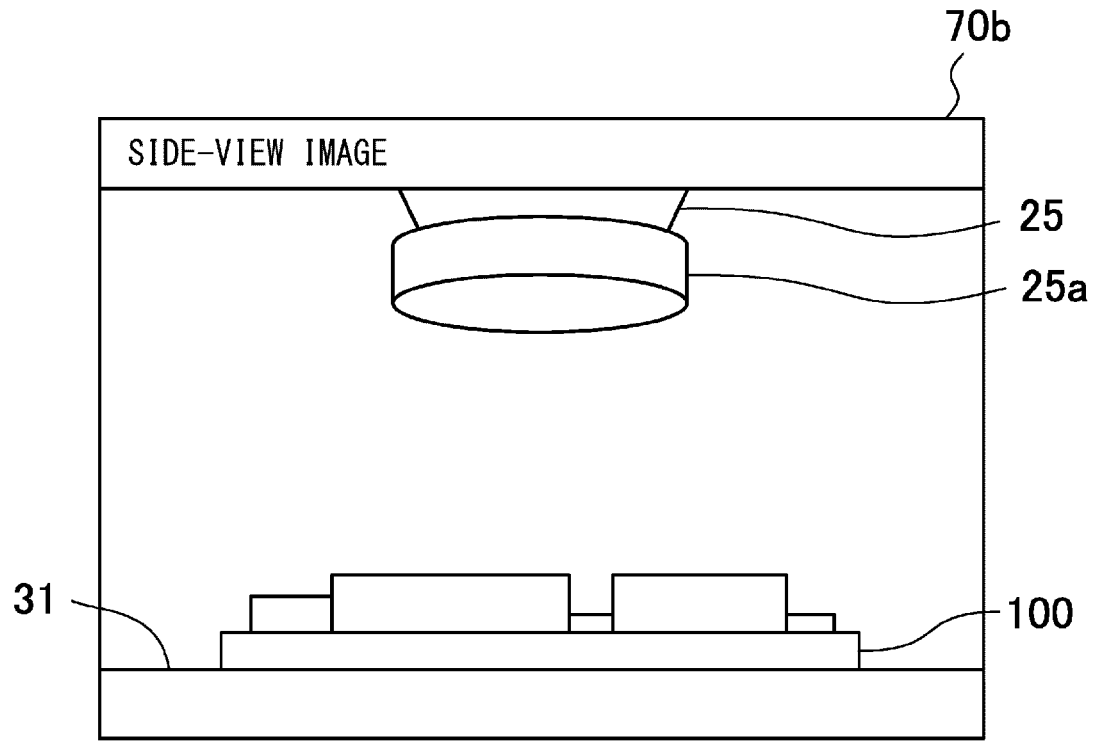
FIG. 24 is a diagram corresponding to FIG. 20 showing an example of a side-view image including an objective lens to which an attachment is attached.

FIG. 24 shows an example of a side-view image including the objective lens 25 to which an attachment 25a is attached. When the attachment 25a is attached to the lower end portion of the objective lens 25, a distance to the placement table 31 and a distance to the observation target 100 become shorter accordingly.

An identification section may be attached to the attachment 25a. As an identification section, for example, a barcode, a two-dimensional code, an IC chip and the like can be mentioned. When a code such as a barcode and a two-dimensional code is attached, it is preferable to display the code on a side surface of the attachment 25a at a portion facing the side-view image capturing unit 45. In a case of an IC chip, it is preferable to provide a contact at a portion of the revolver 26 where the revolver 26 contacts the attachment and to acquire identification information of the attachment 25a via this contact.

The control unit 60 can detect a code from an imaged captured by the side-view image capturing unit 45 and can determine the type of the attachment 25a by decoding processing using a conventionally known method. By determining the type of the attachment 25a, it is possible to grasp an outer diameter and a vertical dimension of the attachment 25a and to calculate a position of a lower end portion and a position of an outer peripheral surface of the attachment 25a.

Similarly, a code, an IC chip and the like can be attached to the objective lens 25. In this case, the control unit 60 can also grasp the type of the objective lens 25, that is, a length and an outer diameter (an outer shape) of the objective lens 25.

In this case, the storing unit 89 shown in FIG. 17 stores information on the type, shape, dimensions of each part and the like of the objective lens 25 in association with each other, and information on the shape and dimensions corresponding to the type of the objective lens 25 grasped by the control unit 60 can be read from the storing unit 89 and grasped. Similarly, information on the attachment 25a can also be stored in the storing unit 89.

The storing unit 89 can also store information on the type and a working distance (WD) of the objective lens 25 in association with each other. As a result, it is possible to grasp the working distance of the objective lens 25 in use by reading the information on the working distance corresponding to the type of the objective lens 25 grasped by the control unit 60.

Configuration of Image Processing Unit 61

The image processing unit 61 shown in FIG. 17 is configured to acquire positional relation information between the objective lens 25 and the observation target 100 based on a side-view image acquired by the side-view image capturing unit 45. Specifically, the positional relation information between the objective lens 25 and the observation target 100 can be acquired using an edge extracted by the edge extracting unit 62, and for example, as shown in FIG. 21, a distance in the vertical direction between the uppermost observation target edge indication line 71a and the lower end portion of the objective lens edge indication line 71b is acquired as the positional relation information. As a method of calculating this distance, for example, there is a method of multiplying an actual dimension per pixel of the side-view image and the number of pixels between the observation target edge indication line 71a and the objective lens edge indication line 71b.

The image processing unit 61 may also be configured to acquire positional relation information between the objective lens 25 and the observation target 100 using the information on the shape or dimension of the objective lens 25 stored in the storing unit 89. As described above, the control unit 60 can grasp the shape and dimension of the objective lens 25, and can also grasp the shape and dimension of the attachment 25 when the attachment 25a is attached. As a result, it is possible to calculate a distance between the lower end portion of the objective lens 25 and the upper surface of the observation target 100, and a distance between the lower end portion of the attachment 25a and the upper surface of the observation target 100 without extracting an edge of the objective lens 25.

For example, as shown in FIG. 21, by grasping the outer diameter of the objective lens 25, an outer diameter indication line 73 indicating the outer diameter of the objective lens 25 can be displayed as a vertical line. When the objective lens 25 is swung, it is only necessary to tilt the outer diameter indication line 73 corresponding to the swing angle.

The side-view image capturing unit 45 is provided on a side opposite to the user side, and thus a layout can be made so as not to disturb the user. However, since the side-view image capturing unit 45 captures an image from the side opposite to the user side, when the image is displayed as it is on the display unit 2, the relation between the left and right becomes opposite to that viewed from the user side. The image processing unit 61 is configured to have the image acquired by the side-view image capturing unit 45 displayed on the display unit 2 with the left and right inverted. As a result, the left and right direction of the side-view image can be made to coincide with that viewed from the user side.

Configuration of Autofocus Unit 63

The autofocus unit 63 controls the objective lens Z-axis direction driving unit 80 based on the positional relation information between the objective lens 25 and the observation target 100 acquired by the image processing unit 61 and a magnified observation image acquired by the magnified observation image capturing unit 50, and searches for the focus of the objective lens 25 by moving the objective lens 25 in the vertical direction. For example, the objective lens 25 is moved in the vertical direction by the objective lens Z-axis direction driving unit 80 until the observation target 100 is focused by using an algorithm similar to a well-known phase difference autofocus or contrast AF. It may also be focused by moving the placement table 31 in the vertical direction by the placement unit Z-direction driving unit 83.

Since the positional relation information between the objective lens 25 and the observation target 100 is acquired in advance when focusing, the objective lens Z-axis direction driving unit 80 can be controlled such that the objective lens 25 approaches the observation target 100 within a range in which the objective lens 25 and the observation target 100 do not collide with each other. Even with this control, the collision between the objective lens 25 and the observation target 100 can be avoided. Therefore, even when the position of the objective lens 25 after the completion of observation preparation is farther from the observation target 100 than the focused range, focusing can still be performed by autofocus.

The autofocus unit 63 can search for the focus of the objective lens 25 using information on the working distance of the objective lens 25 stored in the storing unit 89. The working distance of the objective lens 25 largely differs depending on magnification of the objective lens 25. However, by reading the information on the working distance of the objective lens 25 from the storing unit 89 and controlling the objective lens Z-axis direction driving unit 80 such that the observation target 100 exists near the working distance of the objective lens 25, focusing by autofocus can be performed quickly and accurately. In this case, it is preferable to focus the objective lens 25 on an uppermost surface of the observation target 100. As a result, a collision between the objective lens 25 and the observation target 100 can be avoided in advance.

For example, the search for the focus of the objective lens 25 by the autofocus unit 63 may fail due to a low contrast or other reasons. When the search for the focus of the objective lens 25 by the autofocus unit 63 fails, the control unit 60 stops the objective lens Z-axis direction driving unit 80 to end the search. In this way, the collision between the objective lens 25 and the observation target 100 can be avoided in advance. In addition, when the search for the focus of the objective lens 25 by the autofocus unit 63 fails, a display notifying that the search has failed may be displayed on the display unit 2. The display notifying that the search has failed may include, for example, a message or a mark indicating that the search has failed. However, the display is not limited thereto. When the search for the focus of the objective lens 25 by the autofocus unit 63 fails, it is also fine to notify by voice that the search has failed.

In addition, the autofocus unit 63 may also control the objective lens Z-axis direction driving unit 80 only based on the magnified observation image acquired by the magnified observation image capturing unit 50 and search the focus of the objective lens 25 by moving the objective lens 25 in the vertical direction.

Receiving Unit

The controller unit 3, the mouse 4, and the keyboard 6 are receiving units that receive a designation of an arbitrary position by the user in the side-view image displayed on the display unit 2. The control unit 60 is configured to control the magnifying observation apparatus A based on the position received by the receiving unit. For example, the objective lens Z-axis direction driving unit 80 is controlled such that the objective lens 25 is focused on the position received by the receiving unit. The objective lens Z-axis direction driving unit 80 may also be controlled such that the objective lens 25 moves to the position received by the receiving unit.

When the search for the focus of the objective lens 25 by the autofocus unit 63 fails, it is also possible to receive a designation of a target focal position of the objective lens 25 from the user on the side-view image by operating the controller unit 3, the mouse 4, and the keyboard 6. In other words, the receiving unit is configured to receive a designation of a position from the user when the search for the focus of the objective lens 25 by the autofocus unit 63 fails. The position received by the receiving unit can be specified on coordinates in a virtual space. For example, a coordinate system 1 may be used as a coordinate in the virtual space, a coordinate system 2 may be used as a coordinate at the pixel of the image sensor of the side-view image capturing unit 45, and a coordinate system 3 may be used as a coordinate in the side-view image displayed on the display unit 2. By associating the three coordinates, the position received by the receiving unit can be specified.

The autofocus unit 63 controls the objective lens Z-axis direction driving unit 80 based on the target focal position received by the receiving unit. The objective lens Z-axis direction driving unit 80 is controlled to move the objective lens 25 in the vertical direction until the focus of the objective lens 25 moves to the target focal position.

The objective lens 25 may be moved after a designation of a target focal position is received by the receiving unit, or the objective lens 25 may be moved before a designation of a position is received by the receiving unit from the user. In a word, it may be configured such that, before a designation of a position is received by the receiving unit from the user, the objective lens Z-axis direction driving unit 80 is controlled based on the positional relation information between the objective lens 25 and the observation target 100 acquired by the image processing unit 61 and the magnified observation image acquired by the magnified observation image capturing unit 50 to search for the focus of the objective lens 25.

As a control that reflects a designation of a position at the receiving unit, it includes, for example, a control of moving the observation target 100 by the placement table 31 in the width direction and the depth direction of the placement table 31 such that the position received by the receiving unit enters the visual field of the magnified observation image capturing unit 50. When the user designates, for example, a right end of a side-view image displayed on the display unit 2 as the position, the control unit 60 controls the placement unit XY-direction driving unit 82 such that the designated position is located in the vicinity of the central portion of the side-view image. As a result, a designation of a site to be observed and an observation of the designated site become possible.

Further, a plurality of objective lenses 25 attached to the revolver 26 can be included in the side-view image by setting the angle of view of the side-view image capturing unit 45, etc. In this case, when the user designates a position corresponding to one objective lens 25 among the plurality of objective lenses 25 on the side-view image by the receiving unit, a designation of that position is received. The control unit 60 controls the electric revolver driving unit 81 such that an observation by the objective lens 25 at the position received by the receiving unit becomes possible. As a result, the electric revolver driving unit 81 rotates the revolver 26 until the objective lens 25 at the position received by the receiving unit comes to an observable position.

Figure 40:
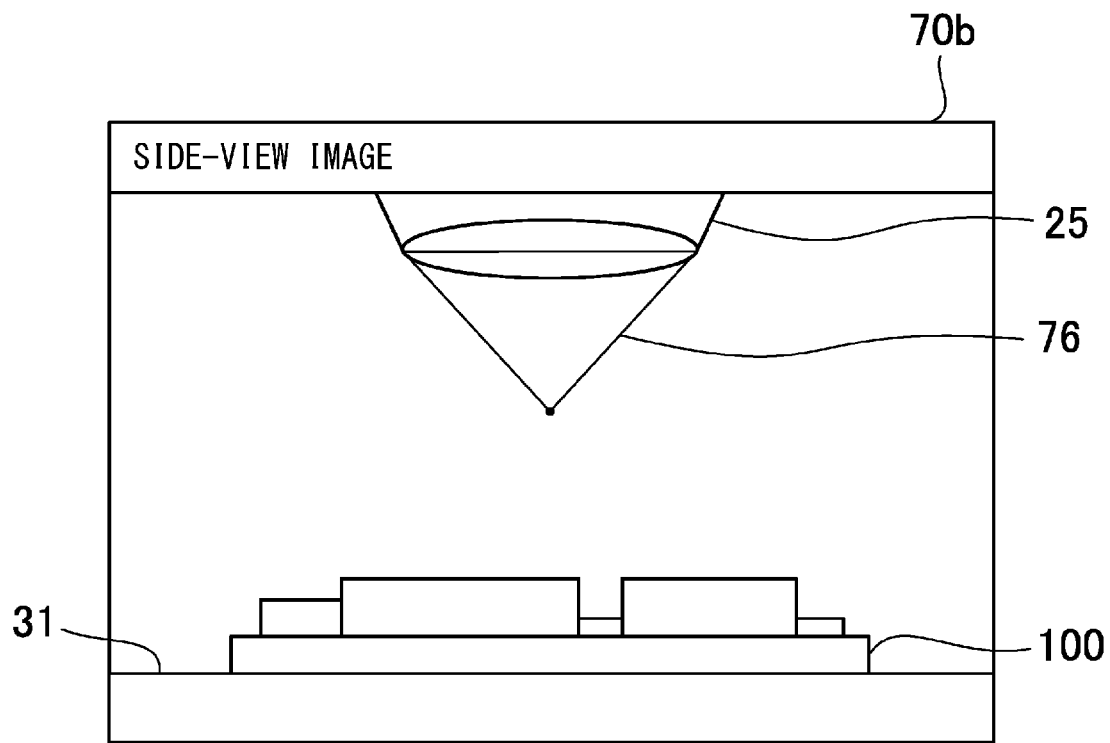
FIG. 40 is a diagram corresponding to FIG. 20 showing an example in which a guide display showing a working distance of the objective lens is superimposed and displayed.
Figure 42:
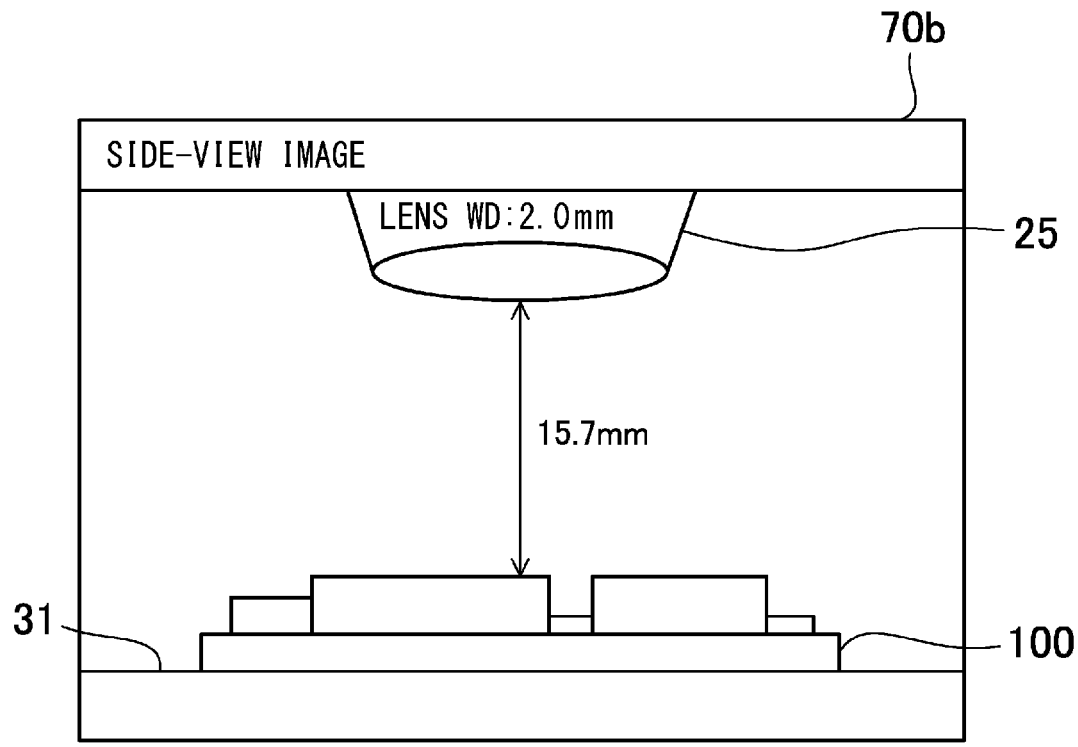
FIG. 42 is a diagram corresponding to FIG. 20 showing an example in which the working distance of the objective lens is superimposed and displayed numerically.

When position designation is performed, the display control unit 64 causes a guide display which guides the user to designate a position to be displayed on the display unit 2 such that the guide display overlaps the side-view image. The guide display can be a display regarding the working distance of the objective lens 25. For example, as indicated by reference numeral 76 in FIG. 40, the working distance of the objective lens 25 can be a guide display by a graphic. The guide display 76 is in a form of a triangle having a vertex at the bottom, and this lower vertex is a portion indicating the working distance. In addition, as shown in FIG. 42, the guide display 76 may be a guide display in which the working distance of the objective lens 25 (lens WD) is indicated by a numerical value. In this case, the distance between the lower end portion of the objective lens 25 and the upper surface of the observation target 100 may be displayed on the side-view image.

The guide display may be in a form of displaying the edge extracted by the edge extraction unit 62 as the upper surface of the observation target 100. For example, the observation target edge indication line 71a shown in FIG. 21 can be used as the guide display. As a result, the user can easily recognize the upper surface of the observation target 100 on the display unit 2.

The receiving unit is configured to receive a designation of a position corresponding to the outer shape, that is, the contour, of the observation target 100 in the side-view image displayed on the display unit 2. As a result, the position designated by the user in the side-view image can be used as the outer shape of the observation target 100. Therefore, for example, the position can be used in a control for avoiding the collision between the objective lens 25 and the observation target 100.

The receiving unit is configured to receive a designation of a position corresponding to the lower end portion of the objective lens 25 in the side-view image displayed on the display unit 2. As a result, the position designated by the user in the side-view image can be used as the lower end portion of the objective lens 25. Therefore, for example, the position can be used in a control for avoiding the collision between the objective lens 25 and the observation target 100.

Figure 31:
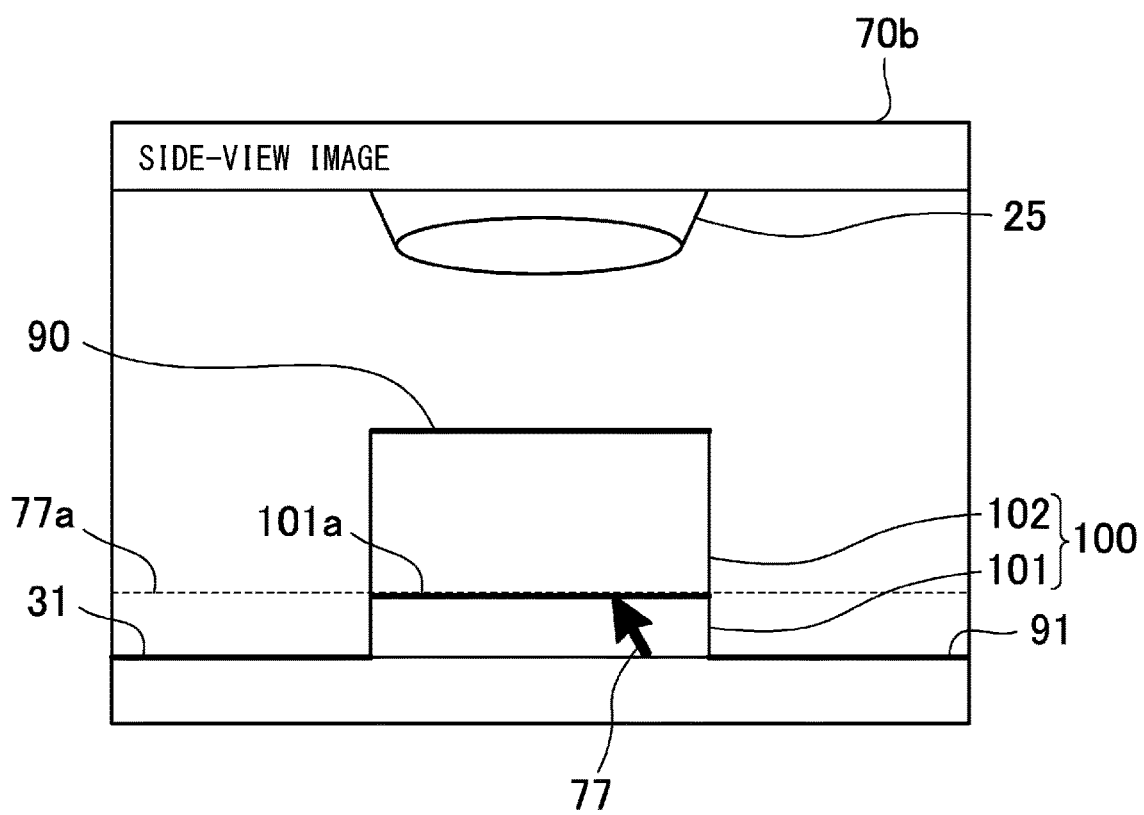
FIG. 31 is a diagram corresponding to FIG. 20 showing an example in which a position designation pointer is displayed.
Figure 32:
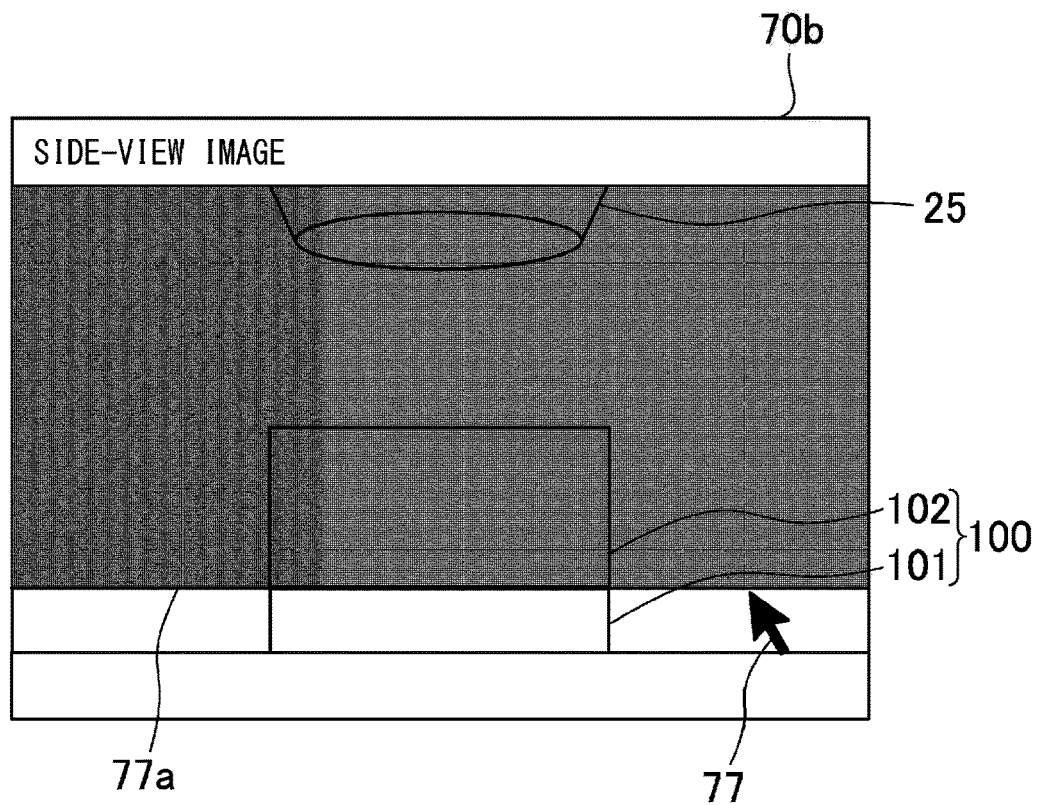
FIG. 32 is a diagram corresponding to FIG. 20 showing an example in which an auxiliary display for assisting position designation is superimposed and displayed.

The receiving unit is configured to be capable of operating a position designation pointer 77 displayed in the side-view image shown in FIG. 31, FIG. 32, etc., and is configured to receive a designation of an arbitrary position of the side-view image by the position designation pointer 77. The shape and color of the position designation pointer 77 are not particularly limited. A position designation auxiliary line 77a can be displayed together with the position designation pointer 77. The position designation auxiliary line 77a moves in the vertical direction in connection with the position designation pointer 77. Further, as shown in FIG. 34, when the head unit 22 is swung, the position designation auxiliary line 77a tilts corresponding to the swinging of the head unit 22.

Configuration of Synthesis Processing Unit 67

The synthesis processing unit 67 shown in FIG. 17 is a part performing depth synthesis processing of generating a magnified observation image focused on all portions of a predetermined range in a height direction of the observation target 100 positioned within the visual field of the magnified observation image capturing unit 50. A depth synthesis image is, when a height difference within a predetermined range in the height direction of the observation target 100 exceeds the depth of field of the objective lens 25, an image obtained by extracting and synthesizing only focused portions from images captured by the magnified observation image capturing unit 50 from different height directions. Conventionally known depth synthesis processing may be performed to generate a depth synthesis image. In the depth synthesis processing, the magnified observation image capturing unit 50 captures a plurality of still images (images before synthesis) while the objective lens 25 is moved by the objective lens Z-axis direction driving unit 80 in the Z direction (the height direction). By synthesizing focused regions of the captured images, a magnified observation image focusing on a wide range of the screen is synthesized. In this case, tens to hundreds of still images are used depending on the range in the Z direction, movement pitch in the Z direction, etc.

Figure 25:
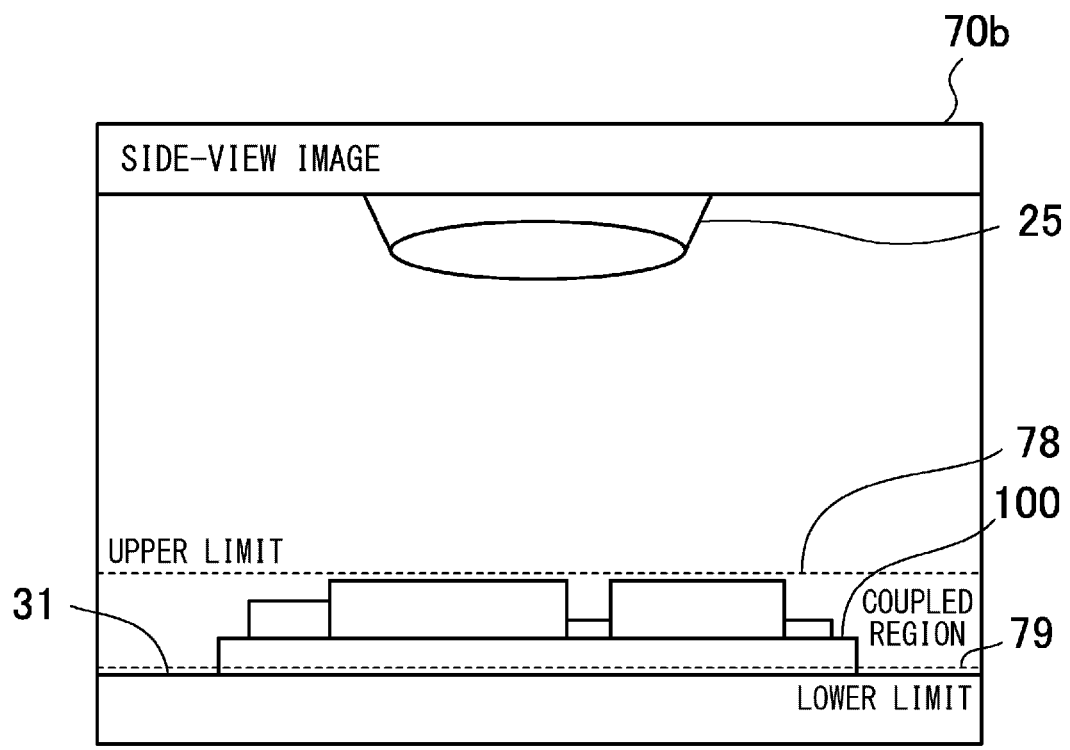
FIG. 25 is a diagram corresponding to FIG. 20 showing an example of upper limit setting and lower limit setting in synthesis processing.

The control unit 60 controls the synthesis processing unit 67 such that the depth synthesis processing is performed with the position received by the receiving unit as an upper limit or a lower limit of the predetermined range. As a previous step of the synthesis processing, the receiving unit can receive a designation of a position corresponding to at least one of the upper limit and the lower limit of the predetermined range in the side-view image. For example, as shown in FIG. 25, the upper limit of the predetermined range may be designated by a broken line 78, and the lower limit of the predetermined range may be designated by a broken line 79. The broken lines 78 and 79 can be separately moved in the vertical direction by an operation of the controller unit 3 or the mouse 4 by the user. In this way, it is possible to arbitrarily set the upper limit and the lower limit of the predetermined range. "Coupled region" in FIG. 25 is a range in which the depth synthesis processing is performed.

Configuration of Position Index Calculating Unit 66

The position index calculation unit 66 is a part calculating an index related to the distance between the objective lens 25 and the observation target 100 in an optical axis direction of the objective lens 25, or the distance between the objective lens 25 and the upper surface of the placement table 31 based on the side-view image acquired by the side-view image capturing unit 45. The index can be displayed on the display unit 2 and can be displayed superimposed on the side-view image. A superimposed display is to display by overlapping an index on an image captured by the side-view image capturing unit 45. When the head unit 22 swings (tilts), the index tilts corresponding to the swing angle of the head unit 22.

The index can be an index related to the working distance or an index related to the focal position of the objective lens 25. The index related to the working distance of the objective lens 25 can be displayed on the display unit 2 as the guide display 76 shown in FIG. 40 and FIG. 41. A lower vertex in the guide display 76 indicates the focal position, and thus the guide display 76 can also be referred to as an index related to the focal position.

The index can be an index related to a movement limit position of the objective lens 25 in the optical axis direction of the objective lens 25. As shown in FIG. 31, the lower end portion of the objective lens 25 cannot be lowered below the upper surface of the observation target 100, and thus the movement limit position of the objective lens 25 is the upper surface of the observation target 100. The upper surface of the observation target 100 can be displayed in the side-view image as an edge indication line 90 by edge extraction processing. The edge indication line 90 becomes an index indicating a downward movement limit position of the objective lens 25, and the index in this case indicates the observation target 100 present at the movement limit position of the objective lens 25. An index indicating an upward movement limit position of the objective lens 25 may also be displayed. The upward movement limit position of the objective lens 25 is determined by the length of the objective lens 25, the structure of the objective lens Z-direction driving unit 80, etc.

The control unit 60 controls the objective lens Z-direction driving unit 80 such that the objective lens 25 is moved to the movement limit position to the most when the receiving unit receives a designation of a position of a portion exceeding a movement limit. As shown in FIG. 31, the movement limit is displayed by the edge indication line 90. However, it is conceivable that the user designates a position of a portion closer to the upper surface of the placement table 31 than the edge indication line 90, and according to this position designation, the objective lens 25 collides with the observation target 100. In order to avoid this situation, when a position designation as shown in FIG. 31 is performed, the position designation is ignored, or even if the position designation is performed, it is not reflected in the control of the objective lens Z-direction driving unit 80. In this way, the collision between the objective lens 25 and the observation target 100 is avoided. For the same reason, the receiving unit can also be configured not to receive a designation of a position of a portion exceeding the movement limit. When a designation of a position of a portion exceeds the movement limit, a warning may be displayed on the display unit 2.

The index can be at least one of the distance between the objective lens 25 and the observation target 100 and the distance between the objective lens 25 and the placement table 31. The position of the lower end portion of the objective lens 25 can be obtained based on image processing such as edge extraction and dimension information stored in the storing unit 89. The position of the upper surface of the observation target 100 can be obtained based on image processing such as edge extraction. As shown in FIG. 42, the distance between the lower end portion of the objective lens 25 and the upper surface of the observation target 100 can be calculated from the position of the lower end portion of the objective lens 25 and the position of the upper surface of the observation target 100. Similarly, the distance between the lower end portion of the objective lens 25 and the upper surface of the placement table 31 can also be calculated.

Figure 47:
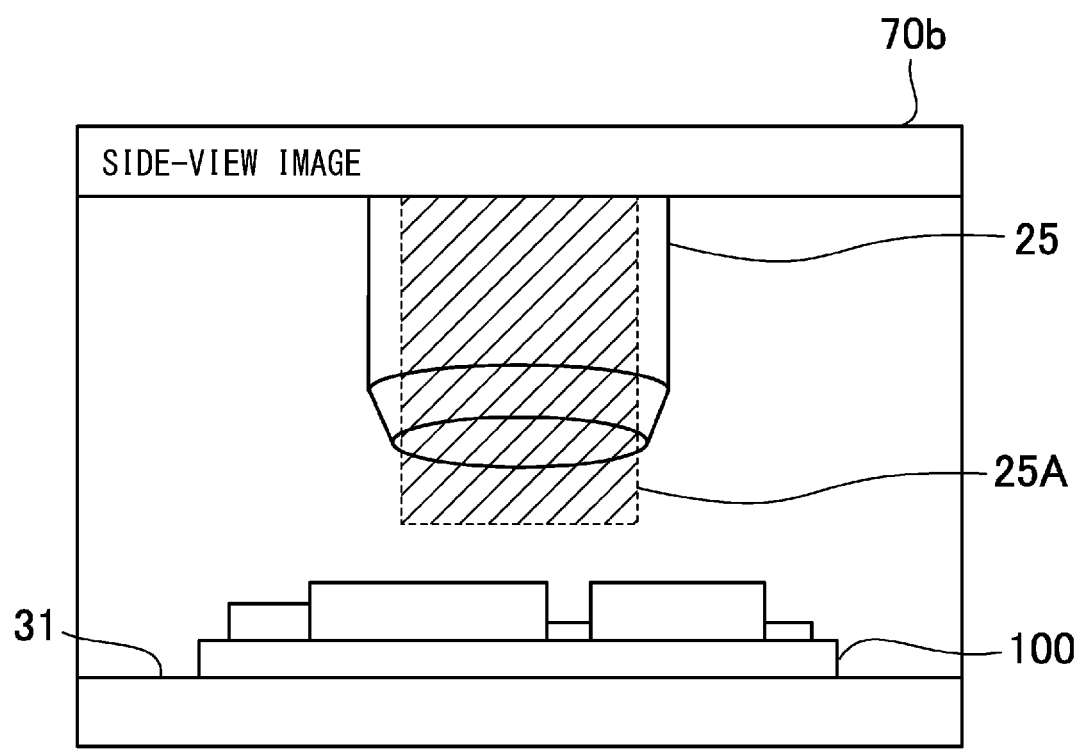
FIG. 47 is a diagram corresponding to FIG. 20 showing an example in which the outline of the objective lens after switching is superimposed and displayed on a side-view image.

The index can also include the outline of the objective lens 25. The outline of the objective lens 25 can be obtained, for example, based on image processing such as edge extraction, and shape information and dimension information stored in the storing unit 89. As shown in FIG. 47, the outline of the objective lens 25A after the revolver 26 is rotated can be displayed by a broken line in the side-view image. As a result, after the objective lens 25 is switched to the objective lens 25A, it can be confirmed in advance whether the objective lens 25A after switching collides with the observation target 100. In a word, when the objective lens 25 observing the observation target 100 is switched to another objective lens 25A, the position index calculating unit 66 is configured to avoid a collision by making the outline of this another objective lens 25A displayed on the display unit 2.

Figure 48:
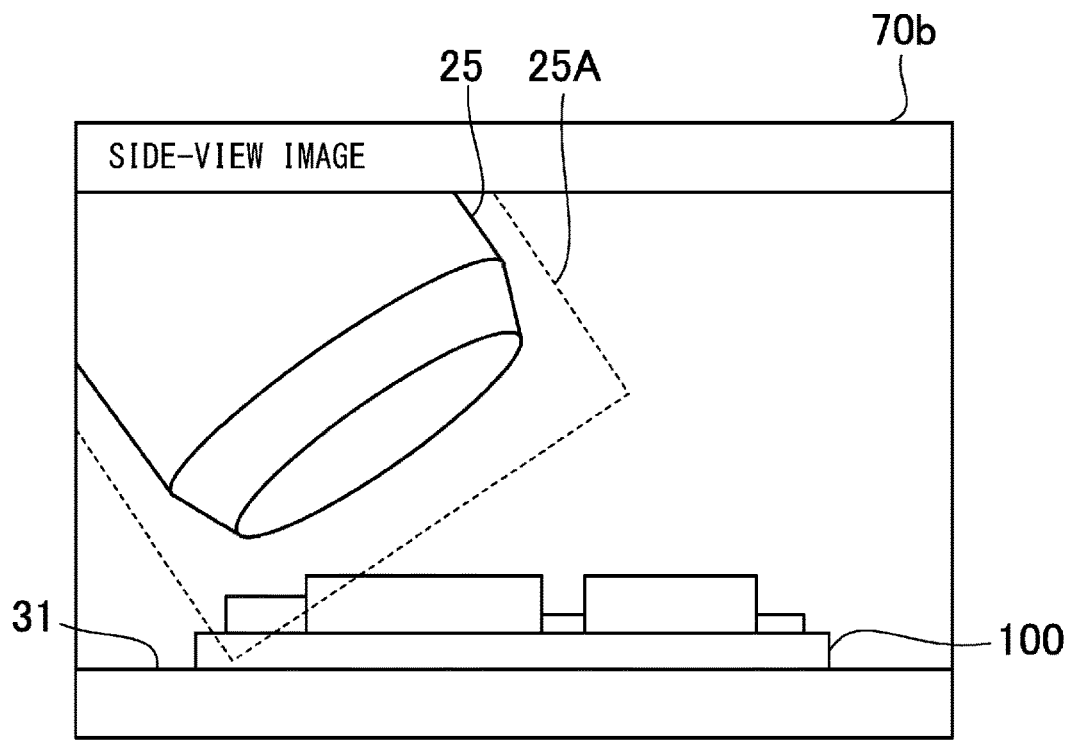
FIG. 48 is a diagram corresponding to FIG. 47 showing a state in which the head unit is swung.

FIG. 48 shows a state in which the head unit 22 is swung. When the head unit 22 swings, the display of the objective lens 25A after switching tilts corresponding to the swing angle of the head unit 22, and thus the user can easily confirm the objective lens 25A after switching.

When the objective lens 25 observing the observation target 100 is switched to another objective lens 25A, a track of movement of this another objective lens 25A can be displayed on the display unit 2. When the objective lens 25 is switched, the objective lens 25 moves around a rotation central line of the revolver 26. Therefore, the movement track of the objective lens 25 can be calculated based on the shape information and dimension information stored in the storing unit 89 and can be displayed on the side-view image.

The index can also include at least one of a line indicating the upper surface of the observation target 100 and a line indicating the upper surface of the placement table 31. The line indicating the upper surface of the observation target 100 is, for example, the observation target edge indication line 71a shown in FIG. 21 or the edge indication line 90 shown in FIG. 31. The line indicating the upper surface of the placement table 31 is a placement table indication line 91 shown in FIG. 31.

Figure 46:
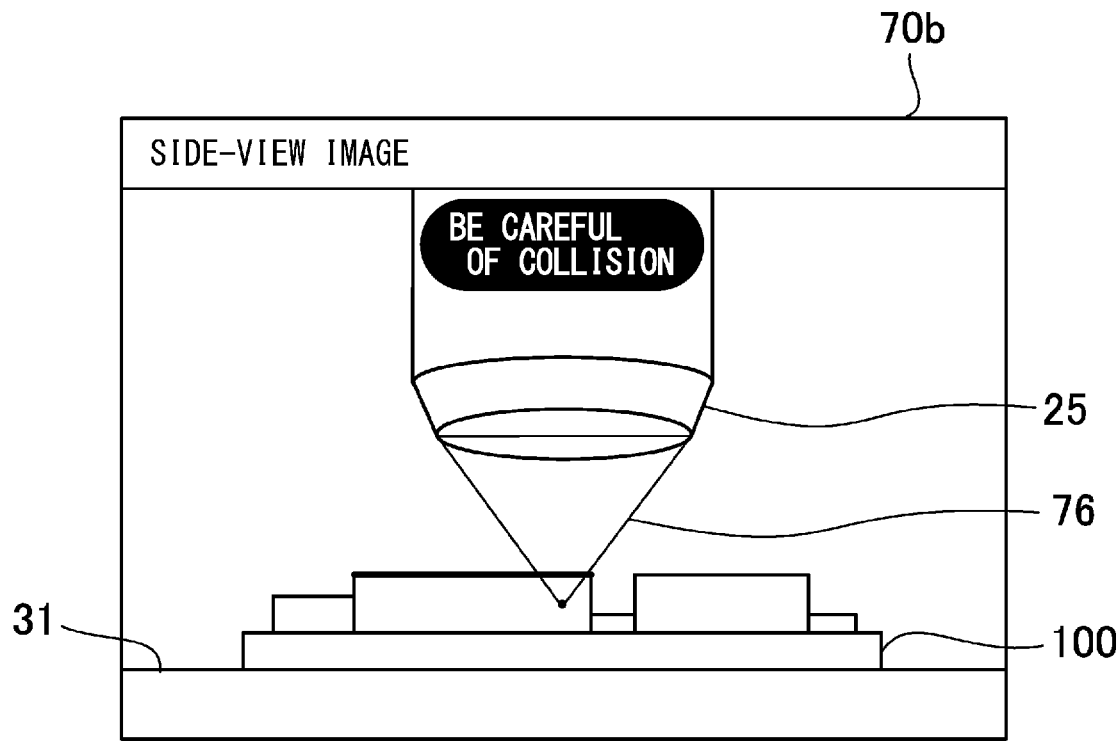
FIG. 46 is a diagram corresponding to FIG. 20 showing an example of a warning display.

The position index calculating unit 66 acquires at least one of the distance between the objective lens 25 and the observation target 100 and the distance between the objective lens 25 and the placement table 31 and determines whether the distance is equal to or lower than a predetermined distance. When the position index calculating unit 66 determines that the distance is equal to or lower than the predetermined distance, the position index calculating unit 66 can cause a warning displayed on the display unit 2. As shown in FIG. 46, when the distance between the objective lens 25 and the observation target 100 is shorter than the working distance of the objective lens 25, it is conceivable that the objective lens 25 does not focus even if the objective lens 25 is lowered further and the objective lens 25 collides with the observation target 100. Therefore, a warning display (warning message display) or a caution display (caution message display) of "Be careful of collision" is performed. The warning display or the caution display may be not only characters but also a mark, a color, or a sound. In addition, when the objective lens 25 and the observation target 100 approach each other with a distance equal to or greater than a predetermined distance, a color of a side view screen may be changed, or a warning display indicating the approaching may be performed. The color of the side view screen may be changed according to the distance between the objective lens 25 and the observation target 100.

The position index calculating unit 66 is configured to calculate an index related to the downward movement limit position of the objective lens 25 when the synthesis processing unit 67 causes the magnified observation image capturing unit 50 to acquire a plurality of synthesis images. It is necessary to set the range of depth synthesis by the synthesis processing unit 67 such that the objective lens 25 does not collide with the observation target 100. In this setting, the collision between the objective lens 25 and the observation target 100 can be avoided by using the index related to the downward movement limit position of the objective lens 25.

Display Control Unit 64

Figure 43:
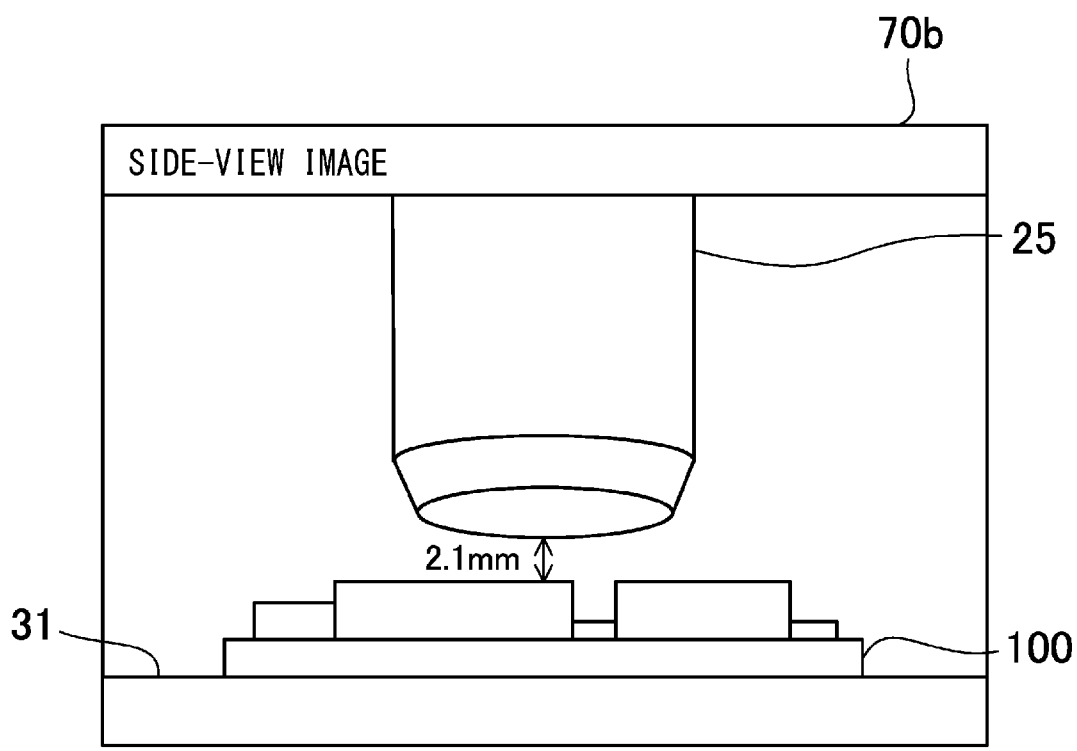
FIG. 43 is a diagram corresponding to FIG. 42 showing a state in which the objective lens is moved downward.
Figure 44:
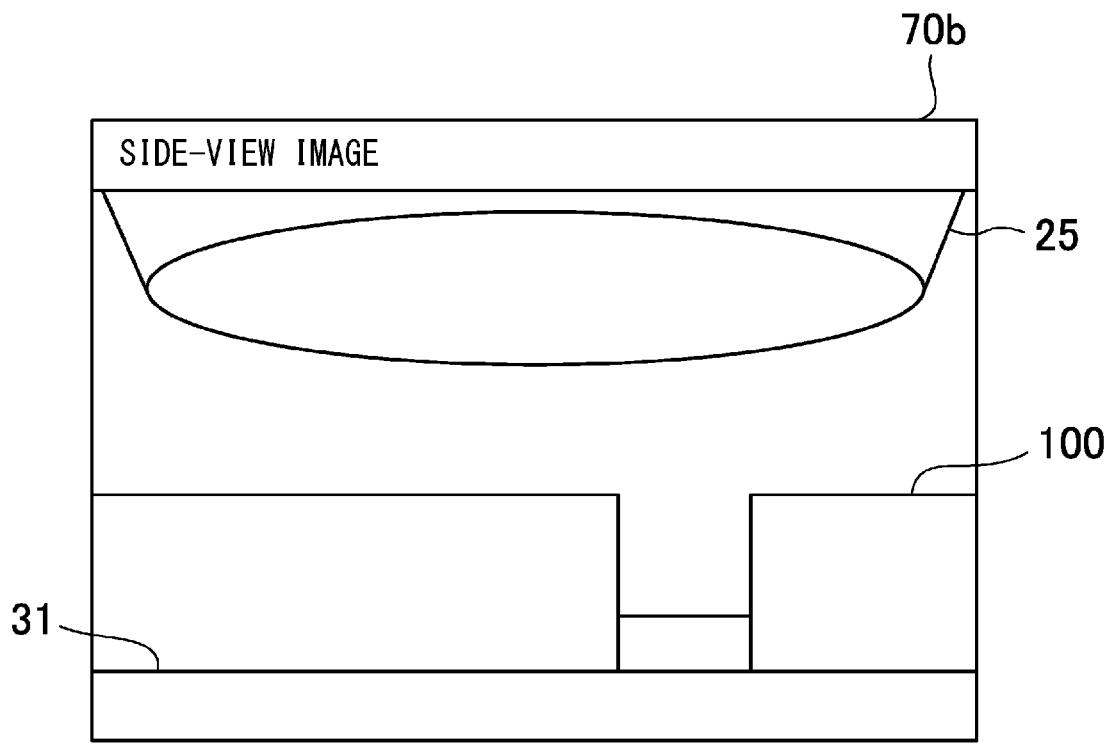
FIG. 44 is a diagram corresponding to FIG. 20 showing an example of magnified display.

Besides controlling the display unit 2 as described above, the display control unit 64 shown in FIG. 17 is configured to change a display magnification of the side-view image according to the distance between the objective lens 25 and the observation target 100 and to display the side-view image on the display unit 2. Specifically, as the distance between the objective lens 25 and the observation target 100 gets smaller, the display magnification of the side-view image is set larger, that is, the side-view image is magnified and displayed. For example, when the objective lens 25 has a high magnification, as shown in FIG. 43, the working distance is several mm or less, and it may be difficult to understand the distance between the objective lens 25 and the observation target 100 in the side-view image. In such a case, by increasing the display magnification of the side-view image, as shown in FIG. 44, the lower end portion of the objective lens 25 and the observation target 100 is magnified and displayed on the display unit 2, and the distance between the lower end portion of the objective lens 25 and the observation target 100 can be easily grasped. The display magnification of the side-view image may be increased stepwise or may be increased almost steplessly. The display magnification of the side-view image may be changed in connection with the change of the distance between the objective lens 25 and the observation target 100, or may be changed manually by the user.

In this example, since the head unit 22 can be swung, the side-view image capturing unit 45 may image the observation target 100 or the objective lens 25 while the head unit 22 swings. The display control unit 64 can cause the side-view image captured by the side-view image capturing unit 45 while the head unit 22 swings to be displayed simultaneously with the image captured by the magnified observation image capturing unit 50 on the display unit 2.

Configuration of Leveling Unit 68

The leveling unit 68 shown in FIG. 17 is a part that performs image processing such that the placement table 31 in the side-view image is substantially horizontal when the head unit 22 swings. In other words, when the side-view image capturing unit 45 acquires a side-view image, as in Embodiment 4 shown in FIG. 10 and FIG. 11, for example, as the side-view image capturing unit 45 is displaced around the axis U with the swinging of the head unit 22, the placement table 31 tilts corresponding to the swing angle of the head unit 22 in the acquired side-view image. In this case, the side-view image is displayed on the display unit 2 after the leveling unit 68 performs image processing of rotating the side-view image such that the placement table 31 is substantially horizontal. Therefore, it is possible to make the side-view image an image with less discomfort when the observation target 100 is observed from a plurality of different angles.

The leveling unit 68 can also be configured to perform, besides image processing of rotating the side-view image such that the placement table 31 is substantially horizontal, trimming processing so as to form a substantially rectangular image which is long in the horizontal direction and which includes the placement table 31. The substantially rectangular image which is long in the horizontal direction is an image shown in FIG. 16, and is an image substantially similar to a shape of a display region of a general display unit 2.

The leveling unit 68 may be a part that performs image processing as described above, or may be a structure attached so that the side-view image capturing unit 45 is not displaced as in Embodiments 1 to 3, 5 and 6. In Embodiments 1 to 3, 5 and 6, since the side-view image capturing unit 45 is not displaced, the horizontal direction of the side-view image capturing unit 45 before swinging is maintained in a horizontal state even if the objective lens 25 swings.

Fully Automatic Observation

Figure 18:
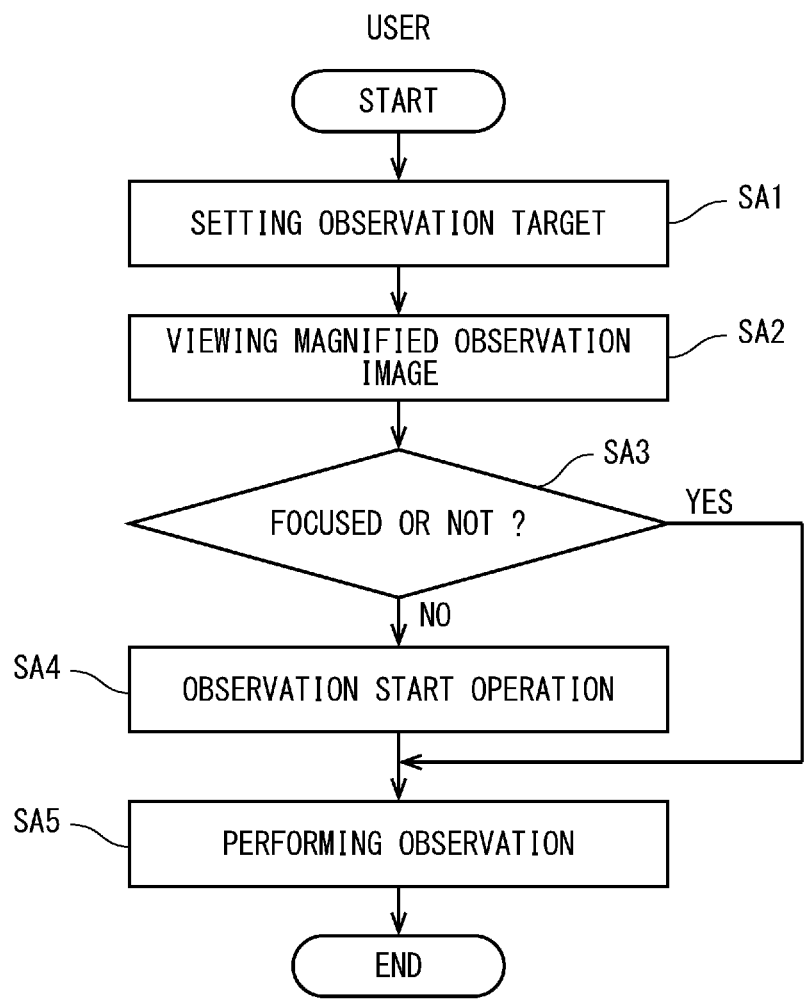
FIG. 18 is a flow chart showing a work procedure of a user in a fully automatic observation.

Next, a case of performing a fully automatic observation by the magnifying observation apparatus A will be described. As shown in the flow chart of FIG. 18, first, the user sets the observation target 100 on the placement table 31 in step SA1. Then, the magnified observation image acquired by the magnified observation image capturing unit 50 is displayed in the magnified observation image display region 70a and the side-view image acquired by the side-view image capturing unit 45 is displayed in the side-view image display region 70b by the user interface 70 as shown in FIG. 16. In step SA2, the user views the magnified observation image displayed in the magnified observation image display region 70a. In step SA3, it is determined whether the magnified observation image displayed in the magnified observation image display region 70a is a focused image or not, and when it is a focused image, the process proceeds to step SA5 to perform an observation. When it is not a focused image, the process proceeds to step SA4 and an observation start operation is performed. The observation start operation can be performed by the controller unit 3, the mouse 4, and the keyboard 6, etc. For example, the observation start operation may be an operating of clicking an observation start button or the like displayed in the user interface 70 shown in FIG. 16.

Figure 19:
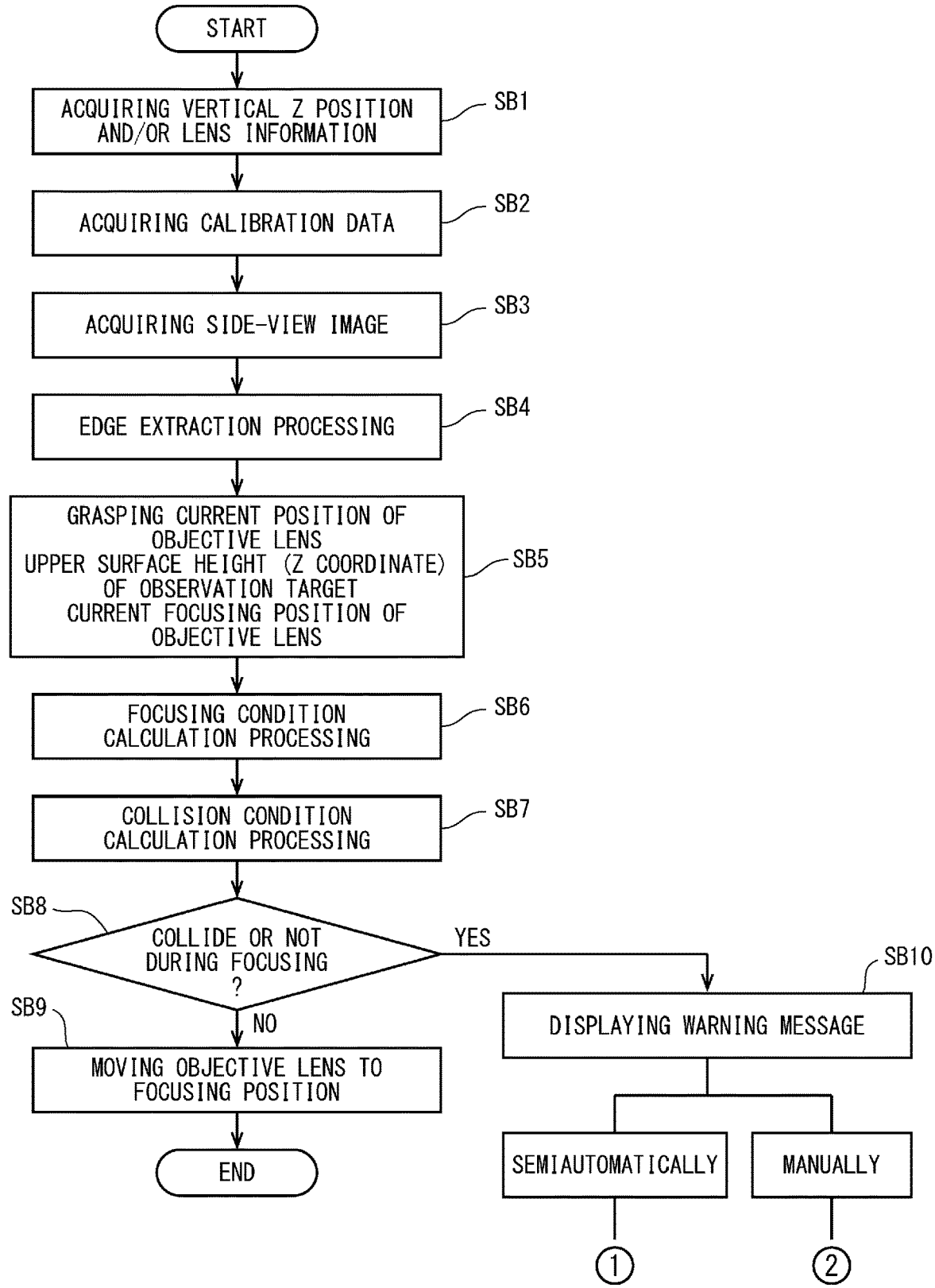
FIG. 19 is a flow chart showing a processing procedure of the magnifying observation apparatus in the fully automatic observation.

As the observation start operation is performed, the process proceeds to a flow chart shown in FIG. 19. Before entering the processing of the flow chart, a coordinate in the virtual space, a coordinate at the pixel of the image sensor of the side-view image capturing unit 45, and a coordinate in the side-view image displayed on the display unit 2 are associated with each other as pre-processing. The pre-processing may be performed before focusing, or may be performed before shipment or after shipment of the magnifying observation apparatus A, or at any time.

The process proceeds to step SB1 in the flow chart of FIG. 19, and a vertical Z position and lens information are acquired. The vertical Z position is the position of the objective lens 25 and the position of the placement table 31. The lens information is information related to the type, shape, dimension of each part, etc. of the objective lens 25 stored in the storing unit 89.

Then, the process proceeds to step SB2, and calibration data is acquired to perform calibration processing. In step SB3, a side-view image captured by the side-view image capturing unit 45 is acquired. It is an image as shown in FIG. 20. In step SB4, edge extraction processing is performed. As a result, as shown in FIG. 21, the observation target edge indication line 71a and the objective lens edge indication line 71b can be displayed.

The process proceeds to step SB5, and a current position of the objective lens 25 is grasped. This can be acquired by a linear scale, or can be acquired by the position of the objective lens edge indication line 71b. In step SB5, an upper surface height (Z coordinate) of the observation target 100 is grasped. This can be acquired by the position of the observation target edge indication line 71a. Further, in step SB5, a current focusing position of the objective lens 25 is grasped. This can be acquired by the working distance of the objective lens 25.

The process proceeds to step SB6, and focusing condition calculation processing is performed. In this step, it is calculated how to move the objective lens 25 in order to focus on the upper surface of the observation target 100. Since the distance from the objective lens 25 to the upper surface of the observation target 100 and the working distance of the objective lens 25 are grasped, the moving direction and moving distance of the objective lens 25 for focusing on the upper surface of the observation target 100 can be calculated.

In step SB7, collision condition calculation processing is performed. In this step, the collision condition is calculated as to how the objective lens 25 is moved to collide with the observation target 100 or the placement table 31. Since the positional relation between the distance from the objective lens 25 to the upper surface of the observation target 100 and the upper surface of the observation target 100 below the objective lens 25 is grasped, it is possible to calculate the condition under which the objective lens 25 collides with the observation target 100 or the placement table 31.

Step SB8 is a step performed before moving the objective lens 25. In step SB8, when the objective lens 25 is moved as calculated in step SB6, it is determined whether the collision condition calculated in step SB7 is met or not. When it is determined YES in step SB8 and there is a possibility that the objective lens 25 may collide with the observation target 100 or the placement table 31, the process proceeds to step SB10 and a warning message is displayed superimposed on the side-view image. The warning message is, for example, "Be careful of collision" shown in FIG. 46. Thereafter, the process proceeds to a flow chart of a semi-automatic observation or a manual observation.

On the other hand, when it is determined NO in step SB8 and there is no possibility that the objective lens 25 will collide with the observation target 100 or the placement table 31, the process proceeds to step SB9 and the objective lens 25 is moved to a focusing position. At this time, a focus position may be searched by the autofocus unit 63 and a focus value may be displayed on the display unit 2.

The autofocus function (automatic focusing function) at the time of the fully automatic observation described above can be performed after an operation having a possibility of defocusing. Examples of the operation having a possibility of defocusing include moving the placement table 31 in the X direction or the Y direction, rotating the placement table 31, swinging the head unit 22, switching the objective lens 25, etc. In addition, a timer imaging mode in which imaging is performed at predetermined time intervals can be incorporated in the control unit 60. In this case, focusing can be performed by the autofocus function before imaging. In addition, it is possible to recognize based on the side-view image that the observation target 100 has been placed on the placement table 31 and to perform automatic focusing by the autofocus function after the observation target 100 is placed on the placement table 31.

Semi-Automatic Observation

Figure 28:
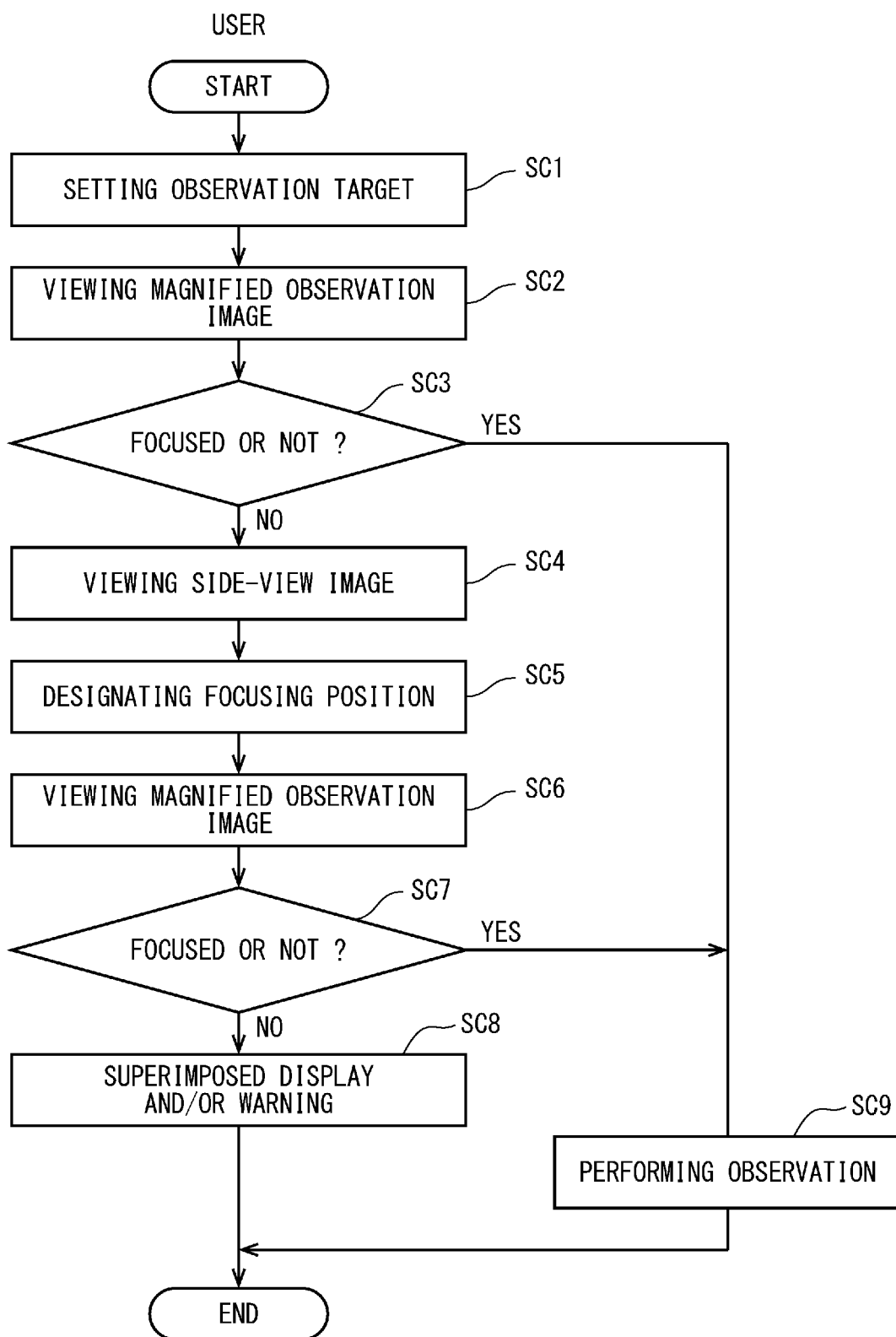
FIG. 28 is a flow chart showing a work procedure of a user in a semi-automatic observation.

Next, a case of performing a semi-automatic observation by the magnifying observation apparatus A will be described. Steps SC1 to SC4 in the flow chart of FIG. 28 are the same as the steps SA1 to SA4 in the flow chart of FIG. 18. In addition, step SC9 in the flow chart of FIG. 28 is the same as the step SA5 in the flow chart of FIG. 18.

Figure 30:
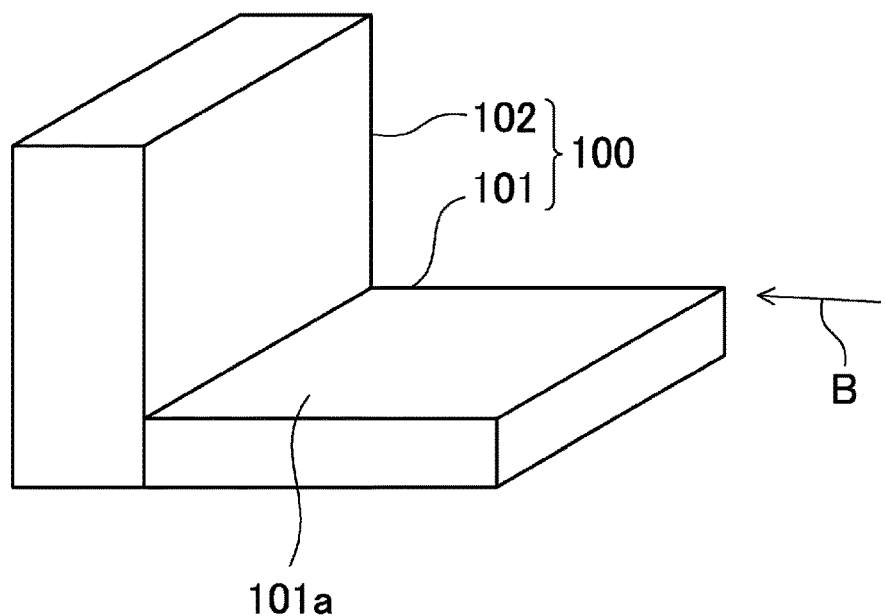
FIG. 30 is a diagram showing an example of an observation target.

When it is determined in step SC3 that it is not a focused image, the process proceeds to step SC4 and the user views the side-view image. Thereafter, the user proceeds to step SC5 and designates a focusing position. For example, in a case where the observation target 100 includes a first portion 101 and a second portion 102 as shown in FIG. 30, the side-view image from a direction of arrow B is displayed as shown in FIG. 31. When edge extraction is performed in a fully automatic observation, it is attempted to focus on the position of the edge indication line 90 on the uppermost surface. Therefore, when a surface 101*a* of FIG. 30 is to be observed, the surface 101*a* in the magnified observation image is not focused. In the semi-automatic observation, as shown in FIG. 31, the focusing position can be arbitrarily designated by the position designation pointer 77.

Figure 29:
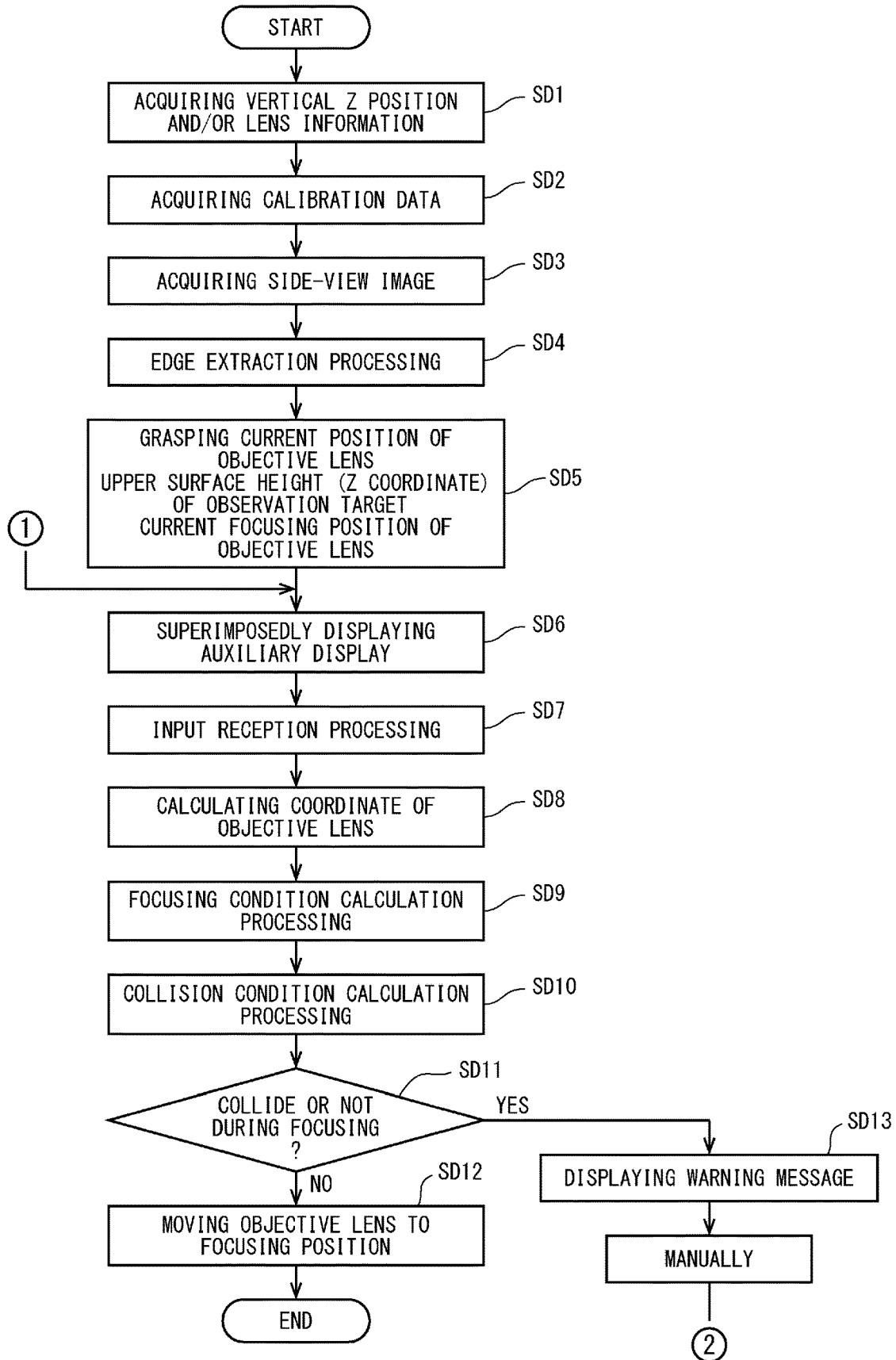
FIG. 29 is a flow chart showing a processing procedure of the magnifying observation apparatus in a semi-automatic observation.

Steps SD1 to SD5 in the flow chart of FIG. 29 are the same as the steps SB1 to SB5 in the flow chart of FIG. 19. After steps SD1 to SD5, when the process proceeds to step SD6, an auxiliary display for assisting position designation is displayed superimposed on the side-view image. The auxiliary display is, for example, the position designation pointer 77 or position designation auxiliary line 77*a* in FIG. 31, thin ink display in FIG. 32, etc.

Thereafter, the process proceeds to step SD7, and input reception processing of receiving a focusing position designated by the user is performed. After receiving the focusing position designated by the user, the process proceeds to step SD8 and coordinates when the objective lens 25 is moved to the focusing position designated by the user are calculated. Steps SD9 to SD11 are the same processing and determination as the steps SB6 to SB8 in the flow chart of FIG. 19. In addition, step SD13 is the same processing as step SB10 in the flow chart of FIG. 19, and step SD12 is the same processing as step SB9 in the flow chart of FIG. 19.

Figure 35A:
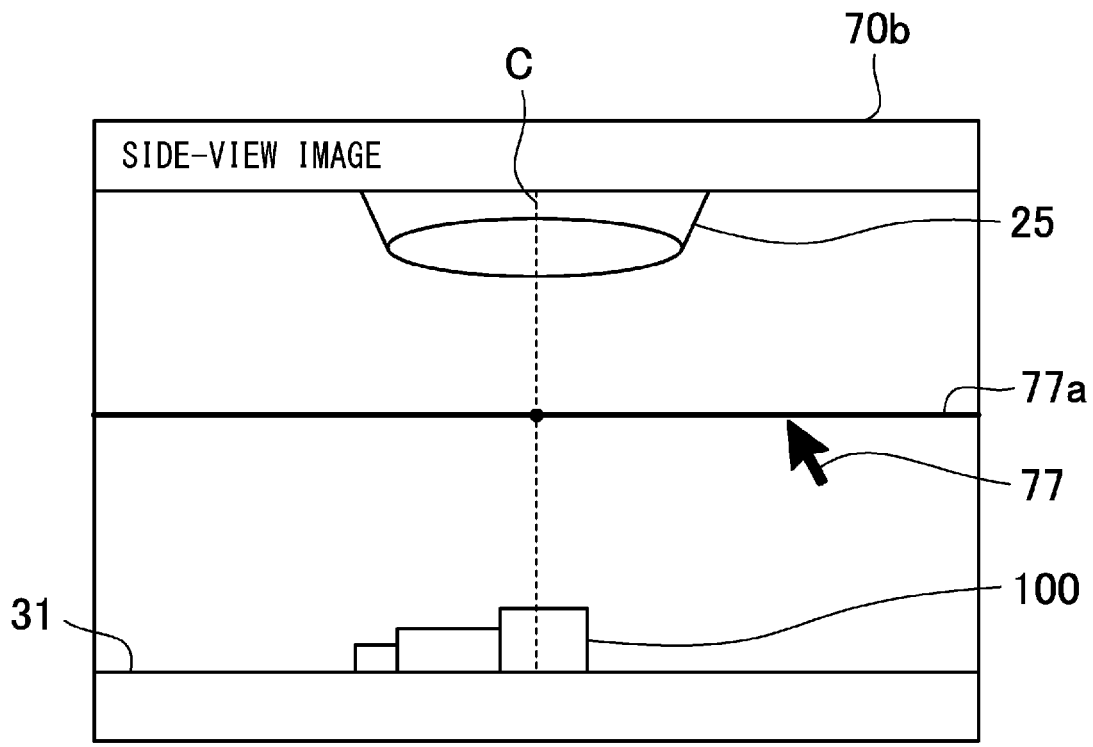
FIG. 35A is a diagram corresponding to FIG. 20 explaining the gist of designating a focusing position by the position designation pointer.
Figure 35B:
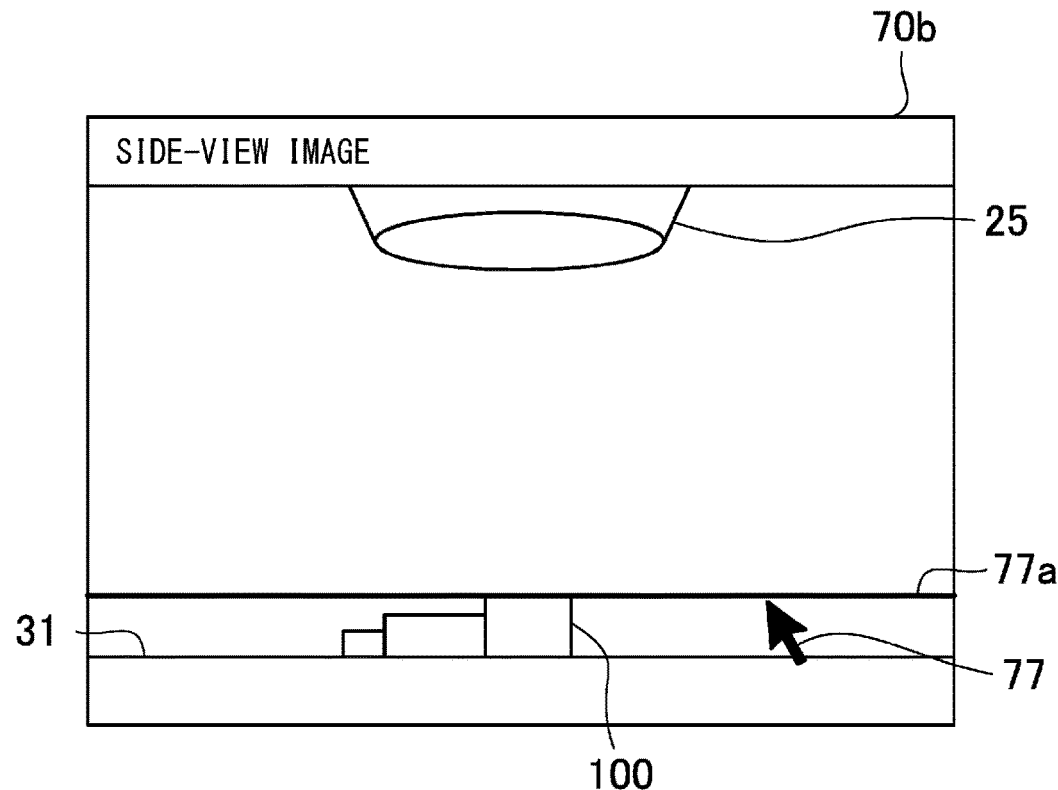
FIG. 35B is a diagram corresponding to FIG. 35A showing a state in which a focusing position is designated.

The designation of the focusing position by the user will be described in detail with reference to FIG. 35A, FIG. 35B and FIG. 35C. In FIG. 35A, the position designation pointer 77 and the position designation auxiliary line 77*a* are displayed, and a straight line C indicating the optical axis of the objective lens 25 is also displayed. As shown in FIG. 35B, when the user lowers the position designation pointer 77, the position designation auxiliary line 77*a* also lowers in connection. Then, when the position designation pointer 77 and the position designation auxiliary line 77*a* reach a height that the user wants to designate as the focusing position, a position designation operation (button operation of the mouse 4, etc.) is performed. As a result, the input of the focusing position designated by the user is completed.

Figure 35C:
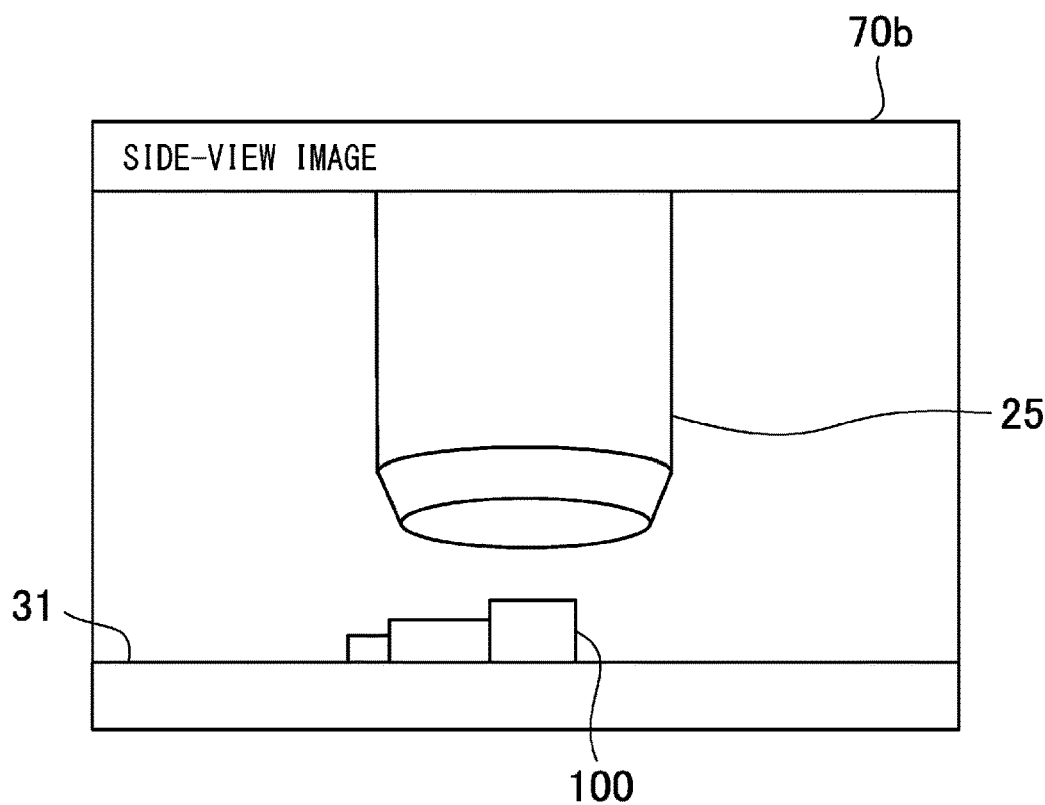
FIG. 35C is a diagram corresponding to FIG. 35A showing a state in which the objective lens has moved to the focusing position.

Thereafter, as shown in FIG. 35C, the objective lens 25 moves such that the focusing position of the objective lens 25 becomes the focusing position designated by the user.

Figure 36:
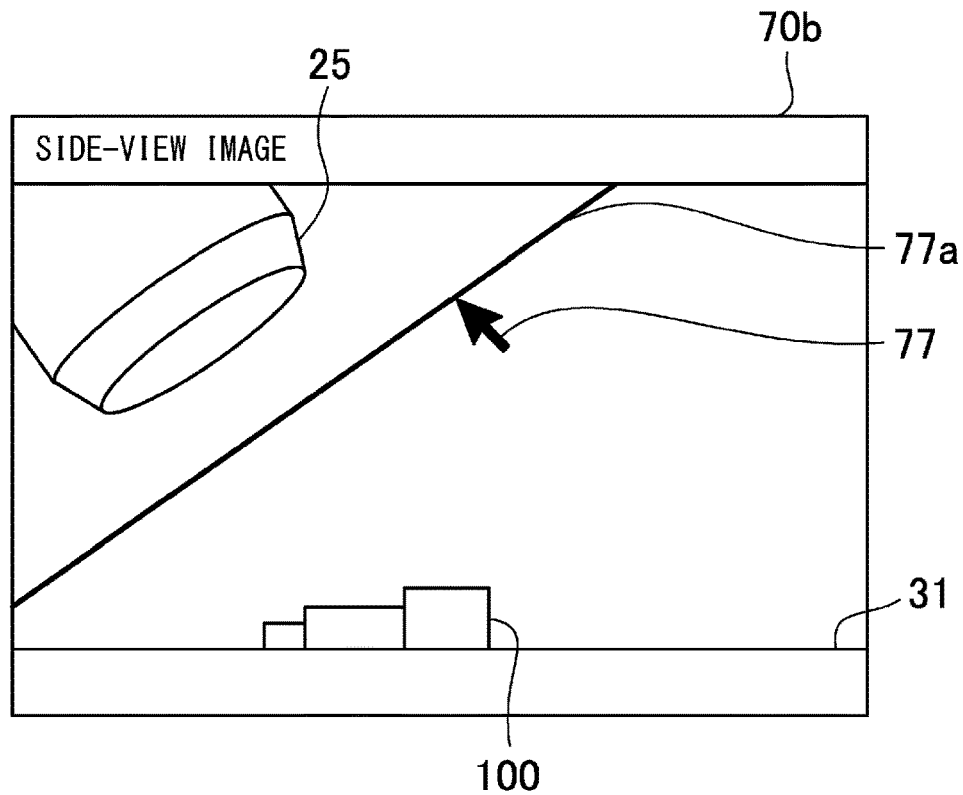
FIG. 36 is a diagram corresponding to FIG. 35A showing a state in which the head unit is swung.

FIG. 36 shows a state in which the head unit 22 is swung. When the head unit 22 swings, the position designation auxiliary line 77*a* tilts corresponding to the swing angle of the head unit 22. Therefore, the user can easily input a position.

Figure 37:
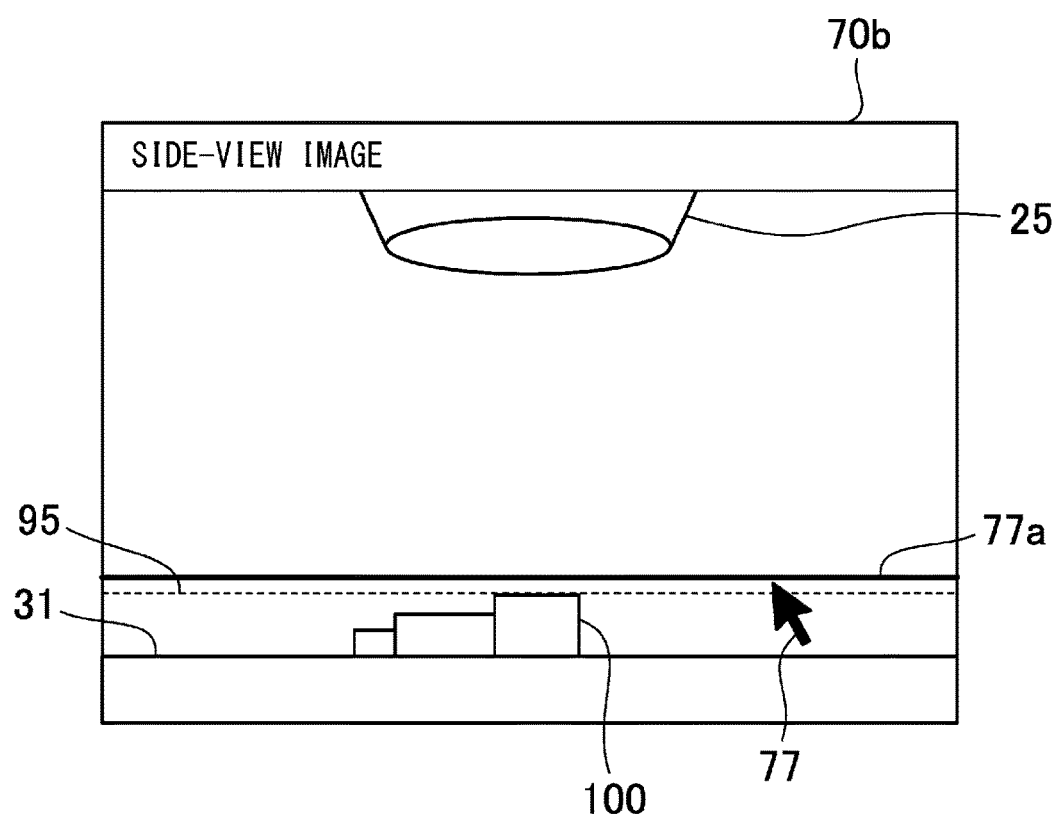
FIG. 37 is a diagram corresponding to FIG. 20 showing an example in which a lower limit indication line indicating the lower limit of position designation is shown.

As shown in FIG. 37, a lower limit indication line 95 indicating the lower limit of the position designation may be displayed in the side-view image. For example, the uppermost surface of the observation target 100 may be extracted as an edge by edge extraction processing, and the lower limit indication line 95 can be generated using this edge as the lower limit of the position designation. The lower limit indication line 95 may be input by the user.

When the process proceeds to the semi-automatic observation in the flow chart shown in FIG. 19, the processing of step SD6 in the flow chart shown in FIG. 29 is performed.

On the other hand, by going through step SC5 in the flow chart shown in FIG. 28, it is possible to focus on the position designated by the user as described above. Therefore, the process proceeds to step SC6 and the magnified observation image is viewed. In step SC7, it is determined whether the magnified observation image displayed in the magnified observation image display region 70*a* is a focused image or not, and when it is determined as a focused image, the process proceeds to step SC9 to perform an observation. When it is not a focused image, the process proceeds to step SC9 and various superimposed displays (superimposed display on the side-view image) and warning displays are performed. The superimposed display can include, for example, a guide display (shown by reference numeral 76 in FIG. 40) indicating the working distance of the objective lens 25, etc.

Manual Observation

Figure 38:
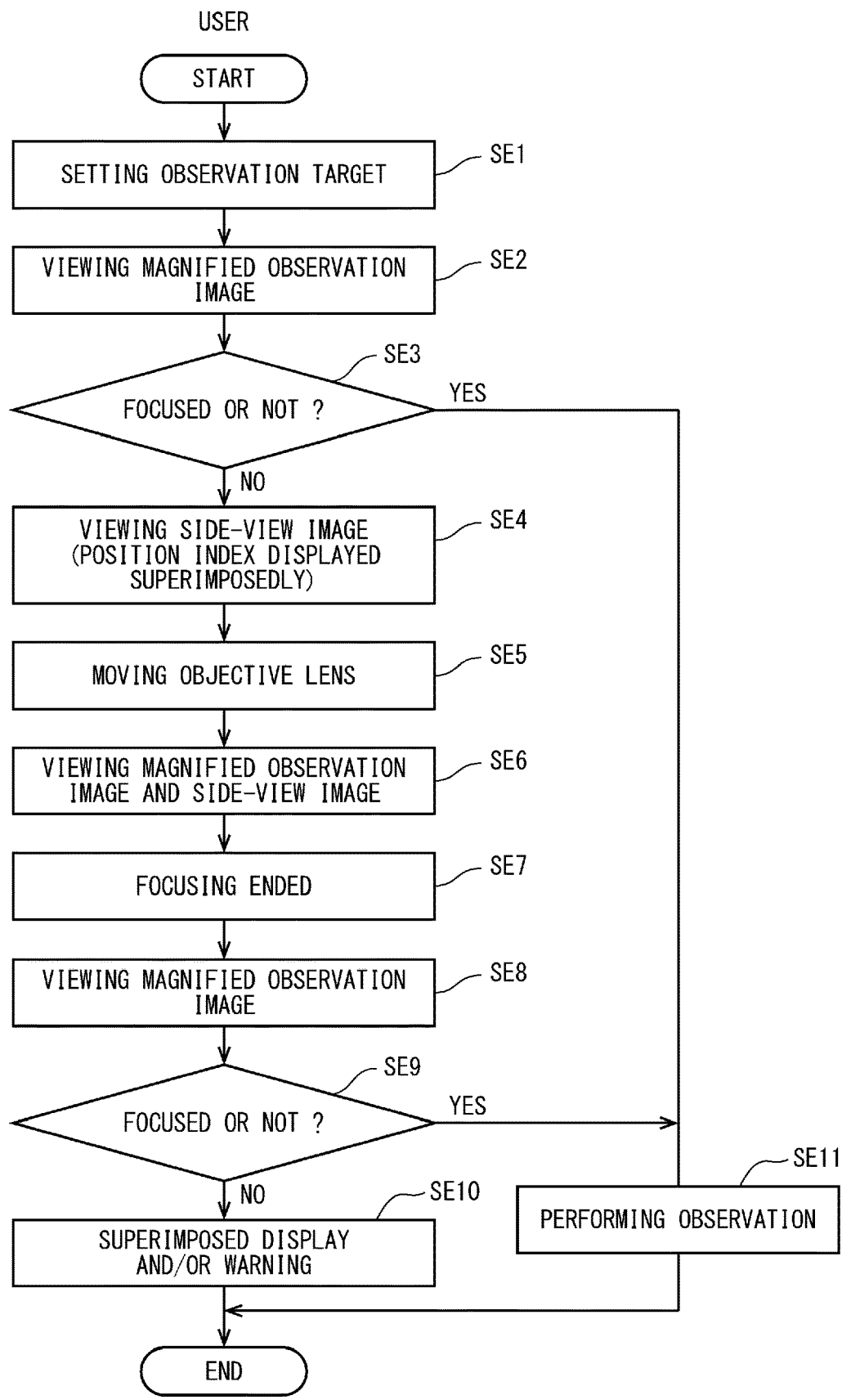
FIG. 38 is a flow chart showing a work procedure of a user in a manual observation.

Next, a case of performing a manual observation by the magnifying observation apparatus A will be described. Steps SE1 to SE3 in the flow chart of FIG. 38 are the same as the steps SA1 to SA3 in the flow chart of FIG. 18. In step SE4, the user views the side-view. The guide display 76 as a position index shown in FIG. 40, a distance shown in FIG. 42, etc., are superimposed and displayed in the side-view.

Figure 41:
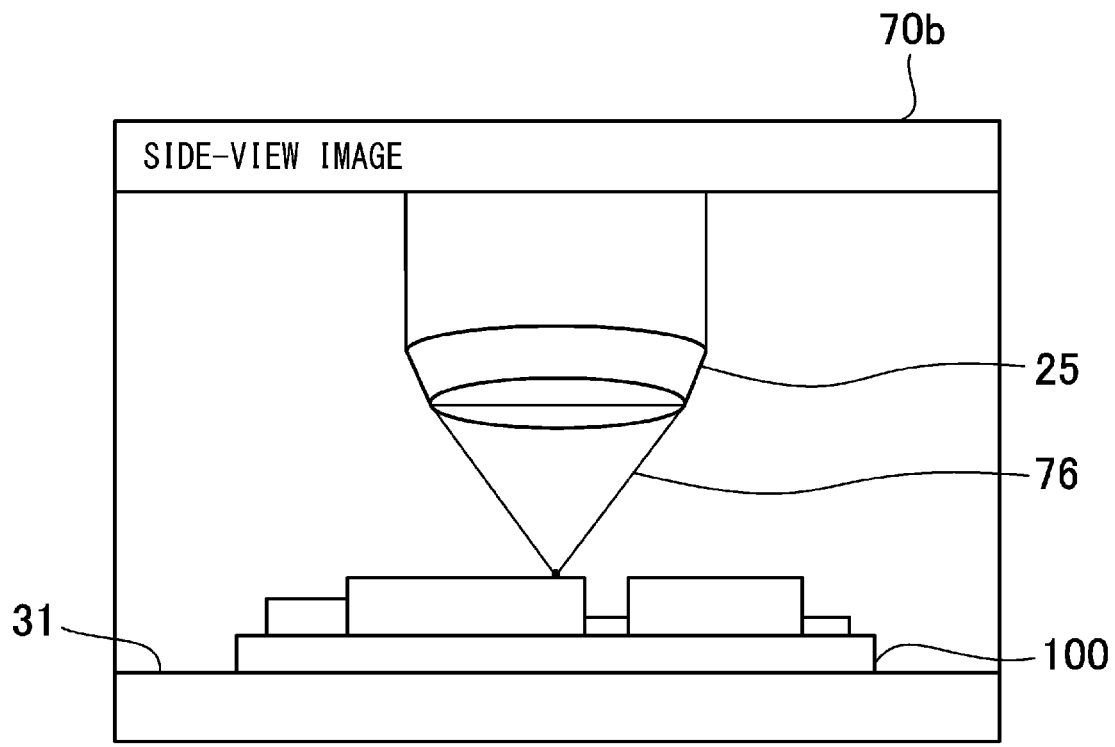
FIG. 41 is a diagram corresponding to FIG. 40 showing a state in which the objective lens is moved downward.

In step SE5, the user moves the objective lens 25. Then, the process proceeds to step SE6. In step SE6, the focusing position is adjusted while viewing the magnified observation image. In this case, since it is possible to move the objective lens 25 while viewing the side-view as shown in FIG. 41 and FIG. 43, a standard of the focusing position can be known. In a word, at the time of manual operation, it is possible to focus while viewing both the magnified observation image and the side-view image.

When focusing is finished in step SE7, the process proceeds to step SE8 and the magnified observation image is viewed. In step SE9, it is determined whether the magnified observation image displayed in the magnified observation image display region 70a is a focused image or not, and when it is determined as a focused image, the process proceeds to step SE11 to perform an observation. When it is not a focused image, the process proceeds to step SE10 and various superimposed displays (superimposed display on the side-view image) and warning displays are performed. The superimposed display can include, for example, a guide display (shown by reference numeral 76 in FIG. 40) indicating the working distance of the objective lens 25, etc.

Figure 39:
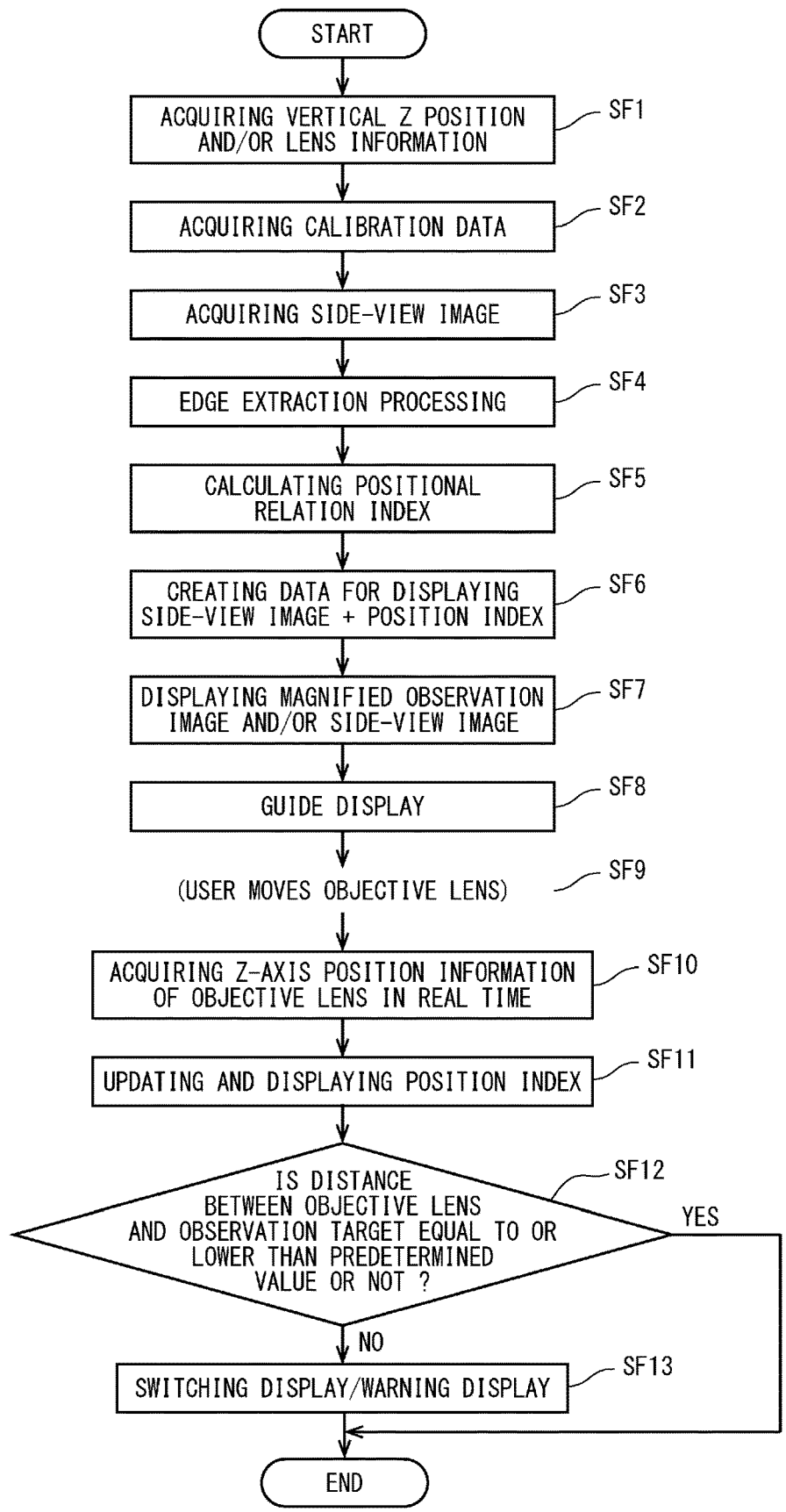
FIG. 39 is a flow chart showing a processing procedure of the magnifying observation apparatus in the manual observation.

Details of the manual observation will be described. Steps SF1 to SF4 in the flow chart shown in FIG. 39 are the same processing as steps SB1 to SB4 in the flow chart shown in FIG. 19. In step SF5, a position index of the working distance and the like of the objective lens 25 is calculated. In step SF6, the position index calculated in step SF5 and the side-view image are synthesized to create display data. This may be performed by the display control unit 64 or may be performed by the control unit 60.

Then, the process proceeds to step SF7 and the magnified observation image and the side-view image are displayed on the display unit 2. In step SF8, a guide display which guides the user to designate a position is displayed on the display unit 2 such that the guide display overlaps the side-view image. Step SF9 is a step performed by the user, and the objective lens 25 is moved.

In step SF10, the control unit 60 acquires positional information in the Z direction of the objective lens 25 in real time based on an output of a linear scale. In step SF11, the position index is updated and displayed on the display unit 2 so as to correspond to the update of the positional information in the Z direction of the objective lens 25. For example, when the objective lens 25 moves from a position shown in FIG. 40 to a position shown in FIG. 41, the guide display 76, which also functions as a position index, is updated at a predetermined timing such that the position moves from the position shown in FIG. 40 to the position shown in FIG. 41. Similarly, when the objective lens 25 moves from a position shown in FIG. 42 to a position shown in FIG. 43, a value indicating the distance between the objective lens 25 and the observation target 100 is updated at a predetermined timing.

In step SF12, it is determined whether the distance between the objective lens 25 and the observation target 100 is equal to or less than a predetermined distance. The predetermined distance may be, for example, less than the working distance of the objective lens 25, and is a distance where the objective lens 25 is not focused even if it approaches closer than the predetermined distance. That is, in step SF12, it can be determined whether the objective lens 25 and the observation target 100 are too close to each other or not.

When it is determined NO in step SF12, the process proceeds to the end because there is no possibility that the objective lens 25 and the observation target 100 collide with each other. On the other hand, when it is determined YES in step SF12, there is a possibility that the objective lens 25 and the observation target 100 collide with each other. Therefore, the process proceeds to step SF13 and the display is switched to display a warning.

Eucentric Observation

After the objective lens 25 is focused, the objective lens 25 is moved by the objective lens Z-axis direction driving unit 80 and the placement table 31 is moved by the placement unit Z-direction driving unit 83 while the focused state is maintained to arrange an observation target portion of the observation target 100 in a position where the eucentric observation is possible. As a result, even when the head unit 22 is swung, the observation target portion of the observation target 100 does not deviate from the visual field of the magnified observation image capturing unit 50 and the eucentric observation becomes possible.

Example of Display Form

Figure 49A:
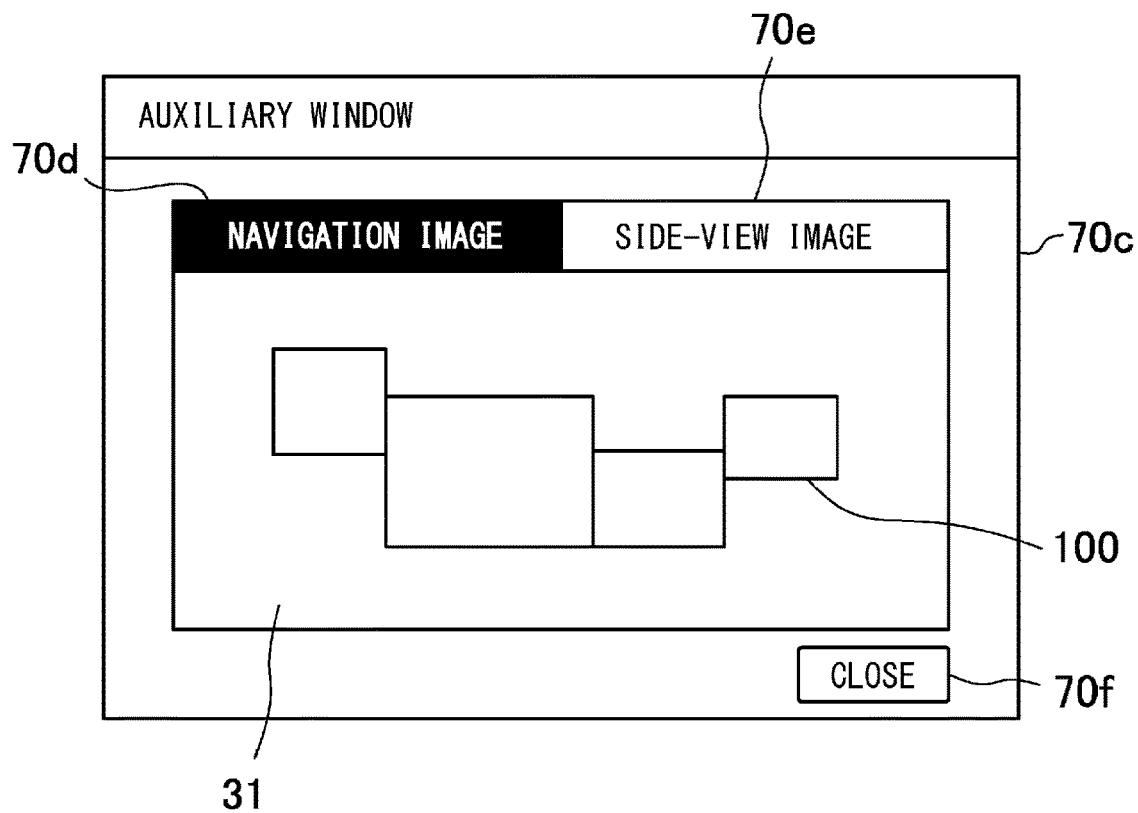
FIG. 49A is a diagram showing an auxiliary window of a user interface and showing a display example of a navigation image.
Figure 49B:
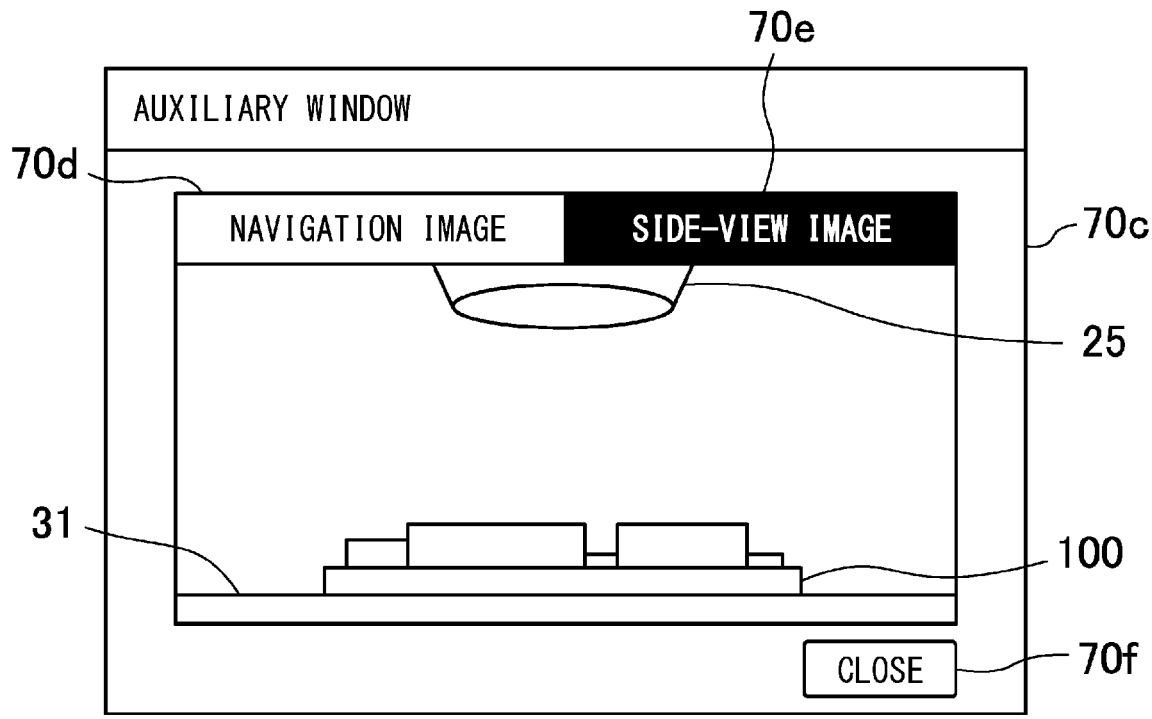
FIG. 49B is a diagram corresponding to FIG. 49A showing a display example of a side-view image.

FIG. 49A and FIG. 49B are display examples displayed on the user interface 70 shown in FIG. 16 and show an auxiliary window 70c. In the auxiliary window 70c, a navigation image and a side-view image can be selectively displayed. The navigation image is an image obtained by imaging the observation target 100 from an upper side, and is an image with a range wider than the visual field of the objective lens 25. The navigation image can be acquired by moving the placement table 31 in the x direction and the Y direction by the placement unit XY-direction driving unit 82 and performing processing of connecting the captured images each time. A side-view image of the auxiliary window 70c shown in FIG. 49B is an image acquired by the side-view image capturing unit 45. It can be automatically focused by the autofocus function before imaging.

The navigation image is displayed by selecting a navigation image tab 70d at an upper portion of the auxiliary window 70c, and the side-view image is displayed by selecting a side-view image tab 70e. In addition, by operating a "close" button 70f, the auxiliary window 70c can be closed. The display of the auxiliary window 70c is possible by providing a display button (not shown) on the user interface 70 and detecting an operation of this button.

Storing Image

The side-view image acquired by the side-view image capturing unit 45 and the magnified observation image acquired by the magnified observation image capturing unit 50 can be stored in the storing unit 89. When the user performs an operation of storing an image, the side-view image and the magnified observation image acquired by imaging the same observation target 100 are stored in association with each other in the storing unit 89. Observation date and time, the name of the observation target 100, etc. can also be stored in association with the image in the storing unit 89.

Example of Observation Using Magnifying Observation Apparatus A

Figure 50:
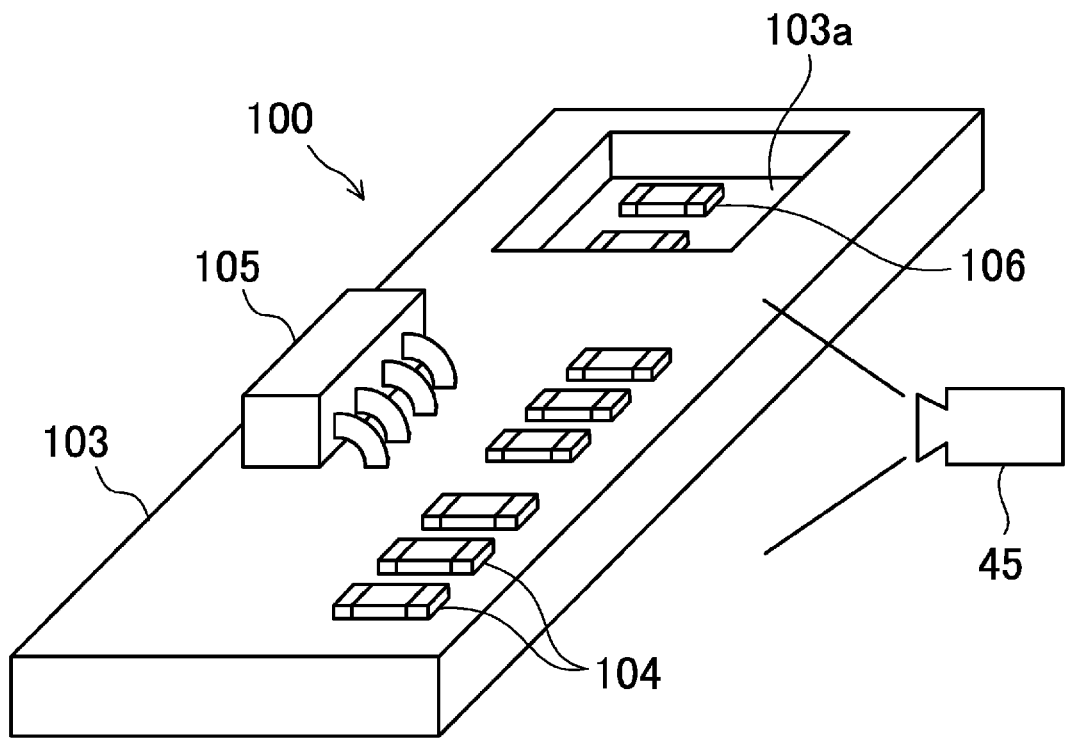
FIG. 50 is a diagram showing an electronic component as an observation target.

Next, a specific example of observation using the magnifying observation apparatus A will be described. FIG. 50 is a perspective view of the observation target 100 used in this example, and is specifically an electronic component. The observation target 100 includes a substrate 103, a resistor 104, a connector 105, and a capacitor 106. The resistor 104 and the connector 105 are provided protruding from an upper surface of the substrate 103. On the other hand, the capacitor 106 is provided in a recess 103a formed in the substrate 103 and cannot be seen from a side surface.

It is assumed that the observation target 100 is set on the placement table 31 such that the side-view image capturing unit 45 is positioned at a side of the observation target 100. The resistor 104 and the capacitor 106 are observed in this order.

Figure 51A:
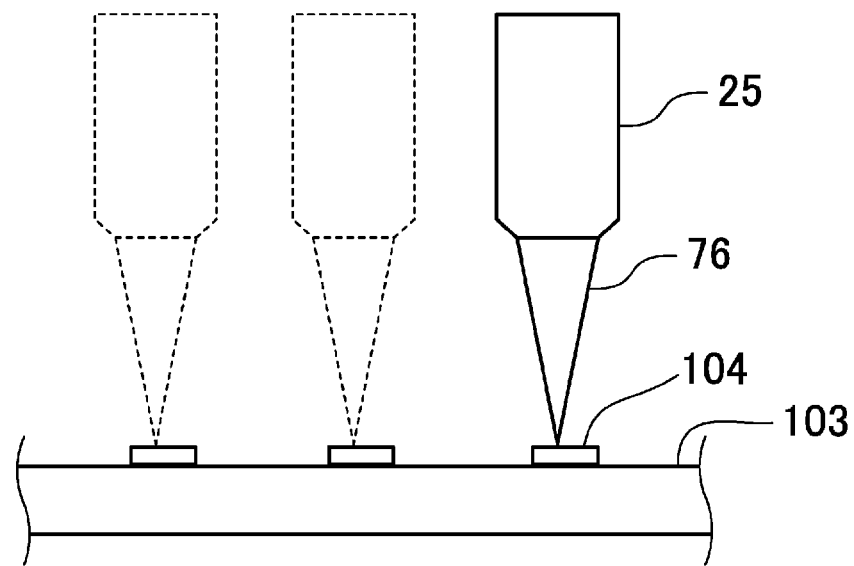
FIG. 51A is a diagram explaining a state in which a resistor is observed.

First, as shown in FIG. 51A, when the placement table 31 is moved by the placement unit XY-direction driving unit 82 such that the resistor 104 enters the visual field of the objective lens 25, as described in the automatic observation field, the focus of the objective lens 25 automatically matches the upper surface of the resistor 104, and thus the resistor 104 can be observed. Reference numeral 76 is a guide display indicating the working distance of the objective lens 25.

Figure 51B:
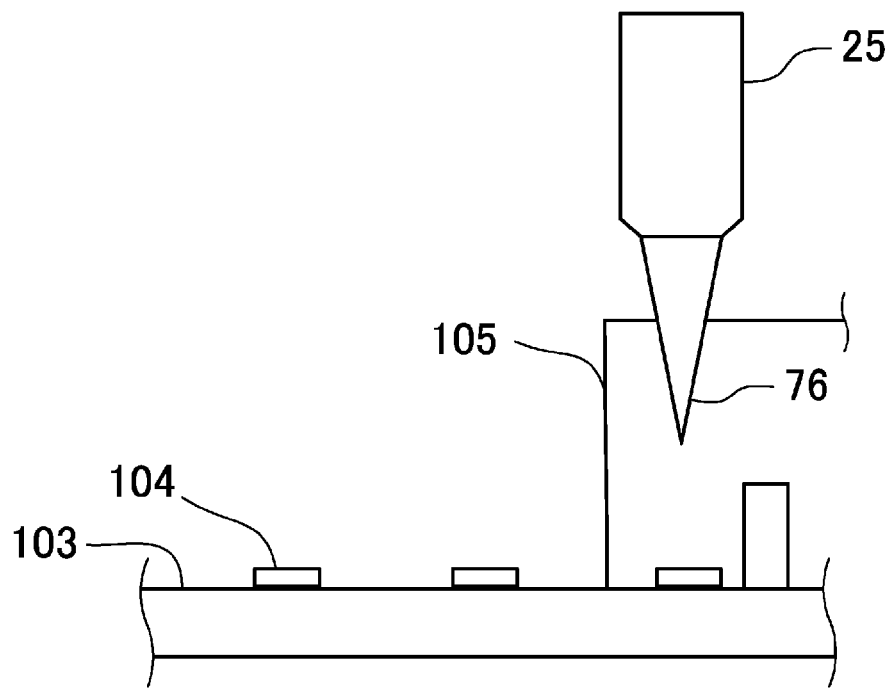
FIG. 51B is a diagram showing a state in which the resistor is out of focus due to the presence of a connector on the back.
Figure 51C:
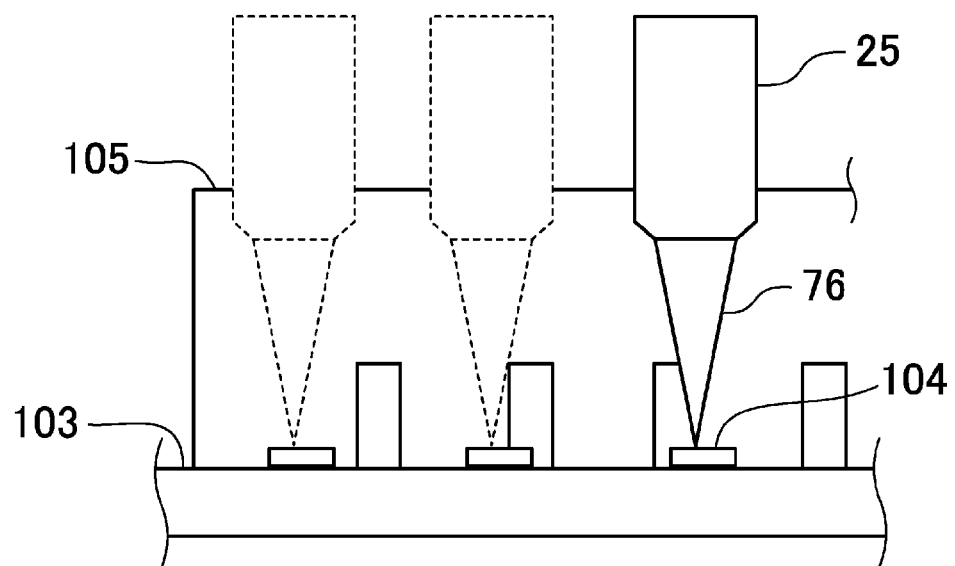
FIG. 51C is a diagram showing a state in which the resistor is in focus by position designation.

When the resistor 104 is observed in sequence, as shown in FIG. 51B, the connector 105 is reflected behind the resistor 104 in the side-view image. In this case, the upper surface of the connector 105 is higher than the upper surface of the resistor 104. Therefore, in the fully automatic observation, the focus of the objective lens 25 will match the upper surface of the connector 105 and the resistor 104 cannot be observed. In this case, as described in the semi-automatic observation field, the focus of the objective lens 25 matches the upper surface of the resistor 104 by designating the focal position as the upper surface of the resistor 104 or by designating the upper surface of the substrate 103 as a lower limit of focus search. As a result, as shown in FIG. 51C, the resistor 104 can be observed even though the connector 105 is present in the rear portion.

Figure 51D:
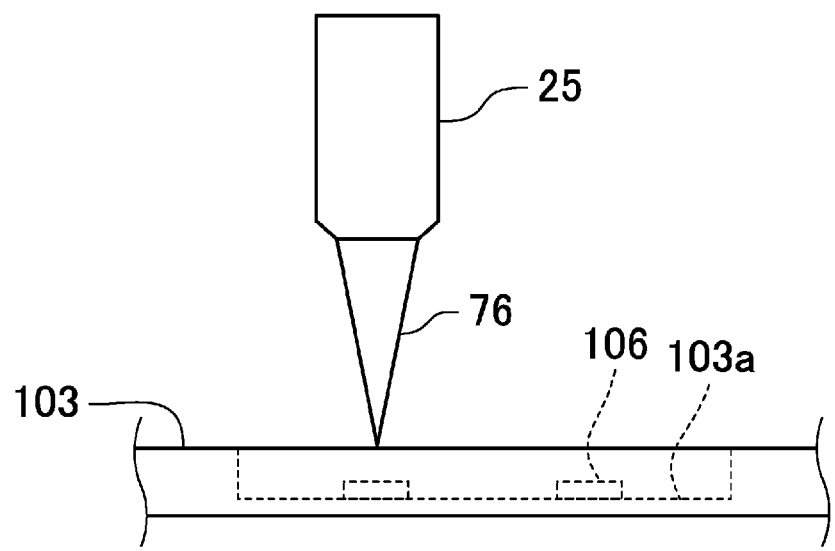
FIG. 51D is a diagram showing a state in which a capacitor is out of focus due to a recess provided in the capacitor.

When the placement table 31 is further moved by the placement unit XY-direction driving unit 82 and the capacitor 106 is to be observed as shown in FIG. 51D, the upper surface of the resistor 104 is designated as the focal position and the upper surface of the substrate 103 is designated as the lower limit of the focus search. Therefore, the capacitor 106 which is below the lower limit is not focused. Moreover, the recess 103a cannot be confirmed in the side-view image, and thus a semi-automatic position designation is also a difficult situation.

Figure 51E:
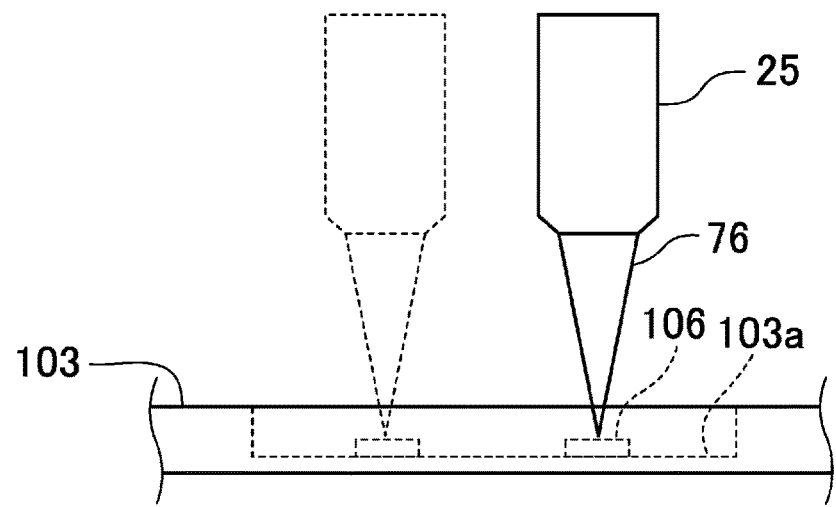
FIG. 51E is a diagram showing a state in which the capacitor is in focus by a manual operation.

In such a case, a manual observation is performed. That is, for example, by superimposing and displaying the working distance of the objective lens 25 as the reference numeral 76 on the side-view image, the objective lens 25 can be manually moved while predicting the focusing position. As a result, as shown in FIG. 51E, an observation can be easily performed even on a portion that cannot be seen from the side.

Effect of Embodiment

As described above, according to the magnifying observation apparatus A according to the embodiment, the side-view image capturing unit 45 that acquires an image including at least the upper surface of the observation target 100 is provided separately from the magnified observation image capturing unit 50 that receives reflected light or transmitted light from the observation target 100 via the objective lens 25. Since the autofocus can be executed after the positional relation information between the objective lens 25 and the observation target 100 is acquired, the function of autofocus can be fully utilized while avoiding the collision between the objective lens 25 and the observation target 100.

Furthermore, the user can designate an arbitrary position in the side-view image captured by the side-view image capturing unit 45 and the magnifying observation apparatus A is controlled based on the position designation. Therefore, it is possible to easily obtain a magnified observation image in which the user's intention is reflected.

Moreover, based on the side-view captured by the side-view image capturing unit 45, an index related to the distance between the objective lens 25 and the observation target 100 or the distance between the objective lens 25 and the placement table 31 can be calculated and displayed on the display unit 2. Therefore, it is possible to support the operation the user performs at the time of observation and to work efficiently.

Further, when the side-view image is acquired by the side-view image capturing unit 45, the influence of the background can be reduced and the placement table 31 and the observation target 100 can be easily grasped.

In addition, it is possible to observe the observation target 100 from a plurality of different angles due to the eucentric mechanism. Moreover, separately from the magnified observation image, a side-view image including the placement table 31 can be acquired and displayed on the display unit 2.

Figure 52A:
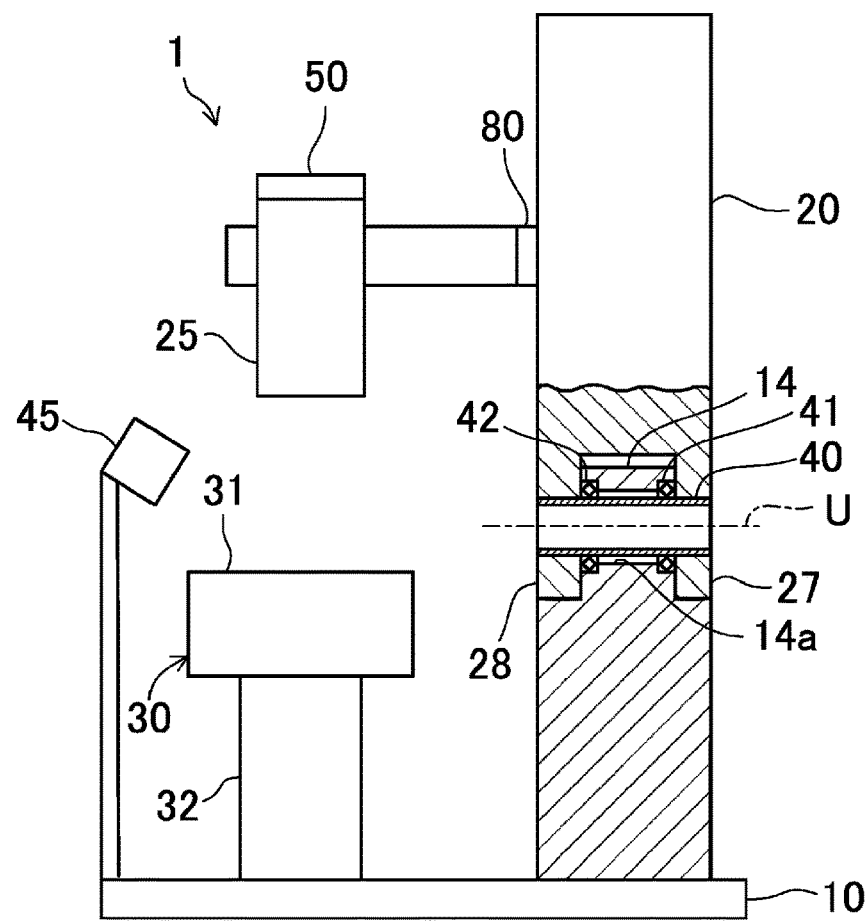
FIG. 52A is a diagram corresponding to FIG. 5 according to Embodiment 7.

Moreover, FIG. 52A shows the magnifying observation apparatus A according to Embodiment 7 of the invention. The side-view image capturing unit 45 may not be provided on the stand unit 20, and may be provided on a side opposite to the stand unit 20.

Figure 52B:
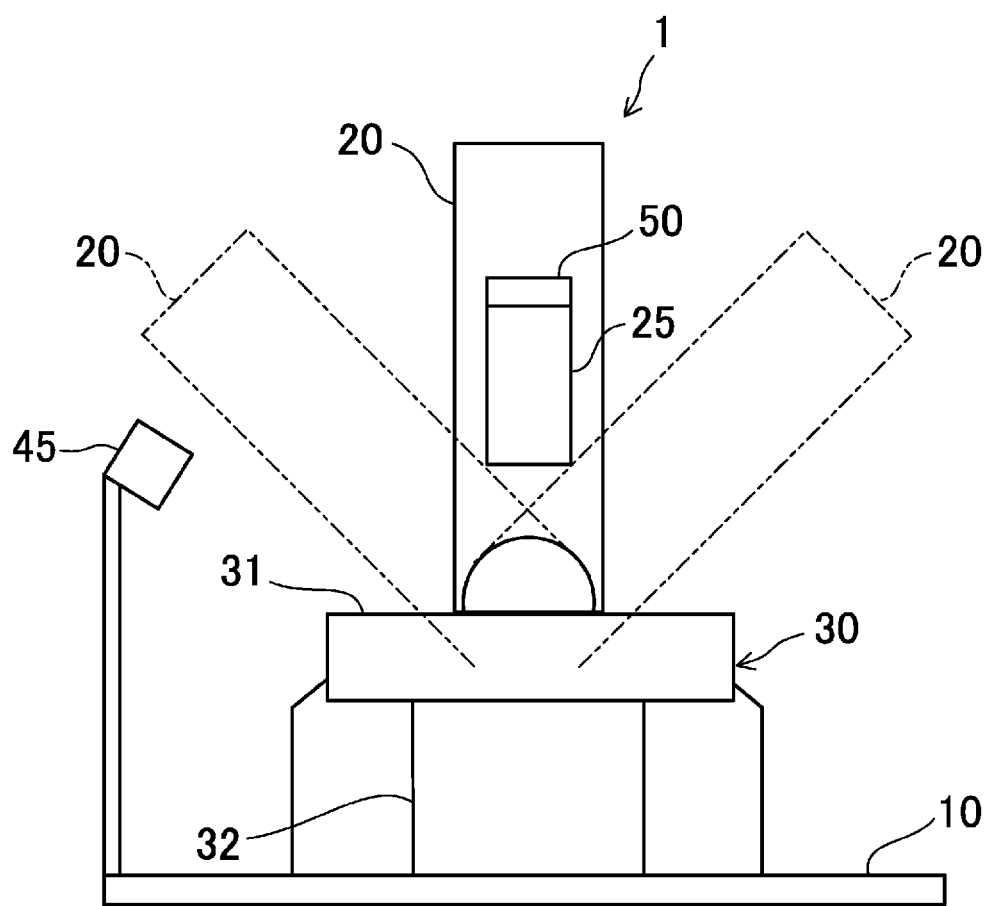
FIG. 52B is a diagram corresponding to FIG. 3 according to Embodiment 8.

In addition, FIG. 52B shows the magnifying observation apparatus A according to Embodiment 8 of the invention, and the side-view image capturing unit 45 may be provided on a lateral side of the stand unit 20.

The embodiments described above are merely illustrative in all respects and should not be interpreted limitedly. Furthermore, all variations and modifications belonging to equivalent scopes of the claims fall within the scope of the invention.

As described above, the magnifying observation apparatus according to the invention can be used in cases of magnifying and observing a sample of a micro object and the like, an electronic component, or work such as workpiece.

What is claimed is:

1. A magnifying observation apparatus which irradiates an observation target with illumination light and detects a light receiving amount of reflected light or transmitted light of the illumination light from the observation target to generate an image of the observation target and to display the image to enable a magnified observation, wherein the magnifying observation apparatus includes:
    a base unit;
    a placement unit, which is supported by the base unit, for placing the observation target;
    an objective lens on which the reflected light or the transmitted light of the illumination light from the observation target is incident;

a first imaging section which receives the reflected light or the transmitted light through the objective lens to acquire a first image;

a supporting member including a first stand unit supported by the base unit and positioned at a side close to the base unit, a second stand unit positioned at a side far from the base unit and supporting the objective lens and the first imaging section, and a shaft unit which swings the second stand unit around a swinging axis with respect to the first stand unit;

a second imaging section which is provided at a position at the same height as or higher than the shaft unit when viewed from the base unit, and is provided to face the placement unit or the observation target such that an optical axis of the first imaging section is included in a visual field and to have an optical axis different from the optical axis of the first imaging section, and to eliminate a connection or to lower a connection with a swinging motion of the supporting member to acquire a second image including the placement unit; and a display unit capable of displaying the first image acquired by the first imaging section and the second image acquired by the second imaging section wherein the shaft unit includes a hollow axis, and the second imaging section is provided in the vicinity of a radial center of the shaft unit.

2. The magnifying observation apparatus according to claim 1, wherein
the second imaging section is provided on the first stand unit or the shaft unit which does not swing with respect to the base unit.

3. The magnifying observation apparatus according to claim 1, wherein
the second imaging section is provided in the vicinity of the swinging axis.

4. The magnifying observation apparatus according to claim 1, wherein
the swinging axis and the optical axis of the second imaging section substantially coincide with or intersect with each other.

5. The magnifying observation apparatus according to claim 4, wherein
the magnifying observation apparatus includes a control unit which can be disposed apart from the base unit, and
a cable extending from the second imaging section and transmitting imaged data from the second imaging section is connected to the control unit through the inside of the shaft unit.

6. A magnifying observation apparatus
which irradiates an observation target with illumination light and detects a light receiving amount of reflected light or transmitted light of the illumination light from the observation target to generate an image of the observation target and to display the image to enable a magnified observation, wherein the magnifying observation apparatus includes:
a base unit;
a placement unit, which is supported by the base unit, for placing the observation target;
an objective lens on which the reflected light or the transmitted light of the illumination light from the observation target is incident;
a first imaging section which receives the reflected light or the transmitted light through the objective lens to acquire a first image;

a supporting member including a first stand unit supported by the base unit and positioned at a side close to the base unit, a second stand unit positioned at a side far from the base unit and supporting the objective lens and the first imaging section, and a shaft unit which swings the second stand unit around a swinging axis with respect to the first stand unit;

a second imaging section which is provided at a position at the same height as or higher than the shaft unit when viewed from the base unit, and is provided to face the placement unit or the observation target such that an optical axis of the first imaging section is included in a visual field and to have an optical axis different from the optical axis of the first imaging section, and to eliminate a connection or to lower a connection with a swinging motion of the supporting member to acquire a second image including the placement unit; and a display unit capable of displaying the first image acquired by the first imaging section and the second image acquired by the second imaging section, wherein the second imaging section acquires a second image including the objective lens, and the magnifying observation apparatus includes a display control unit which causes the first image acquired by the first imaging section while the supporting member is in a swinging motion to be displayed simultaneously with the second image acquired by the second imaging section on the display unit and wherein the display control unit causes the first image to be displayed larger than the second image.

7. The magnifying observation apparatus according to claim 1, wherein
the magnifying observation apparatus includes an objective lens driving unit which moves the objective lens in a direction towards and away from the placement unit, and
the objective lens driving unit moves the second imaging section in the same direction as the objective lens.

8. The magnifying observation apparatus according to claim 1, wherein
the magnifying observation apparatus includes an objective lens driving unit which moves the objective lens in a direction towards and away from the placement unit, and
the second imaging section is attached to a member which does not move when the objective lens is driven by the objective lens driving unit.

9. The magnifying observation apparatus according to claim 1, wherein
the placement unit includes an electric placement table which moves the observation target in a direction towards and away from the objective lens.

10. The magnifying observation apparatus according to claim 1, wherein
the second imaging section is provided to image the placement unit from a side opposite to a user side, and
the magnifying observation apparatus includes an image processing unit which causes an image acquired by the second imaging section to be displayed on the display unit with the left and right inverted.

11. A magnifying observation apparatus which irradiates an observation target with illumination light and detects a light receiving amount of reflected light or transmitted light of the illumination light from the observation target to generate an image of the observation target and to display the image to enable a magnified observation, wherein the magnifying observation apparatus includes:

a base unit;

a placement unit, which is supported by the base unit, for placing the observation target;

an objective lens on which the reflected light or the transmitted light of the illumination light from the observation target is incident;

a first imaging section which receives the reflected light or the transmitted light through the objective lens to acquire a first image;

a supporting member including a first stand unit supported by the base unit and positioned at a side close to the base unit, a second stand unit positioned at a side far from the base unit and supporting the objective lens and the first imaging section, and a shaft unit which swings the second stand unit around a swinging axis with respect to the first stand unit;

a second imaging section which is provided at a position at the same height as or higher than the shaft unit when viewed from the base unit, and is provided to face the placement unit or the observation target such that an optical axis of the first imaging section is included in a visual field and to have an optical axis different from the optical axis of the first imaging section, and to acquire a second image including the placement unit; and a display unit capable of displaying the first image acquired by the first imaging section and the second image acquired by the second imaging section, wherein the second imaging section is provided to image the placement unit from a side opposite to a user side, and the magnifying observation apparatus includes an image processing unit which causes an image acquired by the second imaging section to be displayed on the display unit with the left and right inverted.

12. The magnifying observation apparatus according to claim 11, wherein the second imaging section is provided on the first stand unit or the shaft unit which does not swing with respect to the base unit and provided in the vicinity of the swinging axis, and the swinging axis and the optical axis of the second imaging section substantially coincide with or intersect with each other.

13. The magnifying observation apparatus according to claim 11, wherein the magnifying observation apparatus includes an objective lens driving unit which moves the objective lens in a direction towards and away from the placement unit, and the second imaging section is attached to a member which does not move when the objective lens is driven by the objective lens driving unit.

14. The magnifying observation apparatus according to claim 11, further comprising, a leveling unit which causes the placement unit of the second image captured by the second imaging section to be substantially horizontal in a state in which the supporting member swings, wherein display unit capable of displaying the second image in which the placement unit is made substantially horizontal by the leveling unit when the second imaging section acquires the second image in a state in which the supporting member swings.

15. The magnifying observation apparatus according to claim 14, wherein the leveling unit performs image processing of rotating the second image so that the placement unit of the second image becomes substantially horizontal.

16. The magnifying observation apparatus according to claim 14, wherein the leveling unit is configured to perform, besides image processing of rotating the second image, trimming processing so as to form a substantially rectangular image which is long in the horizontal direction and which includes the placement unit.

17. The magnifying observation apparatus according to claim 6, wherein the second imaging section is provided on the first stand unit or the shaft unit which does not swing with respect to the base unit.

18. The magnifying observation apparatus according to claim 6, wherein the second imaging section is provided in the vicinity of the swinging axis.

19. The magnifying observation apparatus according to claim 6, wherein the swinging axis and the optical axis of the second imaging section substantially coincide with or intersect with each other.

20. The magnifying observation apparatus according to claim 6, wherein the second imaging section is provided in the vicinity of a radial center of the shaft unit.

* * * * *